United States Patent [19]

DeAguiar et al.

[11] Patent Number: 5,263,136
[45] Date of Patent: Nov. 16, 1993

[54] SYSTEM FOR MANAGING TILED IMAGES USING MULTIPLE RESOLUTIONS

[75] Inventors: John R. DeAguiar, Sebastopol; Ross M. Larkin, Rollings Hills, both of Calif.

[73] Assignee: Optigraphics Corporation, San Diego, Calif.

[21] Appl. No.: 694,416

[22] Filed: Apr. 30, 1991

[51] Int. Cl.⁵ .............................................. G06F 15/20
[52] U.S. Cl. ..................................... 395/164; 345/201
[58] Field of Search ........ 395/162, 164, 166, 128–130; 340/798, 799; 358/452, 455

[56] References Cited

U.S. PATENT DOCUMENTS

| | | | |
|---|---|---|---|
| Re. 31,200 | 4/1983 | Sukonick et al. | 395/162 |
| 4,878,183 | 10/1989 | Ewart | 395/128 X |
| 4,920,504 | 4/1990 | Sawada et al. | 395/166 |
| 4,951,230 | 8/1990 | Dalrymple et al. | 395/166 |
| 5,020,003 | 5/1991 | Moshenberg | 395/164 |
| 5,150,462 | 9/1992 | Takeda et al. | 395/166 |

Primary Examiner—Dale M. Shaw
Assistant Examiner—Kee M. Tung
Attorney, Agent, or Firm—Knobbe, Martens, Olson & Bear

[57] ABSTRACT

An image memory management system for tiled images. The system defines an address space for a virtual memory that includes an image data cache and a disk. An image stack for each source image is stored as a full resolution image and a set of lower-resolution subimages. Each tile of an image may exist in one or more of five different states as follows: uncompressed and resident in the image data cache, compressed and resident in the image data cache, uncompressed and resident on disk, compressed and resident on disk and not loaded but re-creatable using data from higher-resolution image tiles.

17 Claims, 39 Drawing Sheets

Image Stack  Fig. 1
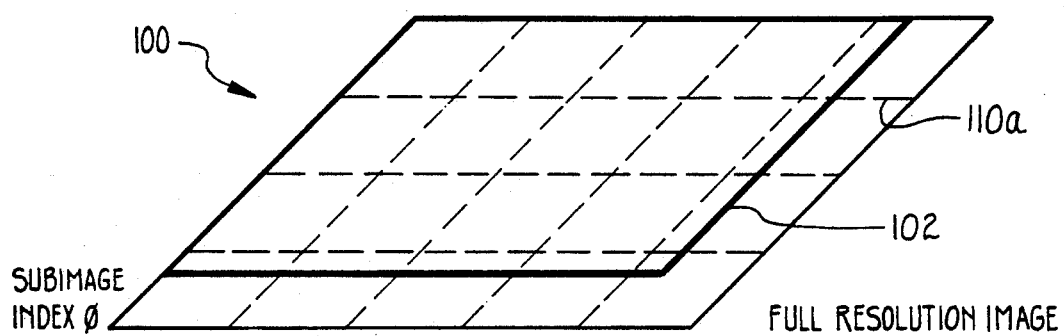
FULL RESOLUTION IMAGE
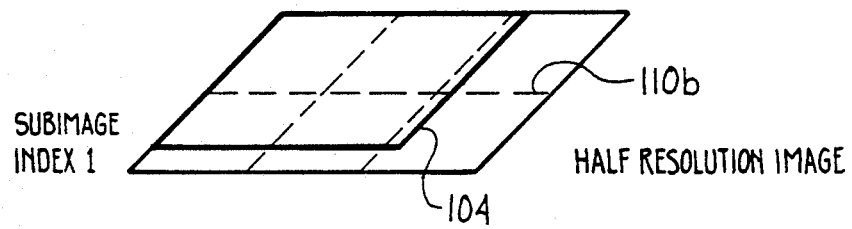
HALF RESOLUTION IMAGE
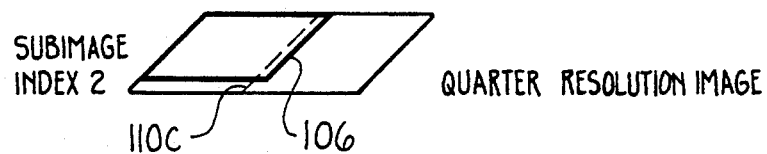
QUARTER RESOLUTION IMAGE
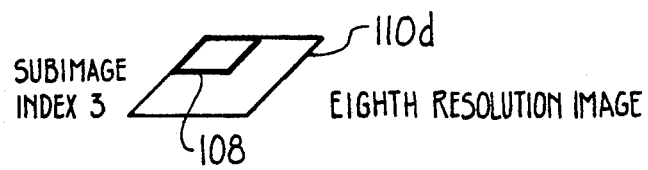
EIGHTH RESOLUTION IMAGE

Fig. 9A  Document Information Structure

300

| SELF-REFERENCE TO DOCUMENT HANDLE 302 | "OVERVIEWS INVALID" FLAG 304 | CACHE IMAGE COMPRESSION ALGORITHM 306 |
|---|---|---|
| IMAGE COLOR TYPE 308 | BITS PER IMAGE PIXEL 310 | TILE SIZE INFORMATION 312 |
| NUMBER OF SUBIMAGES IN DOC 314 | INPUT FILE INFO 316 | OUTPUT FILE INFO 318 |
| LIST OF SUBIMAGE HEADERS 320 |||

| POINTER TO TILE HEADERS 322 | POINTER TO TILE DIRECTORY 324 | SUBIMAGE WIDTH AND HEIGHT 326 |
|---|---|---|
| NUMBER OF TILE ROWS & COLS IN SUBIMAGE 328 | IMAGE STACK INDEX OF THIS SUBIMAGE 330 | PIXEL RESOLUTION OF THIS SUBIMAGE 332 |
| ⋮ |||

Fig. 10  Tile Header

350

| POINTER TO DOCUMENT CONTAINING THIS TILE 352 | INDEX OF SUBIMAGE CONTAINING THIS TILE 354 | ROW AND COLUMN INDICES OF TILE 356 |
|---|---|---|
| STATUS INFORMATION 358 || PRESERVE COUNT 360 |
| LOCATION OF UNCOMPRESSED IMAGE DATA IN CACHE MEMORY 362 || LOCATION OF COMPRESSED IMAGE DATA IN CACHE MEMORY 364 |
| LOCATION OF UNCOMPRESSED IMAGE DATA ON DISK 366 || LOCATION OF COMPRESSED IMAGE DATA ON DISK 368 |
| LINK TO NEXT LESS RECENTLY USED TILE 370 || LINK TO NEXT MORE RECENTLY USED TILE 372 |
| NUMBER OF BYTES OF EXPANDED DATA IN TILE 374 || NUMBER OF BYTES OF COMPRESSED DATA IN TILE 376 |

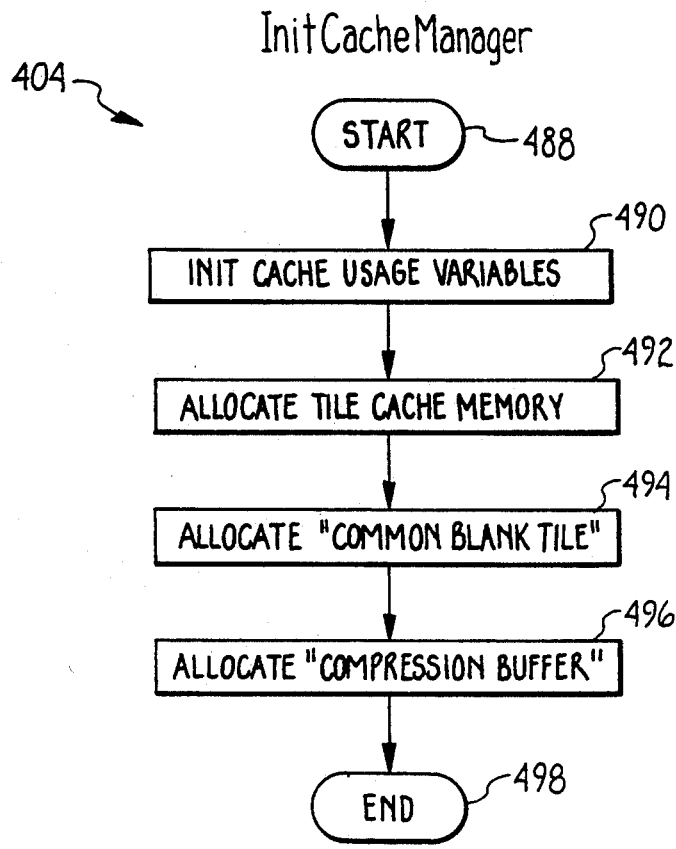
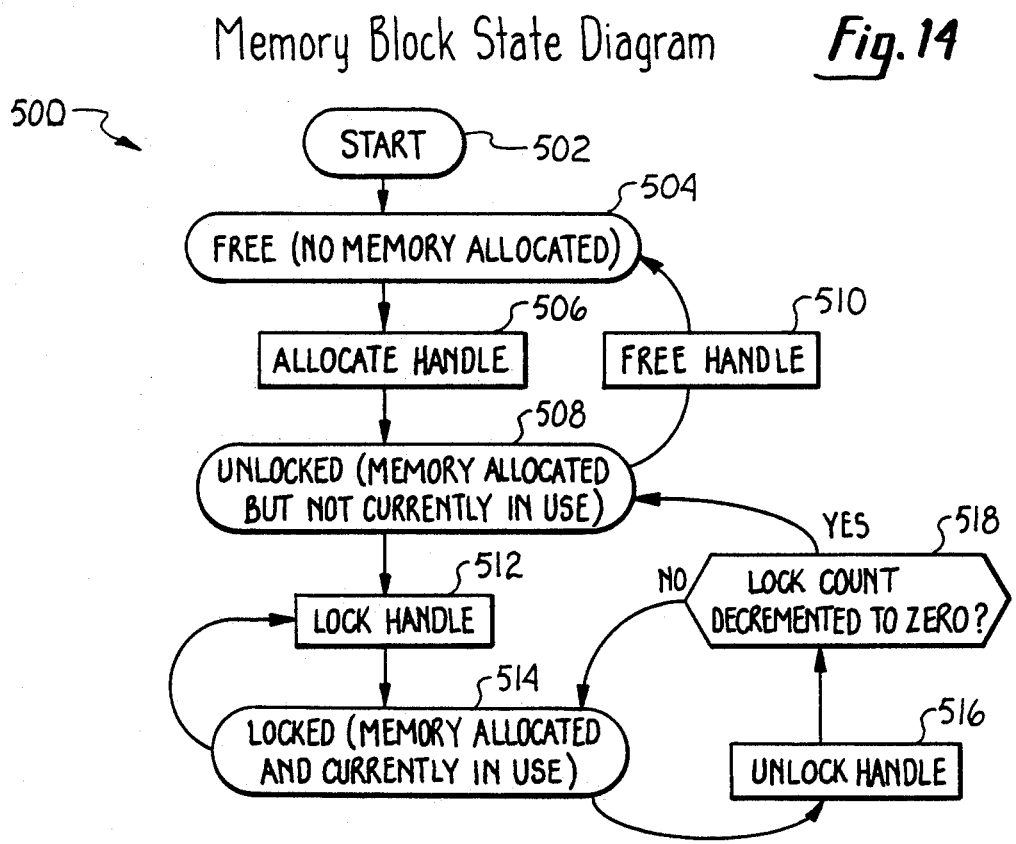

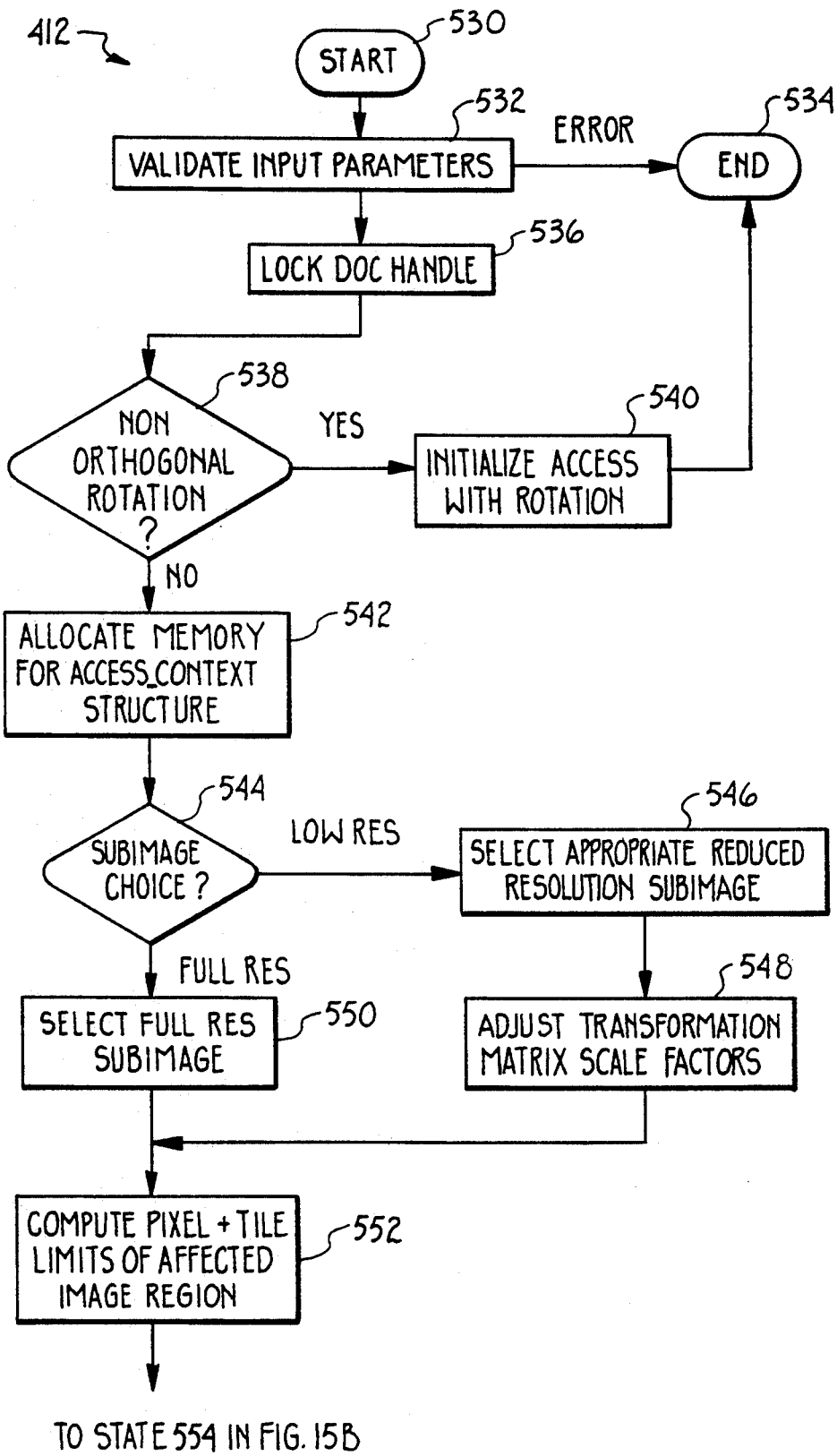

Fig. 16

Access Context 600

| | | | | |
|---|---|---|---|---|
| POINTER TO AFFECTED DOC 602 | "SUBIMAGE CHOICE" OPTION VALUE 604 | INDEX OF AFFECTED SUBIMAGE 606 | ACCESS QUANTUM 608 | READ/WRITE OPTION 610 |
| BASIC ORTHOGONAL ROTATION VALUE 612 | PIXEL COMBINATION OPERATION 614 | SCALER TYPE OPERATION 616 | "UPDATE OVERVIEWS" FLAG 618 | |
| I/O BUFFER WIDTH & HEIGHT 620 | I/O BUFFER PITCH (BYTES/ROW) 622 | I/O BUFFER BIT OFFSET TO START OF RUN 624 | | |
| ROWS PER STRIP (FOR "AQ_STRIP" ACCESS QUANTUM) 626 | NUMBER OF I/O BUFFER ROWS YET TO BE PROCESSED 628 | | | |
| POINTER TO ACCESS FUNCTION USED IN "SeqBufImageAccess" 630 | STEPPING DIRECTIONS FOR IMAGE ROW AND COLUMN INDICIES 632 | | | |
| POINTER TO POLYGON CLIPPING INFORMATION 634 | POINTER TO RASTER SCALING INFORMATION 636 | | | |
| POINTER TO UNCOMPRESSED DATA IN CURRENTLY LOCKED TILES 638 | POINTER TO REGION TILE DIRECTORY 640 | NEXT IMAGE ROW & COLUMN TO BE ACCESSED 642 | | |
| TERMINAL ROW & COLUMN OF ACCESS REGION 644 | UNCLIPPED EXTENT OF ACCESS REGION 646 | CLIPPED EXTENT OF ACCESS REGION 648 | | |
| CLIPPED IMAGE BUFFER BIT OFFSET AND LENGTH 650 | NUMBER OF TILE ROWS & COLS IN ACCESS REGION 652 | ROW & COLUMN OF CURRENTLY LOCKED TILES 654 | | |
| IMAGE ROW & COL AT ORIGIN OF FIRST TILE IN ACCESS REGION 656 | NUMBER OF I/O BUFFER ROWS HELD OVER FOR NEXT STRIP 658 | | | |
| POINTER TO IMAGE TILING/UNTILING BUFFER 660 | NUMBER OF BYTES IN TILING/UNTILING BUFFER 662 | BIT OFFSET FOR TILING/UNTILING BUFFER 664 | | |
| ACCESS TRANSFORMATION MATRIX 666 | | | | |

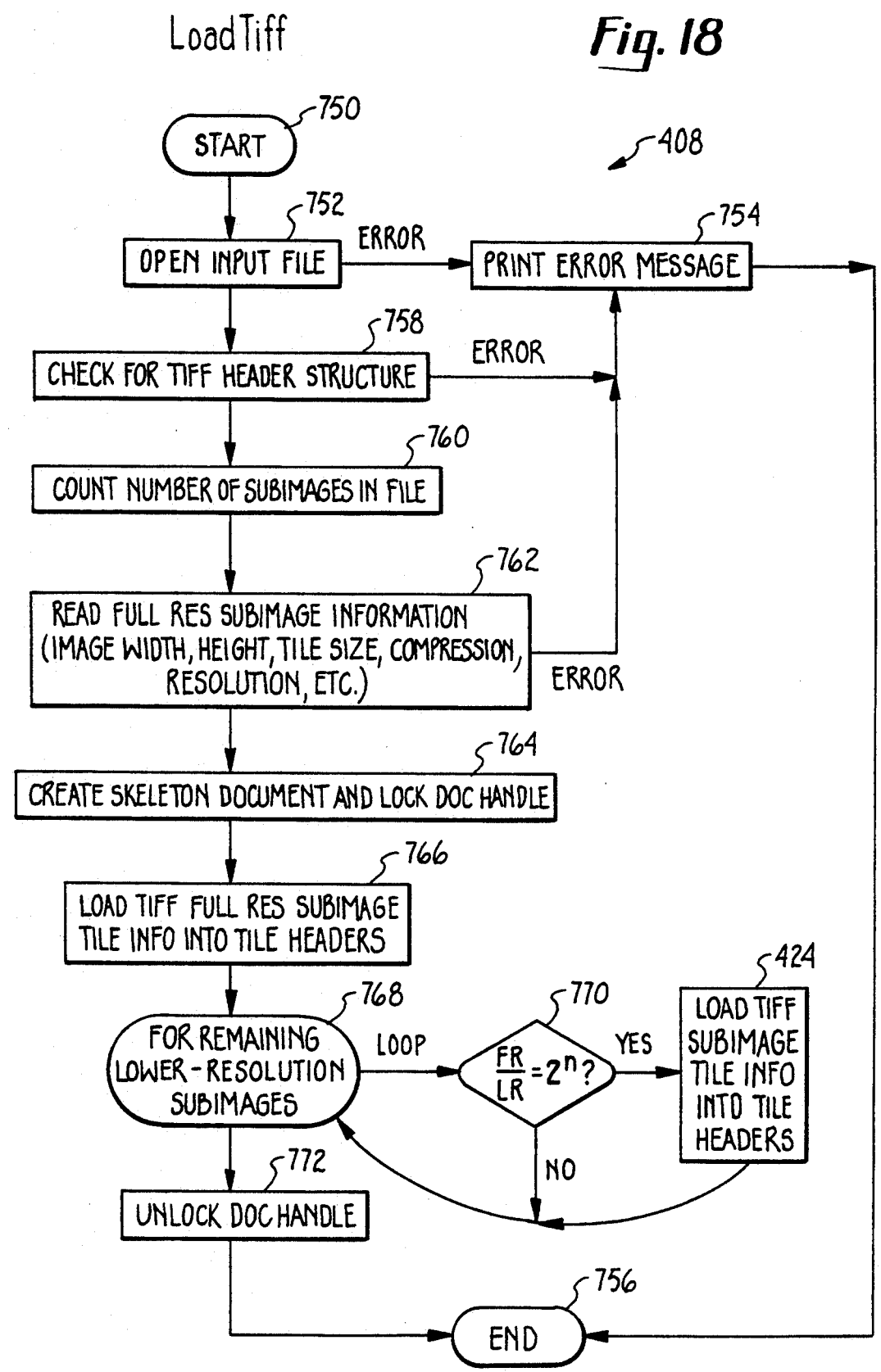

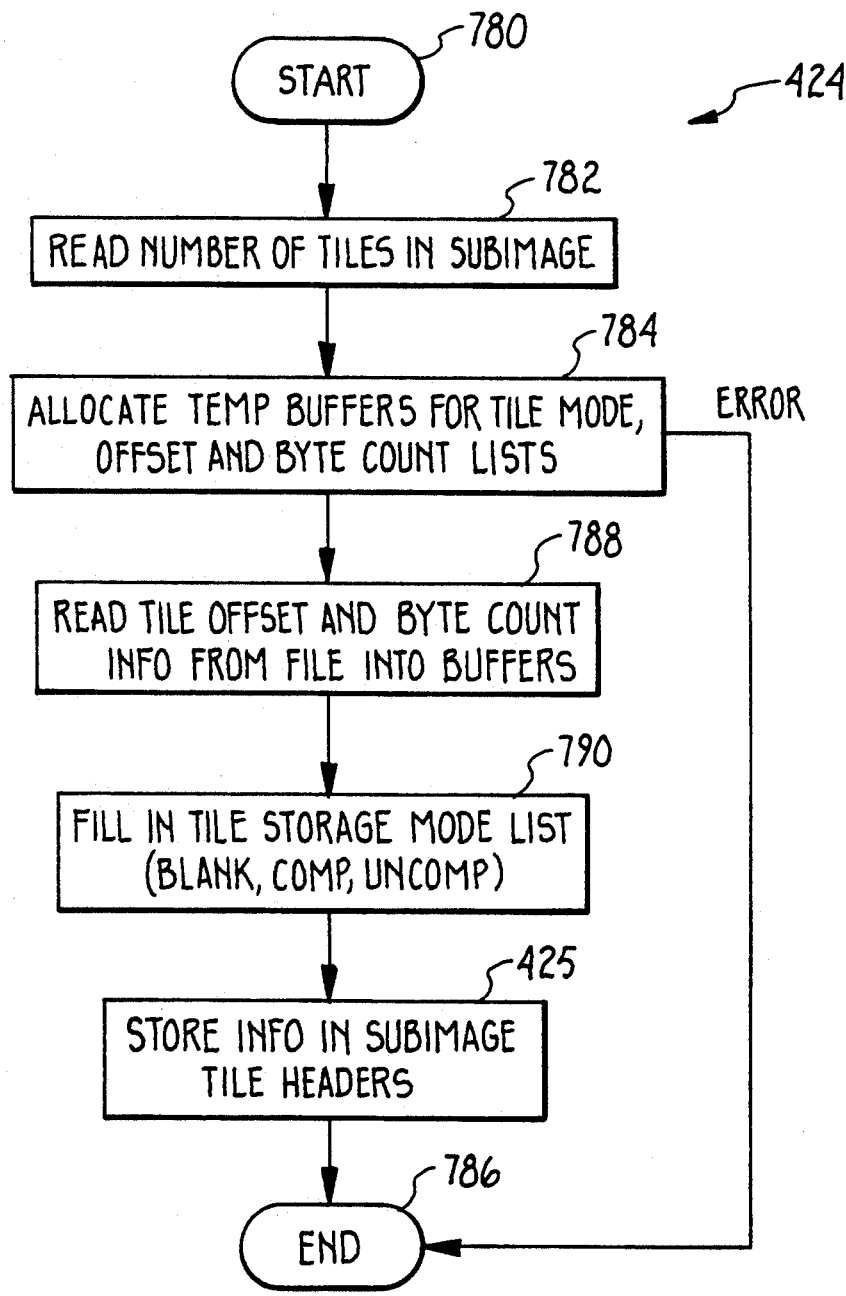

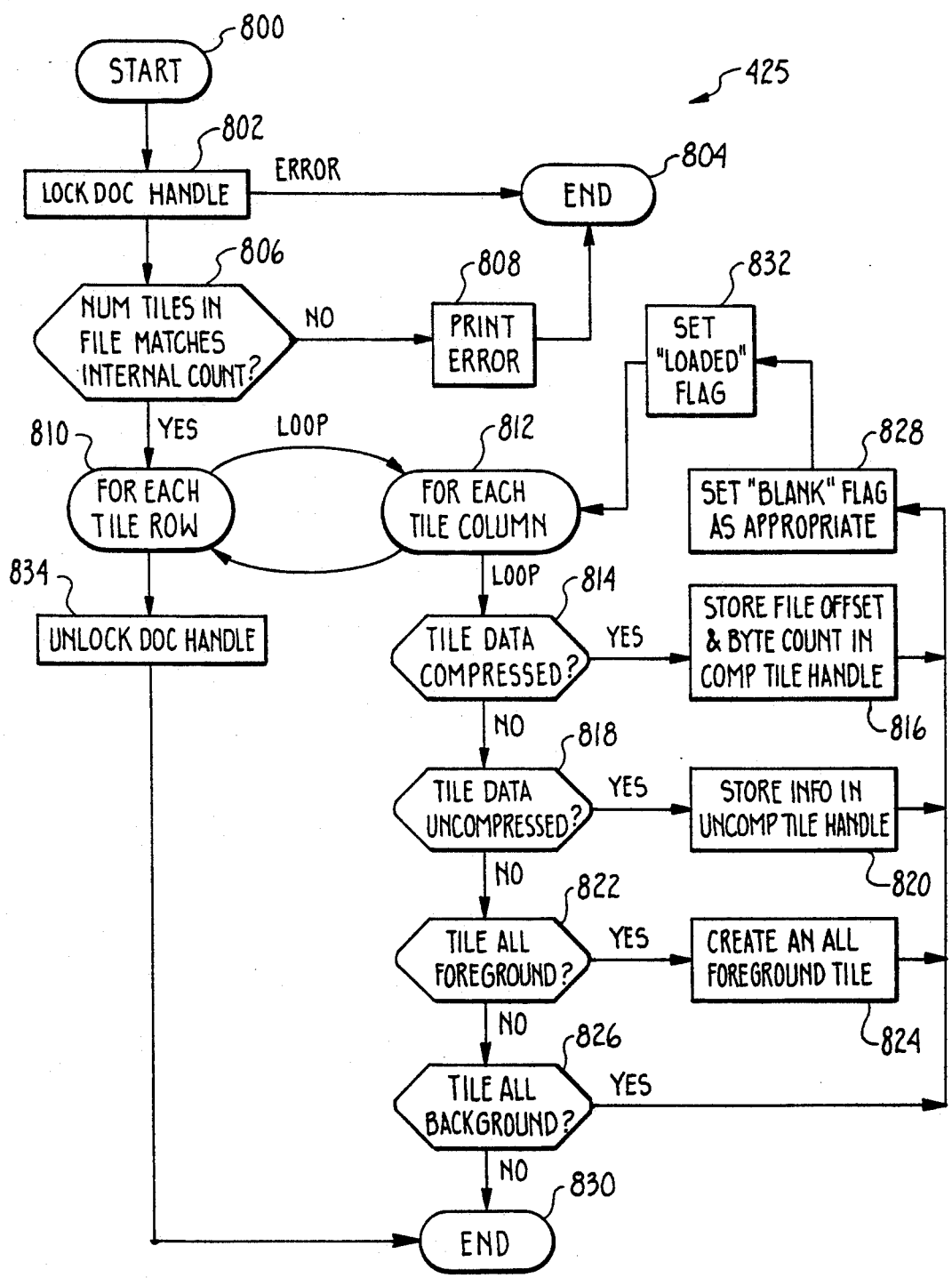
Fig. 20 LoadSubImDiskCache

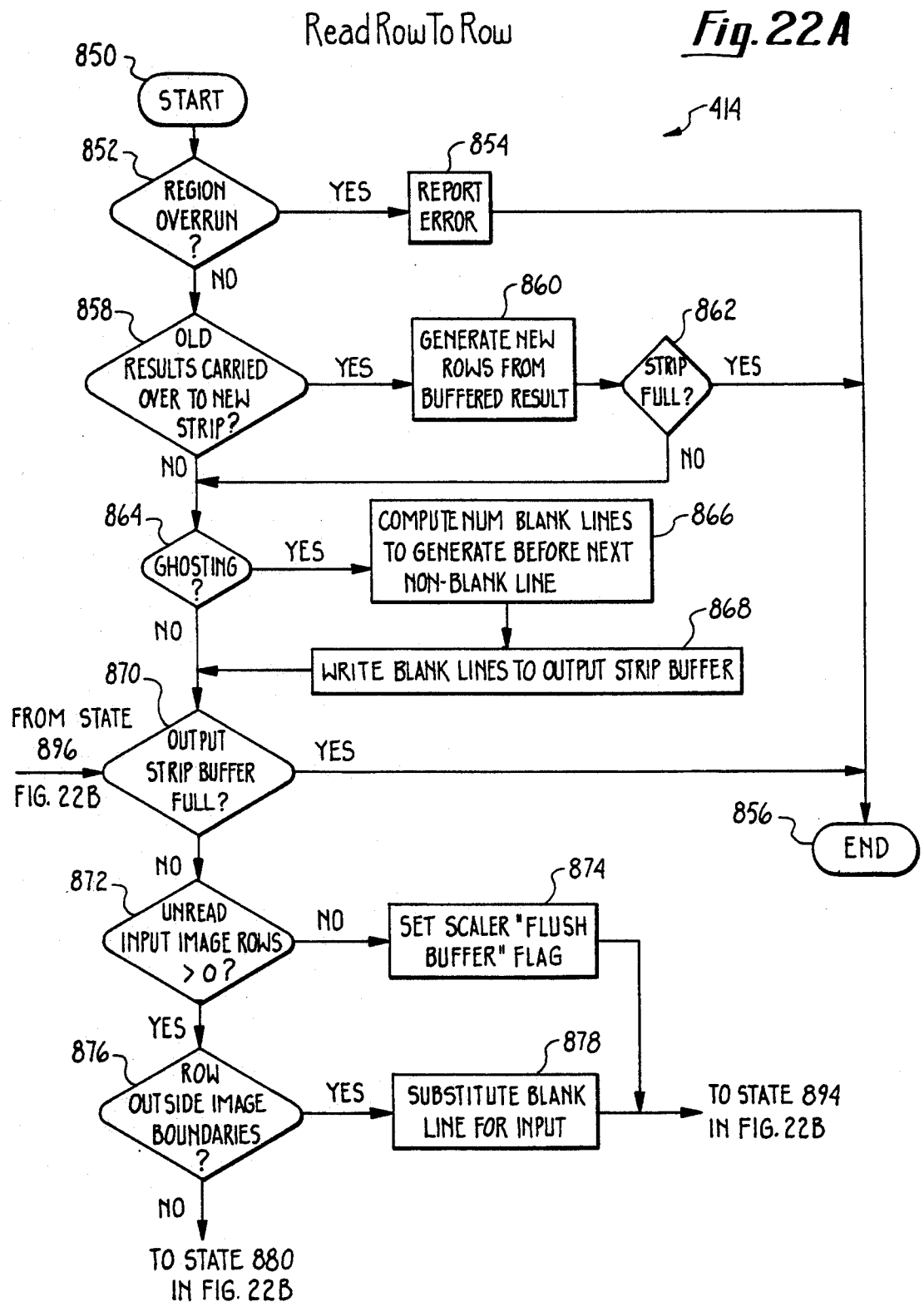

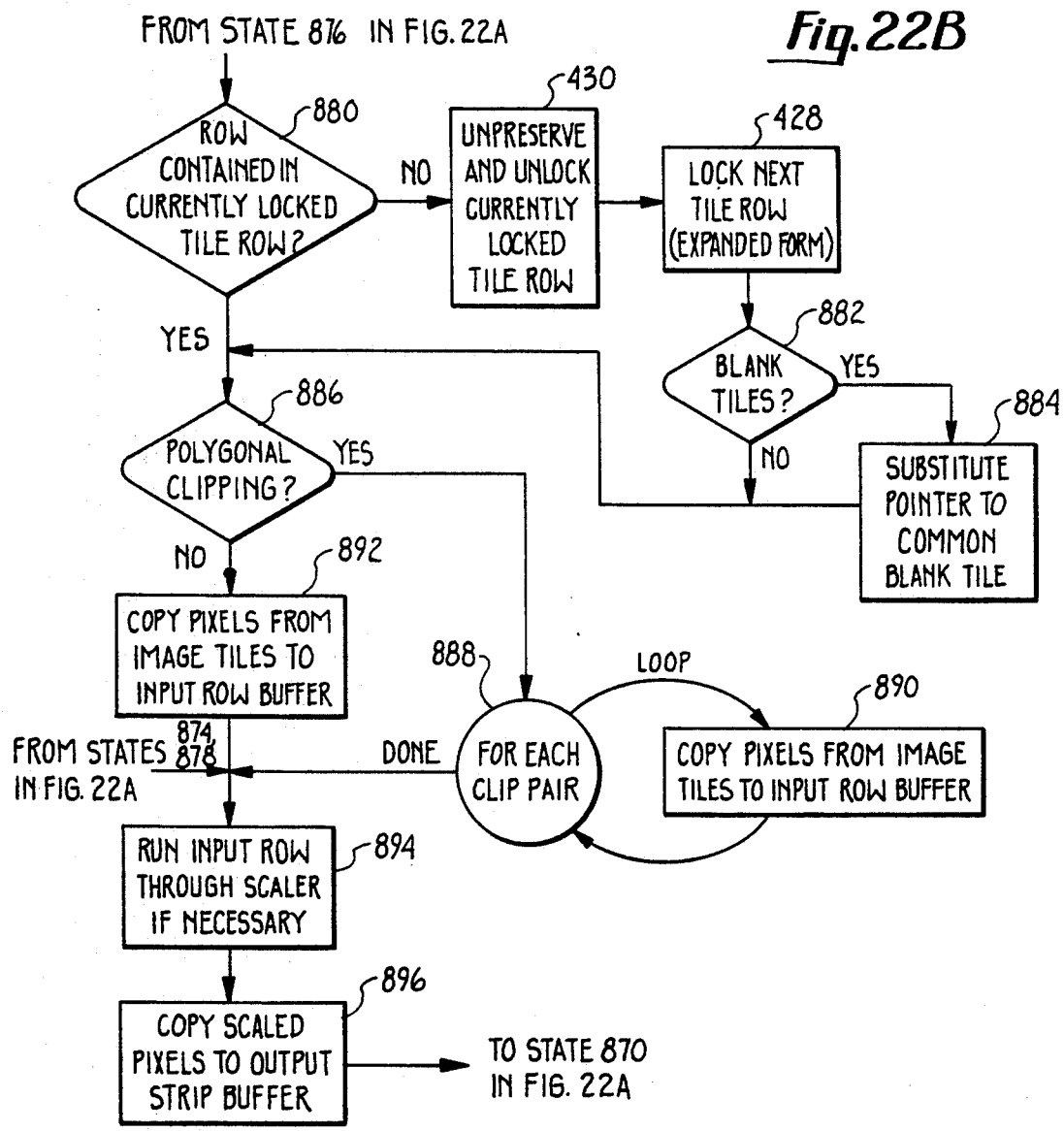

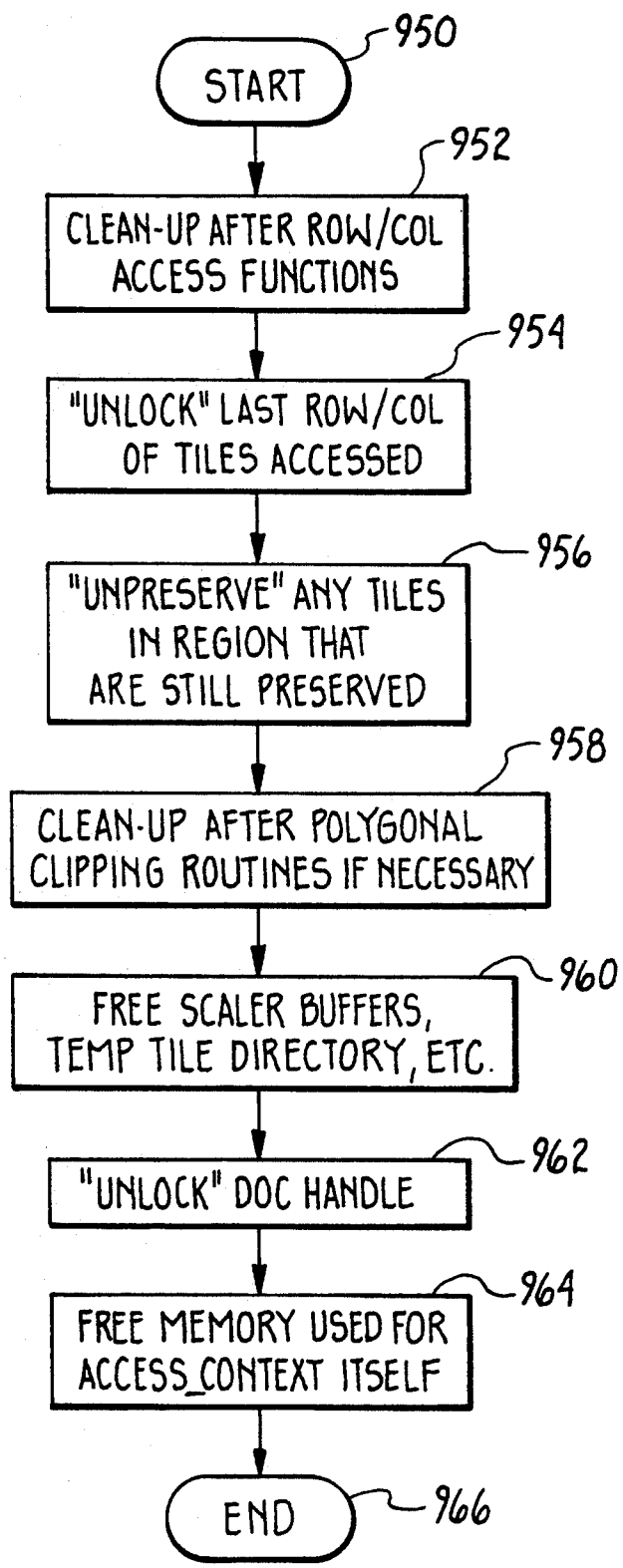

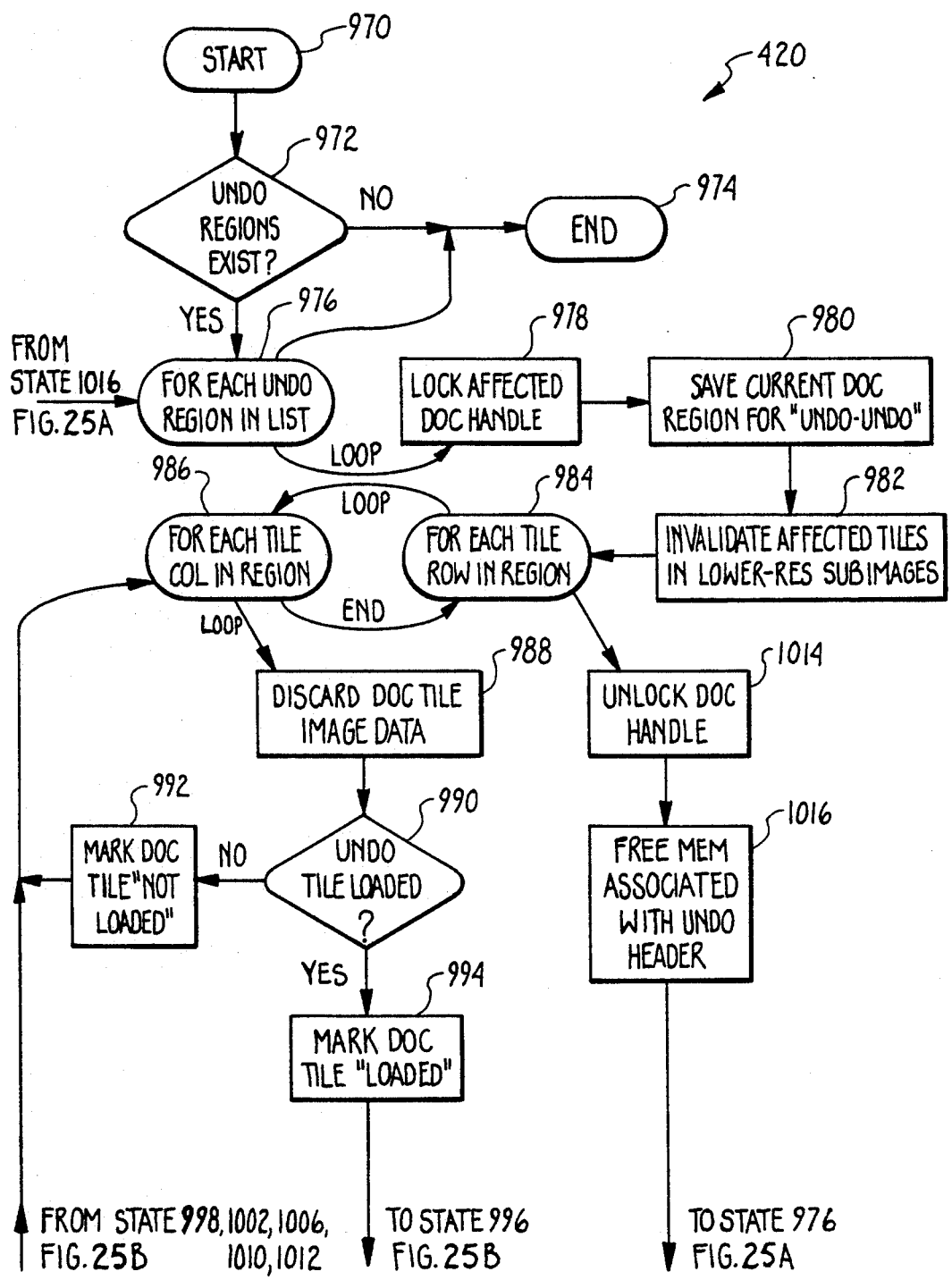

CopyTileToOview

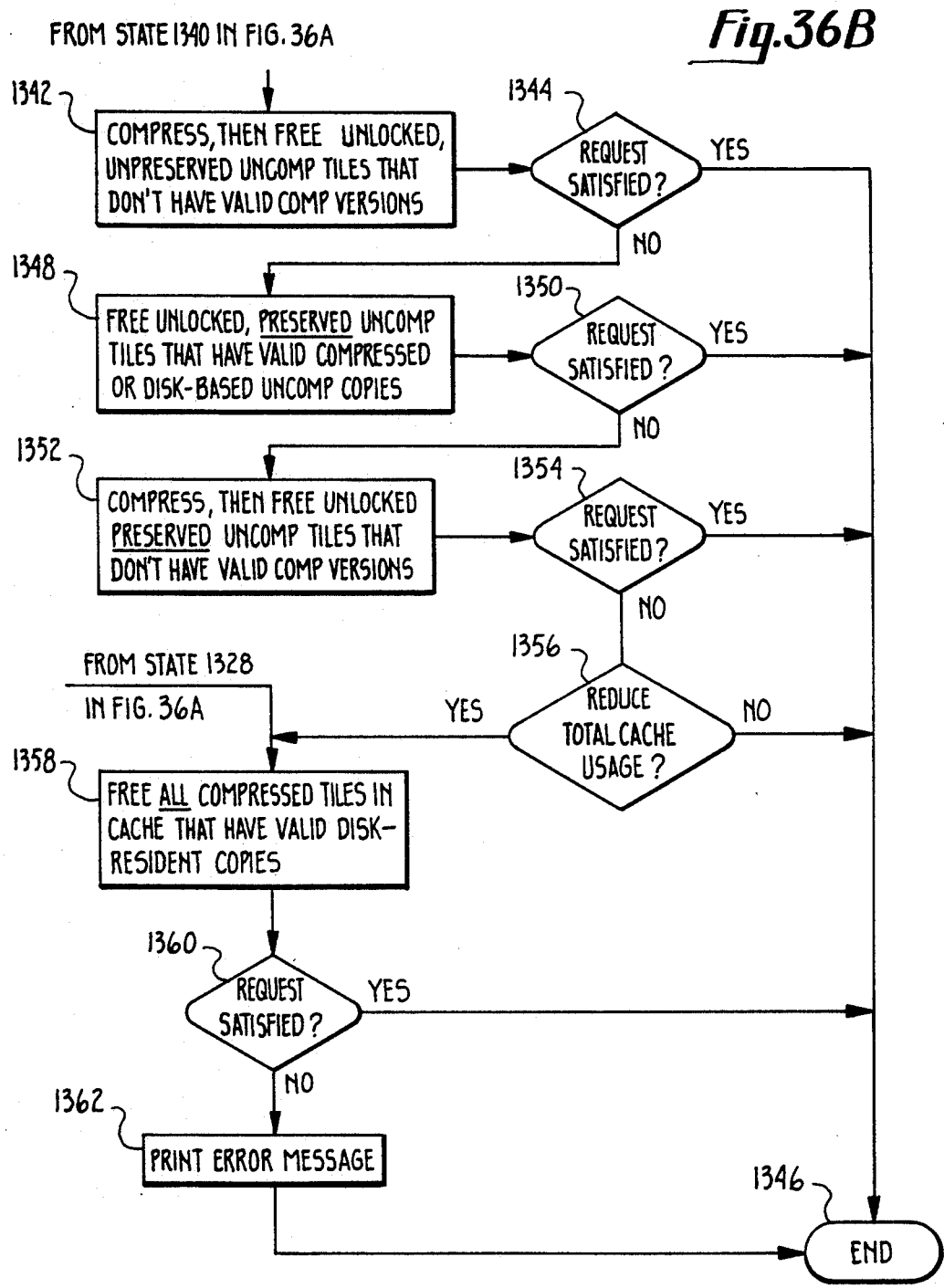

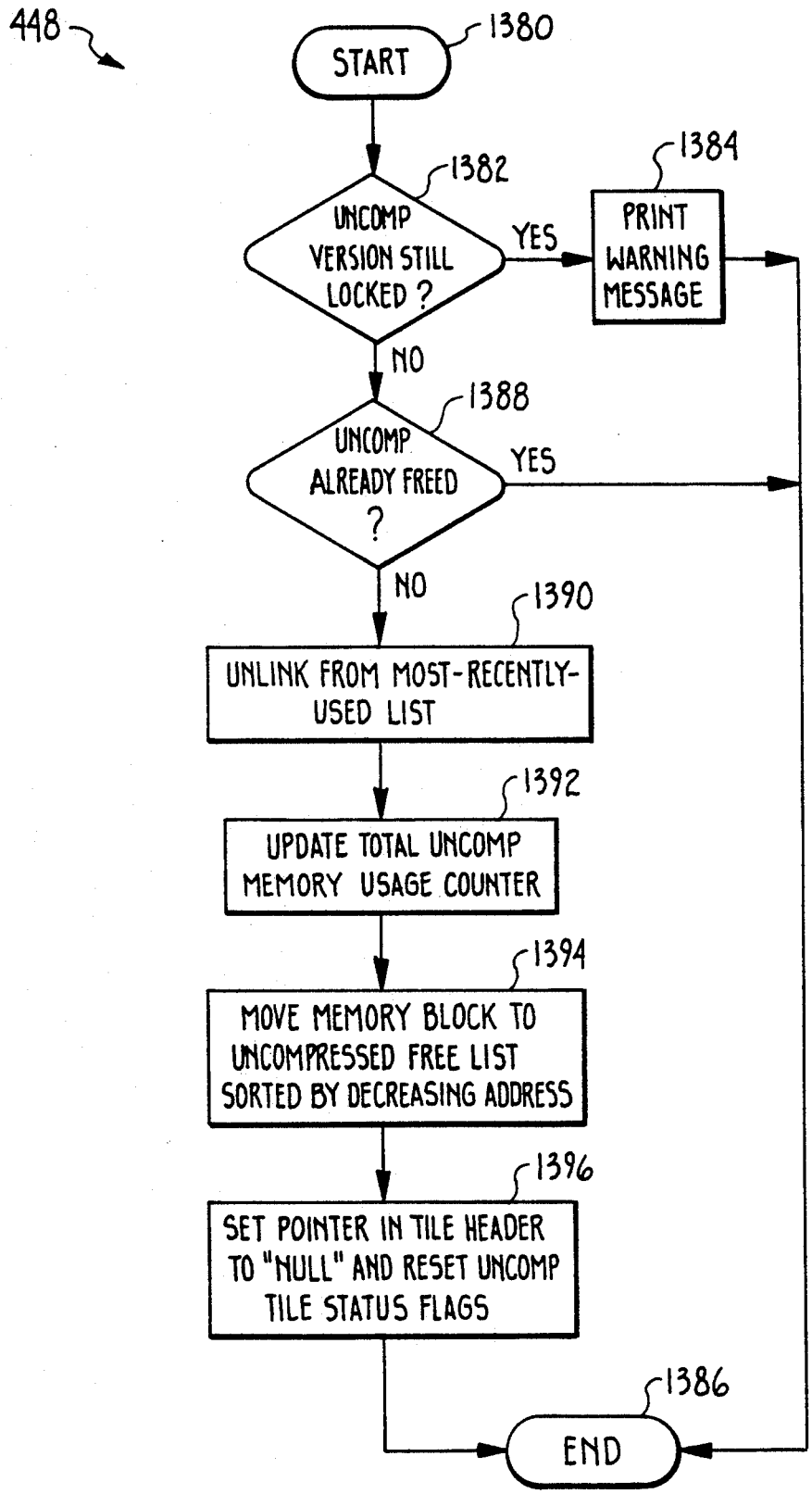

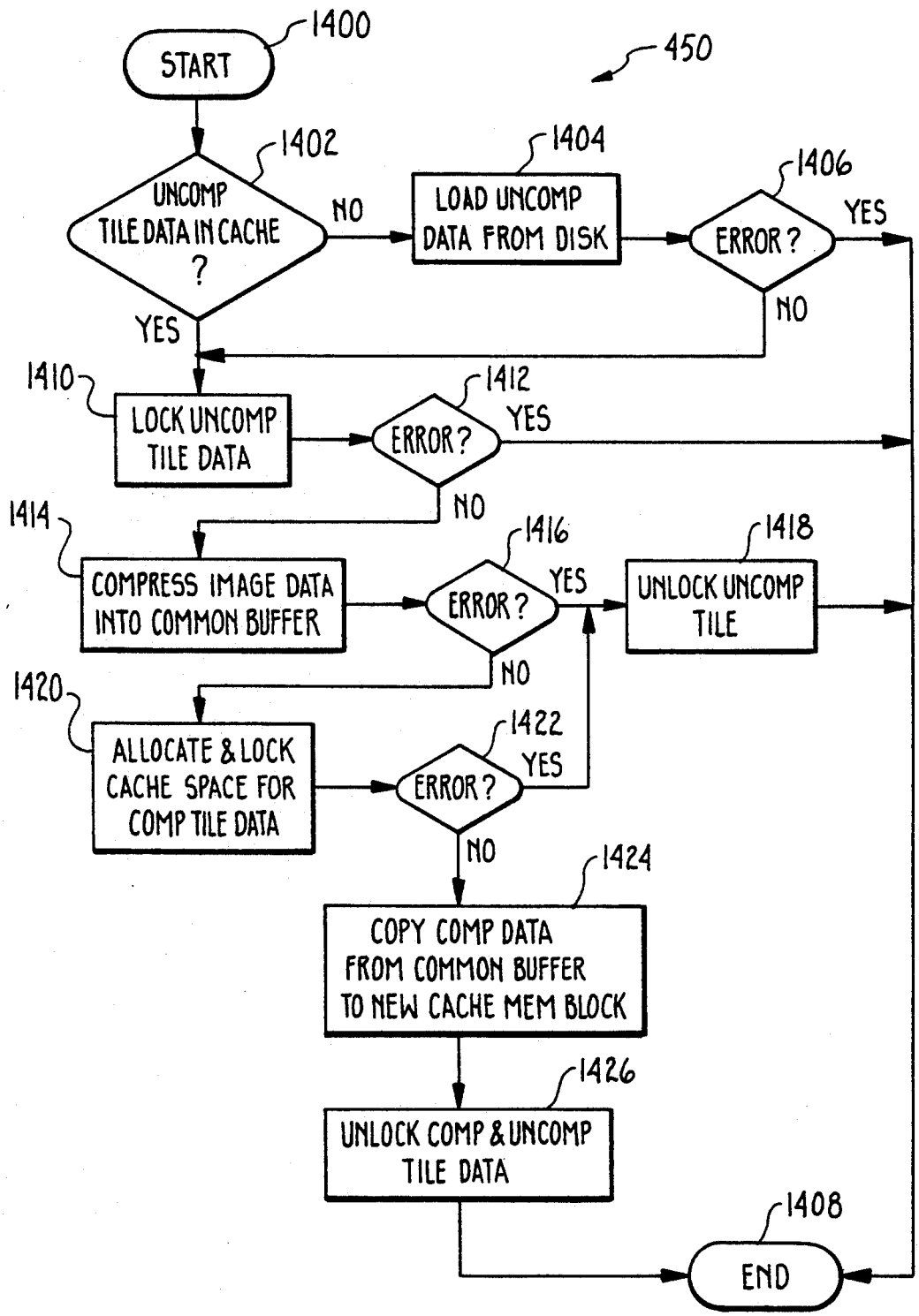

SYSTEM FOR MANAGING TILED IMAGES USING MULTIPLE RESOLUTIONS

MICROFICHE APPENDIX

A microfiche appendix containing computer source code is attached. The microfiche appendix comprises one (1) sheet of microfiche having 74 frames.

BACKGROUND OF THE INVENTION

1. Field of the Invention

The present invention relates to memory management systems and, more particularly, to the memory management of large digital images.

2. Description of the Prior Art

The present invention comprises a memory management system for large digital images. These digital, or raster, images are made up of a matrix of individually addressable pixels, which are ultimately represented inside of a computer as bit-maps. Large digital images, such as those associated with engineering drawings, topographic maps, satellite images, and the like, are often manipulated by a computer for the purpose of viewing or editing by a user. The size of, such images are often on the order of tens and even hundreds of Megabytes. Given the current cost of semiconductor memory it is economically impracticable to dedicate a random access memory (RAM) to storing even a single large digital image (hereinafter just referred to as a "digital image"). Thus, the image is usually stored on a slower, secondary storage medium such as a magnetic disk, and only the sections being used are copied into main memory (also called RAM memory).

However, as is well known by users of computer aided design ("CAD") systems, a simplistic memory transfer scheme will cause degraded performance during many typical operations, including zooming or panning. Essentially, during such operations, the computer cannot transfer data between disk and main memory fast enough so that the user must wait for a video display to be refreshed. Clearly, these periods of waiting on memory transfers are wasteful of engineering time.

Presently, to enhance main memory storage of only relevant sections of a digital image, the image is logically segmented into rectangular regions called "tiles". Two currently preferred standards for segmenting an image into tiles are promulgated by the Computer Aided Logistics Support (CALS) organization of the United States government (termed the "CALS standard" herein) and by Aldus Corporation of Seattle, Washington, as defined in the Tagged Image Format File (TIFF) definition (e.g., "TIFF Specification, Revision 5.0, Appendix L). Among other tile sizes, both standards define a square tile having dimensions of 512×512 pixels. Thus, if each pixel requires one byte of storage, the storage of one such tile would require a minimum of 256 kilobytes of memory.

Others, such as Thayer, et al. (U.S. Pat. No. 4,965,751) and Sawada, et al. (U.S. Pat. No. 4,920,504) have discussed tiling or blocking a memory. However, such computer hardware is generally associated with a graphics board for improving the speed of pixel transfers between a frame buffer and a video display by addressing a group of pixels simultaneously. These systems have no relationship to tiling of the image itself and thus do not require knowledge of image size. Tiling has also been used to refer to polygon filling as in Dalrymple, et al. (U.S. Pat. No. 4,951,230), which is unrelated to the notion of tiling discussed herein.

The patent to Ewart (U.S. Pat. No. 4,878,183) discusses interlaced cells, each cell containing one or more pixels, for storing continuous tone images such as photographs. The variable size cells are used to vary the resolution of an image according to a distance which is to be perceived by a user. However, the Ewart disclosure does not discuss rasterized binary images containing line drawings, nor does Ewart discuss virtual memory management for modifying or editing images, as will be more fully discussed below.

Even when stored in a mass storage system, an image library, containing a number of digital images, will consume disk space very quickly. Furthermore, "raw" digital images are generally too large to transfer from mass storage to portable floppy disks, or between computer systems (by telephone, for example), in a timely and inexpensive manner unless some means is used to reduce the size of the image. Hence, users of binary images employ image compression techniques to improve storage and transfer efficiencies. One existing compression standard applicable to facsimile transmission, CCITT Group IV, or T.6 compression, is now being used for digital images. Like many other compression techniques, however, the CCITT standard uses statistical techniques to compress data and, hence, it does not always produce a compressed image that is smaller than the original, uncompressed image. That means that image libraries will often contain a mix of compressed and uncompressed binary images. Similar compression standards exist for color and gray-scale images such as those promulgated by the JPEG (Joint Photog. Exp. Group) Standards Committee of the CCITT as SGV III Draft Standard.

At the present time, digital images are typically viewed and modified with an image editor using an off-the-shelf computer workstation. These workstations usually come with a sophisticated operating system, such as UNIX, that employs a virtual memory to effectively manage memory accesses in secondary and main memories. In an operating system having virtual memory, the data that represents the executable instructions for a program or the variables used by that program do not need to reside entirely in main memory. Instead, the operating system brings portions of the program into main memory only as needed. (The data that is not stored in main memory being stored on magnetic disk or other like nonvolatile memory.) The address space that is available to any one application program is generally managed in blocks of convenient sizes called "pages" or "segments".

In general, a virtual memory system allows application programs to be written and executed without concern for the management of virtual memory carried out by the operating system. Thus, independence of the size of main memory is achieved by creating a "virtual" address space for the program. The operating system translates virtual addresses into physical addresses (in a main or cache memory) with the aid of an "address translation table". This table contains one entry per virtual memory segment of status information. For instance, segment status will commonly include information about whether a segment is currently in main memory, when a segment was last used, a disk address at which the disk copy of the segment resides, and a RAM address at which the segment resides (only valid if the segment is currently loaded in main memory).

When the program attempts to access data in a segment that is not currently resident in main memory, the operating system reads the segment from disk into main memory. The operating system may need to discard another segment to make room for the new one (by overwriting the area of main memory occupied by the old segment), so some method of determining which segment to discard is required. Usually the method is to discard the least recently used segment. If the discarded segment was modified then it must be written back to disk. The operating system completes the "swap" operation by updating the address translation table entries of the new and discarded segments.

In summary, the conventional memory management schemes consider data to be in one of two states: resident or not resident in main memory. Which segments are stored in main memory at any given time is generally determined only by past usage, with no way of predicting future memory demands. For instance, just because a segment is the least recently used does not mean that it will not be used at the very next memory access.

However, the management of virtual memory for images departs significantly from conventional virtual memory schemes because images and computer programs are accessed in very different ways. Computer programs tend to access one small neighborhood of virtual address, and then jump to some distant, essentially random, location. However, during normal image processing operations an image is accessed in one of a finite set of predictable patterns. It is not surprising then that conventional memory management systems can significantly degrade performance when used in image processing applications by applying inappropriate memory management rules. Rules which should be abided by a memory management system for large digital images are the following:

1. Image memory must be managed as rectangular image regions (called "tiles"), not as linear memory address ranges.

2. An image tile can exist in five forms: uncompressed memory-resident, compressed memory-resident, uncompressed disk-resident, compressed disk-resident and "can be derived from other available image tiles", in contrast to the two basic forms of memory-resident and disk-resident available in conventional virtual memory schemes.

3. The image region that will be affected by a particular image processing operation is known before the operation begins, and that information can be conveyed to the memory manager.

4. An image memory manager must be tunable to different system capabilities and image types. For example, many computers can decompress a tile of binary data much faster that they can retrieve the uncompressed version of the same tile from disk. On the other hand, some images cannot be compressed at all.

5. An image memory management system should support the capability to "undo" editing operations which is built into the memory manager for optimal performance and ease of use. Thus, the memory manager could easily save copies of the compressed tiles in the affected region, and quickly restore the image to the original state by simply modifying the tile directory entries to point to the old version.

Reader, et al., ("Address Generation and Memory Management for Memory Centered Image Processing Systems", SPIE, Vol. 757, Methods for Handling and Processing Imagery, 1987) discuss a primitive memory management system for images. However, in that system, image tiles are only stored in memory and not on disk. Furthermore, in the Reader, et al., system, there is no capability to handle images in compressed form, nor is there any discussion of "undoing" editing operations.

Consequently, a need exists for an image memory management system that provides: linkages with a raster image editor which includes modify and undo operations, true virtual memory for large images specifying locations on disk and in memory, simultaneous handling of compressed and uncompressed images, and a method for rapidly constructing reduced resolution views of the image for display. The latter need is particularly important when viewing a large image reduced to fit on a video display.

SUMMARY OF THE INVENTION

The above-mentioned needs are satisfied by the present invention which includes a memory management system for tiled images. The memory management system includes a tile manager for maintaining a virtual memory comprising a main memory and a secondary memory such as a disk. The tiled images may include tiles in compressed or uncompressed form.

The tile manager selects the form of image tile that most appropriately matches a request. Each tile of an image may exist in one or more of five different forms, or states, as follows: uncompressed and resident in the image data cache, compressed and resident in the image data cache, uncompressed and resident on disk, compressed and resident on disk and not loaded but re-creatable using data from higher-resolution image tiles.

An image stack having successively lower-resolution subimages is constructed from a full resolution source image. The lower-resolution images in the image stack may be used to enhance such standard image accesses as zooming and panning where high speed image reduction is advantageous.

The image memory management system provides linkages with image processing applications that facilitate image modifications. The tile manager need only store compressed tiles that relate to so-called undoable operations.

These and other objects and features of the present invention will become more fully apparent from the following description and appended claims taken in conjunction with the accompanying drawings.

BRIEF DESCRIPTION OF THE DRAWINGS

FIG. 1 is a perspective view of an image stack comprising full, half, quarter and eighth resolution tiled images;

FIGS. 9A and B are a diagram of one preferred data structure defining document information according to the present invention;

FIG. 10 is a diagram of one preferred data structure defining a tile header for maintaining the status of compressed or uncompressed tiles;

FIG. 13 is a flow diagram defining the "initialize cache manager" function referred to in the flow diagram of FIG. 12;

FIG. 14 is a state diagram of the locking and unlocking of a memory, state, according to the present invention;

FIGS. 15A, 15B, and 15C are a flow diagram defining the "create image access context" function referred to in FIG. 12;

FIG. 16 is a diagram, of a data structure defining the access context referred to in FIGS. 15A,B;

FIG. 18 is a flow diagram defining the "load tiled raster image" function referred to in FIG. 12;

FIG. 19 is a flow diagram defining the "load TIFF subimage tile information into tile headers" function referred to in FIG. 18;

FIG. 20 is a flow diagram defining a "store tile info in tile headers" function referred to in FIG. 12;

FIGS. 22A and 22B are a flow diagram defining the "read rows from region" function referred to in FIG. 12;

FIG. 24 is a flow diagram defining the "close image access context" function referred to in FIG. 12;

FIGS. 25A and 25B are a flow diagram defining the "undo previous raster operations" function referred to in FIG. 12;

FIGS. 36A and 36B are a flow diagram defining the "collect freeable cache memory" function referred to in FIG. 32;.

FIG. 37 is a flow diagram defining the "free uncompressed version of tile" function referred to in FIGS. 36A,B; and FIG. 38 is a flow diagram defining the "create compressed version of tile from uncompressed version" function referred to in FIG. 17B.

DETAILED DESCRIPTION OF THE PREFERRED EMBODIMENTS

Figure 2:
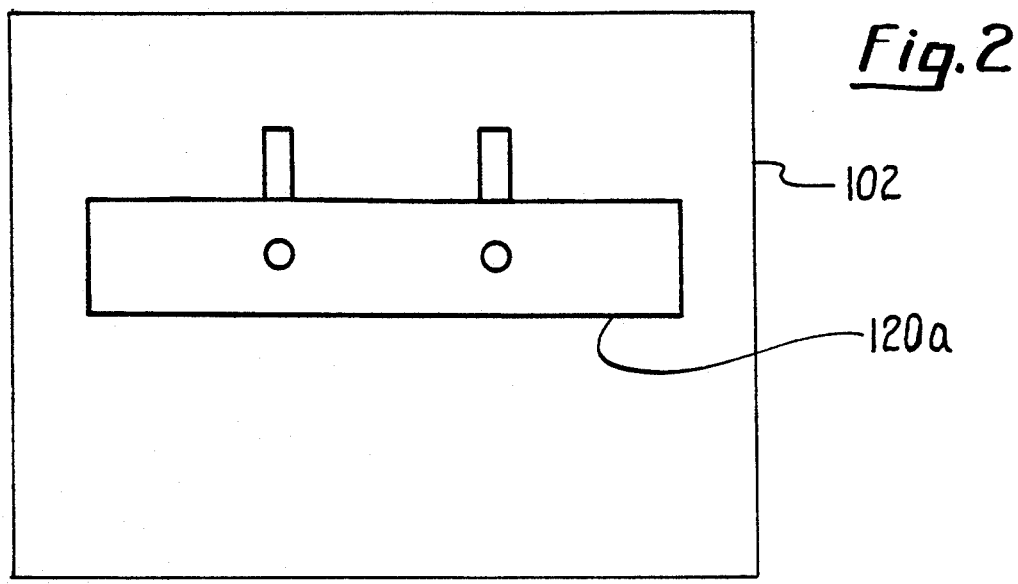
FIG. 2 is a full resolution image of a mechanical part.

Reference is now made to the drawings wherein like parts are designated with like numerals throughout.

FIG. 1 illustrates an image stack, generally indicated at 100. The design of the image stack 100 is based on the idea that image memory can be managed as small square regions, called tiles, that are mostly independent of one another. In general, a tile may be either uncompressed (also termed expanded) or compressed. While the basic uncompressed tile size could be a variable, it is presently preferred to be fixed at 32 kilobytes, or 512 pixels by 512 pixels to conform with the Computer Aided Logistics Support (CALS) raster file format standard for binary images. (Note that the present invention allows binary and color images to coexist in a common image memory management system.)

In order to compensate for lower performance expected with a virtual memory management system for images, particularly when reducing large portions (by combining pixels) of the image for display, the present invention automatically maintains a series of reduced resolution copies, called subimages, of the full resolution image. Preferably, the resolution (i.e., pixels per inch) of each subimage is reduced by exactly half relative to the next higher-resolution subimage. Thus, the image stack 100 can be visualizing as an inverted pyramid, wherein the images can be stacked beginning with a full resolution subimage (or image) 102 at the top, followed by a half resolution subimage 104, then a quarter resolution subimage 106, and an eighth resolution subimage 108. (In FIG. 1, the subimages 102-108 are outlined by bolded lines.)

The subimages 102, 104, 106, 108 are superimposed on a set of tiled subimages 110a, 110b, 110c, 110d, respectively, defining sets of tiles. The extent of the image stack 100 ends at the resolution that allows the entire subimage to be stored within a single tile 108 (preferably 512×512 pixels square). Each lower-resolution subimage 104-108 is a faithful representation of the full resolution subimage 102 at all times, with the exception of certain times during operations that modify the appearance of the full resolution subimage 102.

FIG. 2 illustrates an 8½"×11", A-size mechanical drawing (to scale) as the full resolution subimage 102 showing a mechanical part 120a. Of course, other larger drawings such as, for example, D-size and E-size may be used by the present invention. Also, other image processing applications besides mechanical drawings may be used with the present invention including electrical schematics, topographical maps, satellite images, heating/ventilating/air conditioning (HVAC) drawings, and the like.

Figure 3:
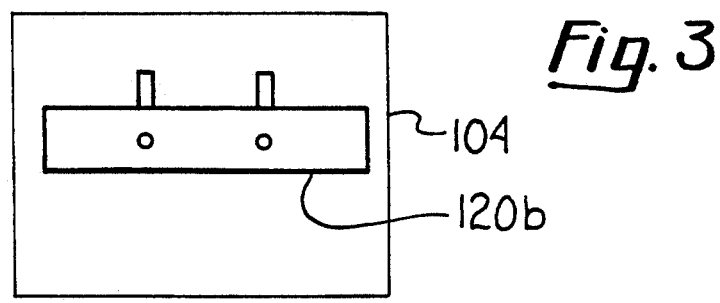
FIG. 3 is a half resolution image of the mechanical part shown in FIG. 2.
Figure 4:
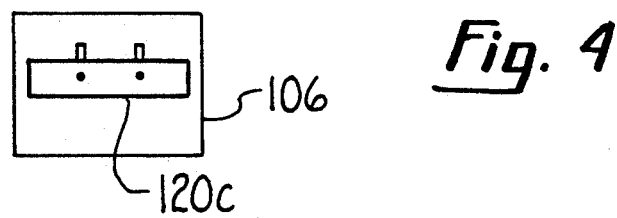
FIG. 4 is a quarter resolution image of the mechanical part shown in FIG. 2.
Figure 5:
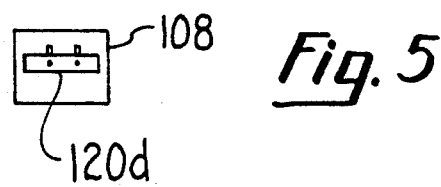
FIG. 5 is an eighth resolution image of the mechanical part shown in FIG. 2.

FIG. 3 illustrates the corresponding half resolution subimage 104 showing the half resolution part 120b. FIG. 4 illustrates the corresponding quarter resolution subimage 106 showing the quarter resolution part 120c. Lastly, FIG. 5 illustrates an eighth resolution subimage 108 showing the eighth resolution part 120d. In the preferred embodiment, reduced resolution subimages can be used any time that a reduction factor of 2:1 or higher would be used to scale a region of interest in the full resolution subimage 102 for display, plotting or copying.

The subimages 102–108 can be loaded from a source image file, if they exist, or they can be created on demand by the image memory management system of the present invention. The present invention includes editing capabilities that allow a user to trade off between "quick flash" pan/zoom performance and file size as measured by the number of reduced resolution subimages stored with each image. Depending on the application, the user will normally opt to store one or more reduced resolution subimages with each source image file.

The lower-resolution subimages, for example, subimages 104–108, are utilized by the image memory management system to produce the illusion of instant access to any region of the image at any scale factor (not just the scale factor of the overview subimage). Increasing the number of lower-resolution subimages gives a higher quality "first flash" image during panning and zooming and reduces the time to get the final version of the image to the screen.

Figure 6:
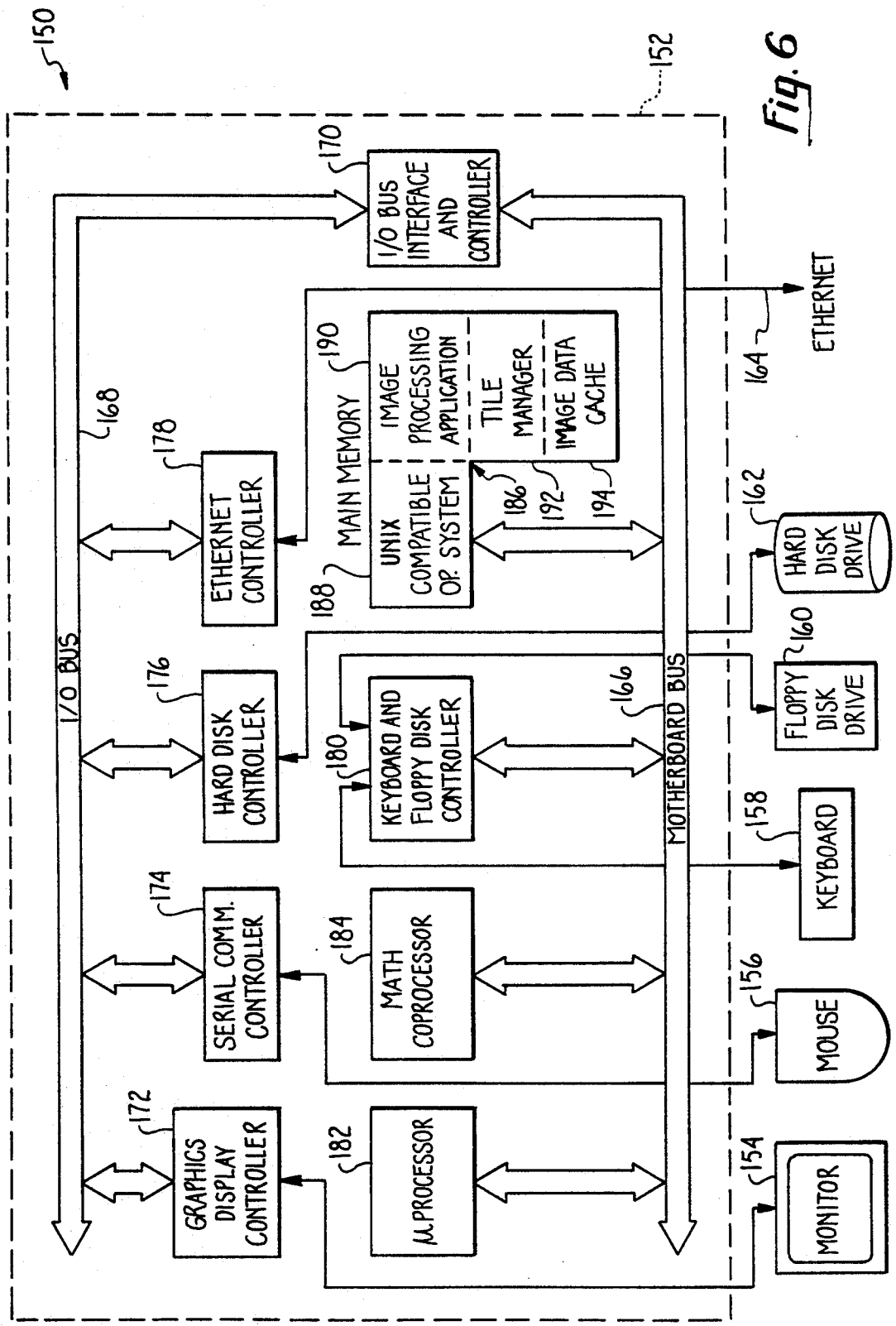
FIG. 6 is a block diagram showing one preferred embodiment of a computer system that includes the present invention.

FIG. 6 illustrates a computer workstation generally indicated at 150 which is representative of the type of computer that is used with the present invention. The workstation 150 comprises a computer 152, a color monitor 154, a mouse 156, a keyboard 158, a floppy disk drive 160, a hard disk drive 162 and an Ethernet communications port 164. The computer 152 includes a motherboard bus 166 and an I/O bus 168. The I/O bus 168, in one preferred embodiment, is an IBM PC/AT ® bus, also known as an Industry Standard Architecture (ISA) bus. The two buses 166, 168 are electrically connected by an I/O bus interface and controller 170.

The I/O bus 168 provides an electromechanical communication path for a number of I/O circuits. For example, a graphics display controller 172 connects the monitor 154 to the I/O bus 168. In the presently preferred embodiment, the monitor 154 is a 19-inch color monitor having a 1,024×768 pixel resolution. A serial communications controller 174 connects the mouse 156 to the I/O bus 168. The mouse 156 is used to "pick" an image entity displayed on the monitor 154.

The I/O bus 168 also supports the hard disk drive 162, and the Ethernet communications port 164. A hard disk controller 176 connects the hard disk drive 162 to the I/O bus 168. The hard disk drive 162, in one possible configuration of the workstation generally indicated at 150, stores 60 megabytes of data. An Ethernet communications controller 178 connects an Ethernet communications port 164 with the I/O bus 168. The Ethernet communications controller 178 supports the industry standard communications protocol TCP/IP which includes FTP and Telnet functions. The Ethernet communications port 164 of the preferred embodiment allows the Workstation 150 to be connected to a network which may include, among other things, a document scanner (not shown) and a print server (not shown).

The motherboard bus 166 also supports certain basic I/O peripherals. For example, the motherboard bus 166 is connected to a keyboard and floppy disk controller 180 which supports the keyboard 158 and the floppy disk drive 160. The floppy disk drive 160, in one present configuration, can access floppy disks which store up to 1.2 megabytes of data.

The fundamental processing components of the computer 152 are a microprocessor 182 such as, for example, an 80386 microprocessor manufactured by Intel, a math coprocessor 184 such as, for example, a 80387 math coprocessor also manufactured by Intel and a main memory generally indicated at 186 comprising, for example, 4 megabytes of random access memory (RAM). The main memory 186 is used to store certain computer software including a Unix compatible operating system 188 such as, for example, SCO Xenix licensed by Santa Cruz Operation of Santa Cruz, California, a subsidiary of Microsoft Corporation, an image processing application 190, a tile manager 192, and an image data cache 194. The image processing application 190 includes editing functions such as zoom and pan.

Another presently preferred computer workstation 150 having somewhat different processing components from those just described is available from Sun Microsystems, Inc. of Mountain View, California, under the tradename "SPARCstation 1". In such an embodiment, the UNIX compatible operating system would be licensed directly from Sun.

Although a representative workstation has been shown and described, one skilled in the applicable technology will understand that many other computer and workstation configurations are available to support the present invention.

Figure 7:
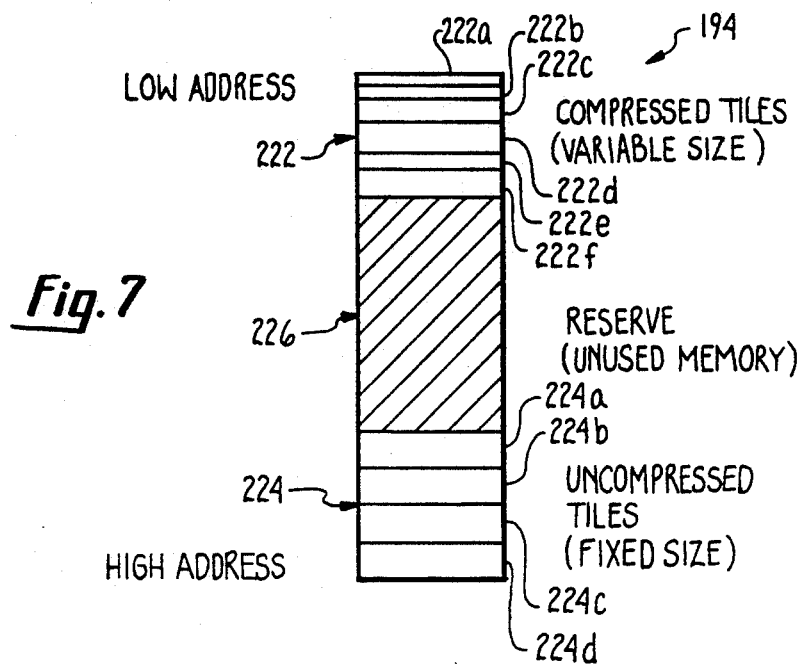
FIG. 7 is a memory map showing the general arrangement of cache memory according to the present invention.

FIG. 7 illustrates a representative configuration of the image data cache 194 some time after the tile manager 192 (FIG. 6) begins operation. A set of compressed tiles 222 are kept at the low addresses of the image data cache 194, and a set of uncompressed (or expanded) tiles 224 at the high addresses of the image data cache 194. The terms expanded or uncompressed are used interchangeably. In between the two sets of tiles 222, 224 is a reserved area 226 (free cache memory). As the operation of the tile manager 192 continues, the image data cache 194 becomes more unordered. As the cache requirement for compressed or uncompressed tiles increases, each set of tiles 222, 224 approach the reserve area 226 from each end. In fact, the reserve area 226 can become completely exhausted.

Since the memory management schemes that apply to compressed data allocation are very different from that of uncompressed data, it is desirable to keep the two sets of tiles 222, 224 separate. Compressed tiles are variable sized tiles (blocks of memory) 222a,b,c,d,e,f whereas the uncompressed tiles are all fixed sized tiles 224a,b,c,d and therefore the locations of the fixed sized tiles 224 are interchangeable. Linked lists of allocated memory are kept sorted according to size and address for compressed tiles. The number of linked lists is a variable number but presently there are about 64 different size categories for compressed tiles and only one size category for uncompressed tiles (for binary images).

To use the image data cache 194, the memory management functions begin by determining how much fast memory (RAM) and slow memory (disk or host memory) is available for image memory uses. When an image is loaded, the system allocates memory for image information and related tile directory structures. Cache management parameters are modified as necessary to balance the requirements for expanded tile and compressed tile cache memory. The expanded tile cache memory pool and the compressed tile cache memory pool allow tiles from different images to intermingle. Expanded and compressed tiles are kept in separate areas as much as possible so that memory allocation can be optimized for each of two different situations (i.e., fixed allocation block size versus variable size). However, the storage ranges of compressed and expanded tiles are allowed to mingle so as to maximize the flexibility of the cache usage.

Figure 8:
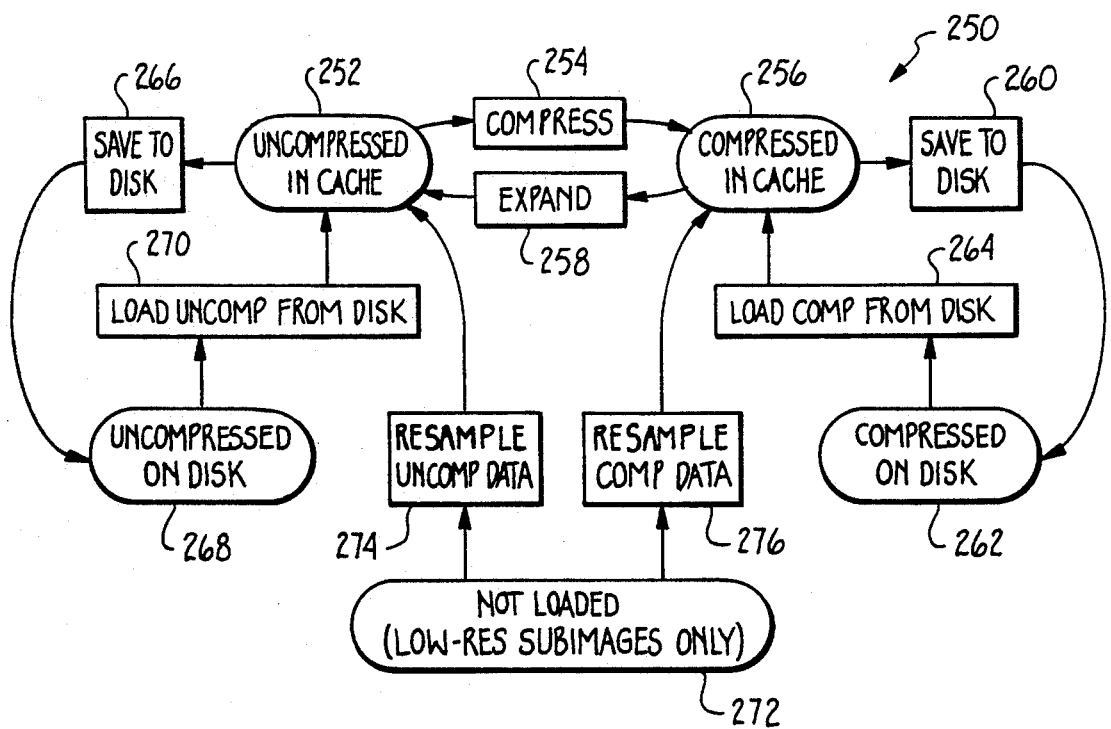
FIG. 8 is a state diagram defining the flow of tile data between different storage states according to the present invention.

FIG. 8 is a state diagram illustrating the flow of image data or tiles between different storage states 250. A tile can contain data in one or more of five states or forms as illustrated by ovals in FIG. 8. The possible forms are: uncompressed and resident in cache memory (state 252); compressed and resident in cache memory (state 256); uncompressed and resident on disk (state 268); compressed and resident on disk (state 262); "not loaded" but re-creatable using information from higher-resolution image tiles (state 272).

For most image access operations, the image data must be uncompressed and resident in cache memory 252. However, that form consumes the most cache memory of any of the five forms. Therefore, a primary function of the tile manager 192 is to transform image tile data between state 252 and the other states which consume less (in the case of state 256) or no cache memory whatsoever (in the cases of states 268, 262 and 272).

The eight transformation operations, shown in square boxes in FIG. 8, constitute the main computational operations associated with managing image memory. The operation "load compressed tile image data from disk into cache memory" 264 is typically the first operation performed on a tile because most pre-scanned images are stored in compressed form in disk files. (A discussion of this "virtual loading" is provided hereinbelow.) The load operation 264 is performed by the Load CompFromDisk function which simply copies data from the disk into cache memory. The disk location and number of bytes to read is stored in the tile header fields 368 and 376 shown in FIG. 10.

The function LoadCompFromDisk is normally used by the function LockCompHandle when the tile manager 192 needs to access the compressed form of data associated with a tile. LockCompHandle is analogous to LockExpHandle, described in FIG. 28. The LockCompHandle function is also included in source code form in the Microfiche Appendix, in the file tilealloc.c.

Compressed data in cache 256 can be written back to the disk by the operation 260. This is the reverse of the LoadCompFromDisk function. The present embodiment is capable of writing to disk in a wide variety of file formats. One skilled in the art can easily create a function to perform this task.

Compressed data in cache can be uncompressed (also termed "expanded") into another region of cache memory by the expand operation 258. The expand operation 258 is controlled by the "Expand Tile" function 440 which is described with respect to FIG. 33. The method of image compression varies according to image type (e.g. binary, 8-bit color, 24-bit color). Commonly used compression techniques include CCITT T.6 for binary images and CCITT SGVIII (draft standard) for color and gray-scale images. The ExpandTile function 440 selects the appropriate compression algorithm by referring to field 306 of the Document Information Structure shown in FIG. 9.

Uncompressed data in cache 252 can be compressed and written to a separate region of cache memory by the compress operation 254. The compress operation 254 is controlled by the CompressTile function 450 described with respect to FIG. 38. Like ExpandTile, the CompressTile function 450 uses an image compression algorithm appropriate to the image type.

Uncompressed data on disk 268 can also be read directly into cache memory by the load operation 270. The load operation 270 is performed by the LoadExpFromDisk function, which appears in source code form in the Microfiche Appendix, in file diskcach.c. The LoadExpFromDisk function is analogous to LoadCompFromDisk. The LoadExpFromDisk function refers to the fields 362 and 374 of the tile header 350 shown in FIG. 10, for the location and number of bytes of the expanded file data on the disk.

Uncompressed data in cache 252 can be written back to the disk by the save to disk operation 266. This operation is analogous to the save to disk operation 260 which operates on compressed data. The present embodiment can write compressed or uncompressed tile data to disk in a variety of formats. One skilled in the art can easily implement an equivalent function.

Image data for tiles in the "not loaded" state 272 must be constructed by resampling higher-resolution tiles. (During normal operation, only lower-resolution tiles can exist in this state—the full resolution subimage tiles are always "loaded".) The present embodiment provides two operations from the "not loaded" state 272 to the "loaded" state 252, 256. Uncompressed higher-resolution tile data is resampled to create uncompressed data in cache 252 by the resample operation 274. Similarly, in the resample operation 276, compressed data in cache 256 can be created from compressed higher-resolution tile data.

In both resampling operations, extensive advantage is taken of the fact that the resolutions of adjacent subimages in the subimage stack are related by a power of 2. This greatly simplifies and speeds the resampling operation. Basic resampling techniques are well-known (See, for example, A. Rosenfeld and A. C. Kab, *Digital Picture Processing*, Academic Press, 1976). The resampling operation 274 and 276 are controlled by the function LoadSubImTile 436 described with respect to FIG. 31.

In summary, FIG. 8 shows that a great part of the tile manager's utility derives from its ability to coordinate a variety of forms of image data in the course of complex image processing operations.

Generally, the way data starts out on the disk 162 is by loading a tiled image file into an application 190 via the tile manager 192. An image file, like a Tagged Image File Format (TIFF) or CALS tiled image file, for example, can be loaded instantaneously, in a virtual sense. In the tiled formats, there are tiled image data that is stored in the image file and at the beginning of the file there is a directory with entries that locate the tiles (for example, the disk file version of tile 0 in subimage 0, (0,0), is located at one address in the file and the disk file version of tile 1, subimage 0 (0,1) is located at another address in the file). When an image file is loaded, the tile manager 192 gets the tile offsets and stores them in the tile directory and does nothing else. Hence, the image file is basically loaded without copying any data from the disk 162 into the image data cache 194, and a directory is created that maps the tiles in the virtual image memory space onto the disk 162.

FIG. 9A illustrates a document information structure 300. Each image, or document, in the system is associated with (and described by) a document information structure (called "docinfo", defined in FIG. 9). The docinfo structure contains information about the image as a whole, such as color and pixel organization, etc. It also contains a list of subimages contained in the image. Each subimage entry in the docinfo structure contains information about that subimage, such as width and height, etc. The intention is to make this data visible only to cache management functions and low-level access functions. The overall docinfo data structure 300 contains the following information:

- 302 Self-reference to document handle. Handle value assigned to this document by the host procedure which created the document. This value is unique over the entire system.
- 304 "Overviews Invalid" flag. This flag is true if the document is in the middle of a write operation.
- 306 Cache image compression algorithm. Compression algorithm used by the memory manager for this image.
- 308 Image color type. How the image is displayed.
- 310 Bits per image pixel. Number of bits per image pixel.
- 312 Tile size information. Size of expanded tile in pixels. The tiles are assumed to be square.
- 314 Number of subimages in doc. Number of subimages maintained in this document. The minimum value is one (the full resolution subimage).
- 316 Input file info. Input raster file information.
- 318 Output file info. Output raster file information.
- 320 List of subimage headers. Array of pointers to subimage header structures 321. The first entry in the array is always the full resolution image. Each position thereafter corresponds to a 2× resolution reduction from the previous subimage.

The subimage header structure 321 is illustrated in FIG. 9B. Each subimage has its own entry with each field as follows:

- 312 Pointer to tile headers.
- 314 Pointer to tile directory. Pointer to array of pointers to tile header records. This two-dimensional table provides an easy way to access individual tile headers on a (row,col) basis.
- 326 Subimage width and height. The width (x extent) and height (y extent) of the document measured in pixels.
- 328 Number of tile rows & cols in subimage. Number of tile rows in the image and the number of tile columns (i.e., the number of tiles needed to span the height and width of the image).
- 330 Image stack index of this subimage. This is the position of the subimage in the docinfo structure subimage list. It can also be used to determine the factor by which the subimage resolution is reduced relative to the full resolution subimage.
- 332 Pixel resolution of this subimage. Scan resolution in pixels per millimeter.

FIG. 10 illustrates the tile header 350. The tile manager's analog to the conventional address translation table is the tile directory. The tile directory is a two-dimensional array of entries corresponding to the two-dimensional array of tiles that form the image. Each full and reduced resolution image has its own tile directory. The tile directory record contains a list of pointers to lists of individual tile headers. The list in the tile directory record has one entry for each row of tiles. Each of those entries points to a tile header record list with as many elements as tile columns. Thus, there is one tile directory record per subimage and one tile header record per tile. The tile header record defines the current state of the tile and contains information used by the cache management functions. The tile header contains the following information:

- 352 Pointer to document containing this tile. Pointer to the document to which this tile belongs.
- 354 Index of subimage containing this tile. Index of the subimage (i.e., image stack layer) that contains this tile.
- 356 Row and column indices of tile. Tile row and column position of this tile within the subimage.
- 358 Status information. Defines the current state of the tile. This includes lock counts for expanded and compressed tiles.
- 360 Preserve count. Value greater than zero means the tile is desired for future operation, so the tile should be preserved in cache if possible.
- 362 Location of uncompressed image data in cache memory. Location of uncompressed (expanded) image data for this tile (if it exists). Status flag "ExpCached" will be true to indicate that the data is currently in expanded tile cache memory.
- 364 Location of compressed image data in cache memory. Location of compressed image data for this tile (if it exists). Status flag "CompCached" will be true to indicate that the data is currently in compressed tile cache memory.
- 366 Location of uncompressed image data on disk. Location of uncompressed (expanded) image data for this tile (if it exists). Status flag "ExpOnDisk" will be true to indicate that the data is currently on disk.
- 368 Location of compressed image data on disk. Location of compressed image data for this tile (if it exists). Status flag "CompOnDisk" will be true to indicate that the data is currently on disk.
- 370 Link to next less recently used tile. Pointer to next older (less recently used) tile, not necessarily a tile in this image.
- 372 Link to next more recently used tile. Pointer to next newer (more recently used) tile, not necessarily a tile in this image.
- 374 Number of bytes of expanded data in tile.
- 376 Number of bytes of compressed data in tile.

Figure 11:
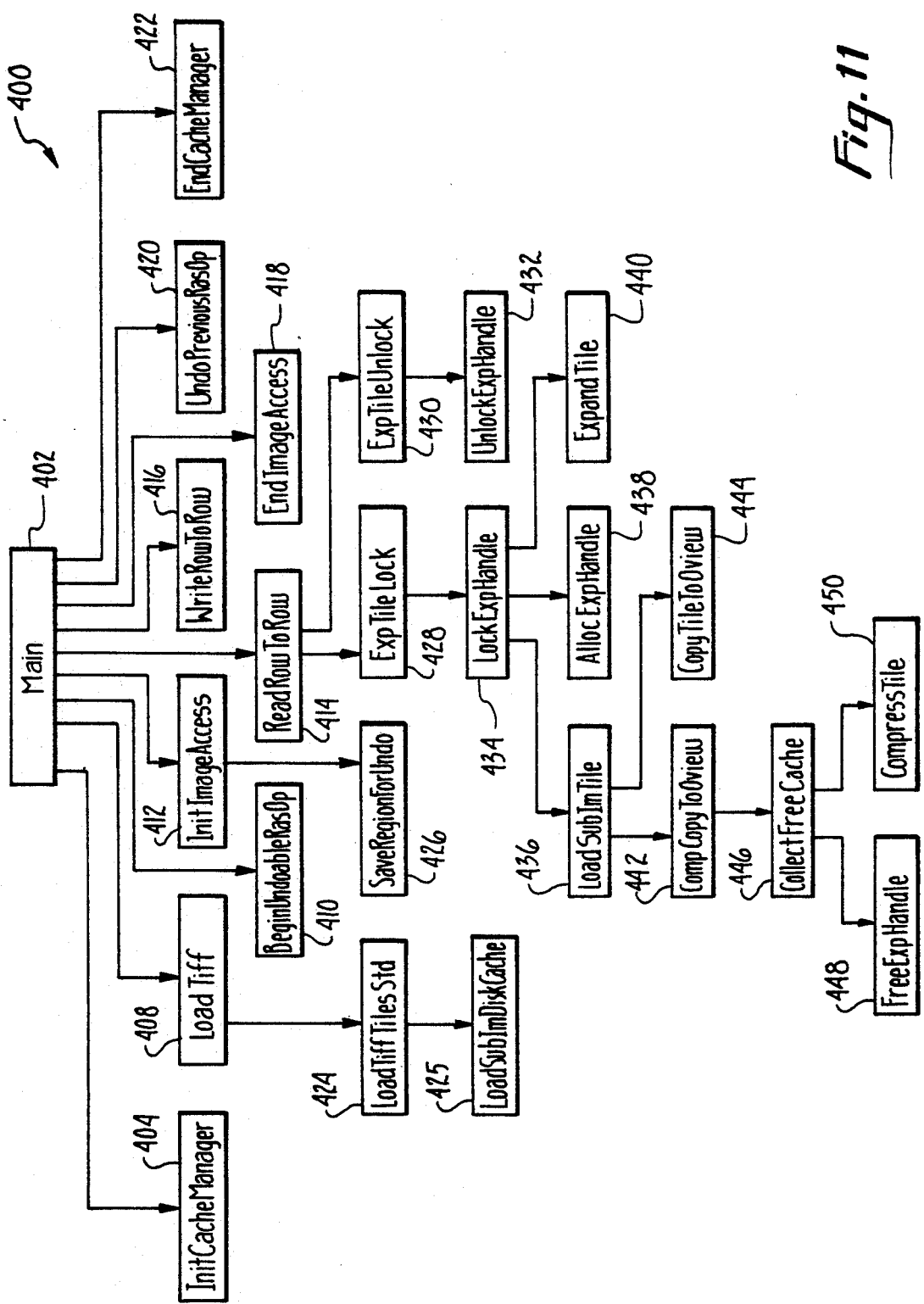
FIG. 11 is a diagram of a partial calling hierarchy for the various functions of the presently preferred embodiment of the tile manager of the present invention.

FIG. 11 illustrates a calling hierarchy 400 for the constituent functions. Further discussions relating to flow diagrams, herein, will include names which correspond to source code modules written in the "C" programming language. The object code is presently generated from the source code using a "C" compiler licensed by Sun Microsystems, Inc. However, one skilled in the technology will recognize that the steps of the accompanying flow diagrams can be implemented by using a number of different compilers and/or programming languages.

The top level in the program hierarchy is Main 402. Main initiates the functions calls to the lower level functions. Main embodies the top level control flow of the present invention.

The first function called by Main is Initialize Cache Manager 404 (InitCacheManager). InitCacheManager allocates the RAM and disk swap space needed for a particular raster image. It must be called before attempting to load any image tiles into memory.

The next function Main may call is Load Tiled Raster Image 408 (LoadTIFF). LoadTIFF manages the loading of tiled images. This is the process where an existing image file on disk is mapped into memory.

Main will then call the function Begin Undoable Raster Operation 410 (BeginUndoableRasOp). BeginUndoableRasOp marks the beginning of a distinct, "undoable" raster image operation. This function does not save any region of image memory but only creates a new entry on the undo stack. The current version of the tiles in the affected region are saved by InitImageAccess.

The following function called by Main is Create Image Access Context 412 (InitImageAccess). InitImageAccess prepares the tile cache manager for upcoming accesses to a particular region of the specified image. This function creates a data structure called an "access context" (defined in FIG. 16) that is used by the sequential access functions.

Main optionally calls the function Read Rows From Region 414 (ReadRowToRow) next according to the operation performed by the user. ReadRowToRow causes one input/output buffer row or strip to be read and transformed from tiled image memory as specified in the associated InitImageAccess call and the resulting access context.

The next optional function called by Main is Write Rows To Region 416 (WriteRowToRow), again according to the operation performed by the user. WriteRowToRow causes one input/output buffer row or strip to be transformed and written to tiled image memory as specified in the associated InitImageAccess call and the resulting access context.

It should be understood that other access functions, such as random pixel accesses, may optionally be called by Main.

Main then calls the function Close Image Access Context 418 (EndImageAccess). EndImageAccess terminates and discards an image access context. The memory allocated for the access context structure is freed. The tile manager is informed that the specified region of image memory is no longer needed by this operator.

The next function, Undo Previous Raster Operations 420 (UndoPreviousRasOp), is optionally called by Main. UndoPreviousRasOp restores the specified region to its original state using information from the undo stack.

The last function Main calls is Quit Cache Manager 422 (EndCacheManager). EndCacheManager frees the RAM and disk swap space. This function basically reverses what InitCacheManager does.

The second level of functions on the calling hierarchy 400 is shown starting with Load TIFF Subimage Tile Information into Tile Headers 424 (LoadTiffTilesStd) which is called by function LoadTIFF 408. LoadTiffTilesStd manages the loading of TIFF images with strip structure.

The LoadTiffTilesStd function 424 calls a function Store Tile Information in Tile Headers 425 (LoadSubImDiskCache). LoadSubImDiskCache loads the tile directory of the specified subimage with information about the location, size and format of individual image tiles contained in a disk-resident tiled image file. It is the low-level interface for the "indirect file load" capability. The tile headers are assumed to be completely zeroed when this function is called.

The InitImageAccess function 412 calls a function Save Region For Undo 426 (SaveRegionForUndo). SaveRegionForUndo saves the specified region on the undo stack. It is called from within InitImageAccess if the SaveForUndo flag is true. It can also be used for low level operations that do not go through InitImageAccess. SaveRegionForUndo can then be called multiple times for different documents and different regions within a document so that arbitrarily complex editing operations can be easily undone.

The ReadRowToRow function 414 calls a function Lock Expanded Image Tile Group 428 (ExpTileLock). ExpTileLock "locks" memory handles referring to expanded image tiles. (The notion of locking and unlocking memory blocks is further discussed below with reference to FIG. 14.) It also updates the associated tile header structure as appropriate for the operating system.

The ReadRowToRow function 414 also calls a function Unlock Expanded Image Tile Group 430 (ExpTileUnlock). ExpTileUnlock unlocks memory handles referring to expanded image tiles. It also updates the associated tile header structure as appropriate for the operating system.

The function ExpTileUnlock 430 calls a function Unlock Expanded Tile 432 (UnlockExpHandle). UnlockExpHandle unlocks an individual expanded tile handle. The lock count is decremented as appropriate. The tile is not actually swapped out of cache at this point but it becomes a candidate for swapping.

The function ExpTileLock 428 calls a function Lock Expanded Tile 434 (LockExpHandle). LockExpHandle locks an individual expanded tile handle. The lock count is incremented and the status flags are set as appropriate.

The LockExpHandle function calls a function Create Tile From Higher-Resolution Tiles 436 (LoadSubImTile). LoadSubImTile creates a valid expanded version of the specified tile by scaling down from the next higher-resolution subimage. This function is called recursively as necessary to get to a higher-resolution subimage where there is valid data. (Note: the tiles in the full-resolution subimage are always valid and loaded although not necessarily present in the cache memory.)

The function LockExpHandle 434 next calls a function Allocate Space for Uncompressed Version of Tile 438 (AllocExpHandle). AllocExpHandle allocates space in cache memory for a single expanded tile.

The function LockExpHandle 434 also calls a function Create Uncompressed Version of Tile From Compressed Version 440 (ExpandTile). ExpandTile uses a tile that exists in compressed form but not expanded form, allocates space for an expanded tile and decompresses the image data into that space.

The function LoadSubImTile 436 calls a function Create Compressed Lower-Resolution Tile From Compressed Higher-Resolution Tiles 442 (CompCopyToOview). CompCopyToOview creates a valid compressed version of the specified tile by scaling down from compressed or expanded version of the given higher-resolution subimage tiles. The function LoadSubImTile 436 also calls a function Copy Uncompressed High-Resolution Tiles to Uncompressed Low-Resolution Tile 444 (CopyTileToOview). CopyTileToOview updates the region of the next lower-resolution overview corresponding to the specified tile.

The Function CompCopyToOview 442 calls a function Collect Freeable Cache Memory 446 (CollectFreeCache). CollectFreeCache collects freed memory states or enlarges the cache file and adds the new memory capacity to the reserve list. This function is called when the cache manager usage exceeds preset limits. Therefore it makes sense to take time to free up as much memory as is convenient at this opportunity.

The function CollectFreeCache calls a function Free Uncompressed Version of Tile 448 (FreeExpHandle). FreeExpHandle frees space used for storage of expanded image tiles.

The function CollectFreeCache 446 also calls a function Create Compressed Version of Tile From Uncompressed Version 450 (CompressTile). CompressTile uses a tile that exists in expanded form but not compressed form, allocates space for a compressed tile and compresses the image data into that space.

Figure 12:
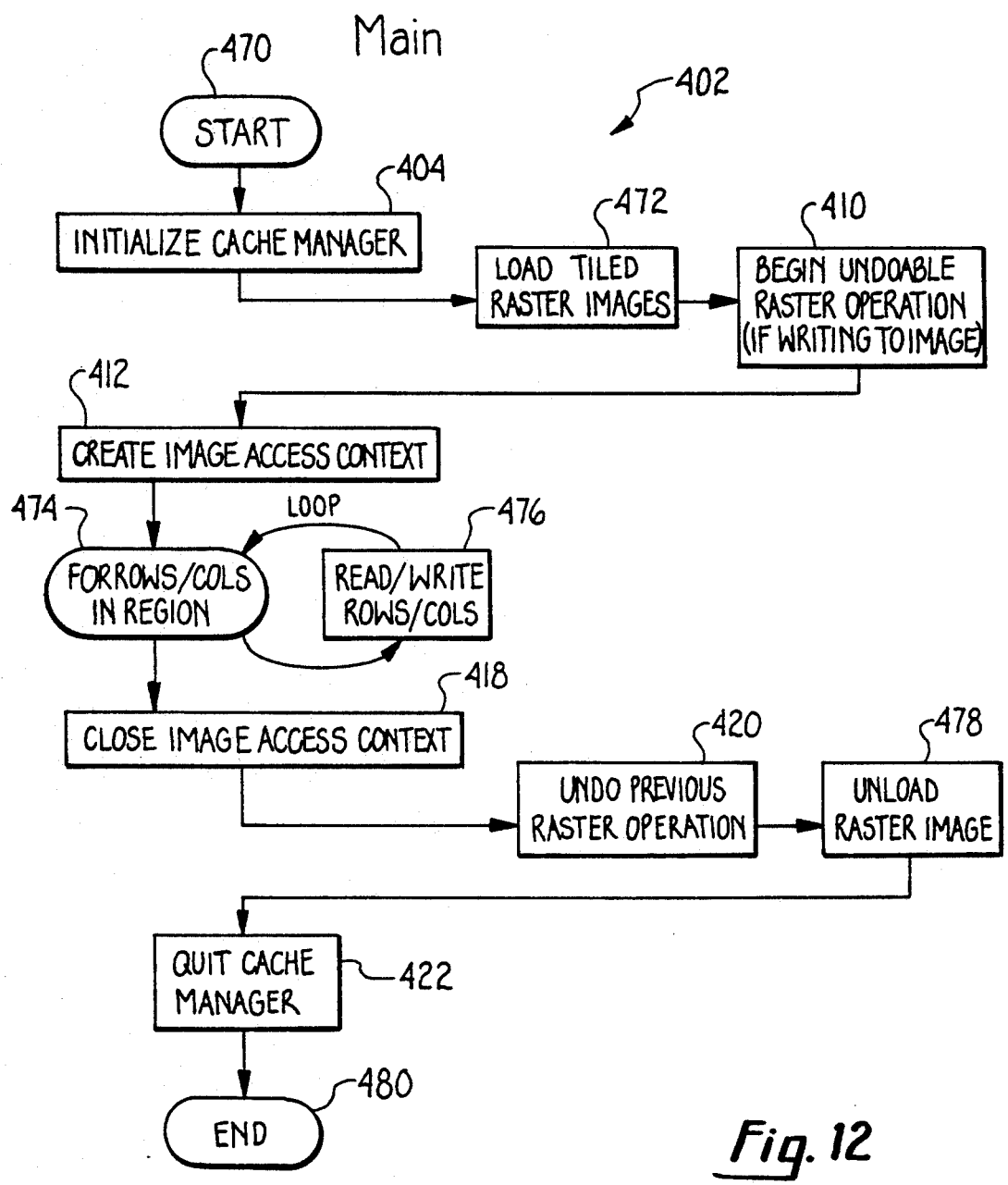
FIG. 12 is a flow diagram of one preferred embodiment of the tile manager.

FIG. 12 is the top-level control flow for the tile manager 192 (also called "Main"). The tile manager 192 can be executed on a number of operating systems or without an operating system. However, the workstation 150 (FIG. 6) preferably includes the Unix compatible operating system 188. Another preferred operating system is Microsoft MS-DOS running with or without Microsoft Windows 3.0.

Moving from a start state 470 to an initialization state 404, the tile manager 192 performs an initialization of the image data cache 194 to determine the available memory space, or the amount of physical RAM and disk space available for a cache "file". At this point, the cache appears to the tile manager 192 as one contiguous range of physical addresses in memory. If the tile cache has already been initialized, this step is skipped. The possibility of multiple image access contexts (discussed below) allows multiple simultaneous requests.

The tile manager 192 has another parameter which is called the fast memory portion of the image data cache 194. This parameter is particularly relevant when working on top of another virtual operating system such as Unix. The fast memory limit specifies approximately how much of the image cache file is actually kept in RAM memory at any moment by the native operating system (e.g., Unix). The balance of data (the less recently used portion) is likely to have been swapped out to the disk. The tile manager attempts to limit the amount of cache space used to store expanded tiles to less than the fast memory limit, but the limit can be exceeded if necessary with some degradation in performance. However, the total cache size limit is never exceeded. In operating systems without virtual memory capabilities built in (e.g., MS-DOS), the fast memory limit is the same as the total cache size limit.

Then the tile manager 192 moves to a function 472 wherein the tile manager 192 loads a tiled raster image file. The function 472 (comprising the function 408, for example) loads any type of image file, and preferably a tiled image, into the memory address space configured by the tile manager 192. If the image to be modified is already loaded, this step is skipped. Then the tile manager 192 moves to a function 410 where the tile manager 192 marks the beginning of an undoable raster operation if the tile manager 192 is writing to the image. The function 410 is an optional state and it is only used if the user wants to be able to undo the operation that modifies the image.

Any time that a region of the image needs to be accessed (for reading or writing) an image access context is created. This image access context is used to define the region for use by the tile manager. The creation is performed automatically by the file manager without effort by the user. For example, an image access context is created when the user draws a line in a region of the image.

Referring back to FIG. 12, the tile manager 192 transitions to a function 412 to create the image access context. The image access context contains all of the state information about the access operation. It is possible to have multiple access contexts opened simultaneously with each access having stored state information contained in the access context. Thus, the tile manager 192 is re-entered and re-used by interleaved operations without confusion due to the unique access contexts of each image operation.

The tile manager 192 proceeds to a loop state 474 wherein the tile manager 192 begins a FOR-loop for all of the rows or columns in the region. The FOR-loop is executed multiple times if the operation specified by the user is a row or column strip oriented access. Strips are composed of one or more rows or one or more columns of data. For each of the strips, the tile manager 192 reads or writes the rows or columns of data in the strip in a function 476. The function 476 actually comprises a set of functions including ReadRowtoRow 414 (FIG. 11) and WriteRowtoRow 416.

When the tile manager 192 has processed all the row and columns in the region, the tile manager 192 moves to a function (EndImageAccess) 418 where the tile manager 192 closes the image access context which frees all of the temporary buffers that were allocated for the image access context.

The tile manager 192 transitions to an undo previous raster operation function (UndoPreviousRasOp) 420. This causes a modified image to revert to its previous state. The image tiles that had been modified are replaced by their original versions. This again is an optional step that the user initiates, if a mistake is made.

If the raster image is required for future operations, the tile manager moves to state 422. Otherwise, moving to a state 478, the tile manager 192 unloads the raster image. Unloading the raster image simply frees the memory that had been associated with that particular raster image. This is not a save raster image operation which would be slightly more complicated, but a save operation could be executed here. Of course, the image processing application 190 supports loading and saving raster images.

If more operations will be performed the tile manager moves to state 480. Otherwise, from state 478, tile manager 192 moves to a quit cache manager function (EndCacheManager) 422. Herein, the tile manager 192 frees the image data cache 194 (FIG. 6). Presumably, all of the images have been unloaded as in the state 478 so that this operation frees the image data cache memory and prepares the system for shut down. Lastly, the tile manager 192 terminates at an end state 480.

FIG. 13 illustrates the initializing of the cache manager function 404. The function 404 is entered by the task manager 192 at a state 488. Then, moving to a state 490, the task manager 192 initializes the cache usage variables. Of course, in the beginning, all of the cache space is available for use, in what is called the free-memory reserve list. That is, no cache memory is being used for expanded or compressed image data.

At state 492, the task manager 192 allocates tile cache memory by requesting a portion of the address space from the memory space owned by the operating system. In a virtual memory system such as Unix, the request is handled by memory mapping a large file. The operating system does not allocate any memory, but it reserves an address space. Moving to a state 494, the task manager 192 allocates a common blank tile. When dealing with binary images, space is reserved for one blank tile, which is kept around at all times for common usage by any number of operations, or access contexts.

At state 496 a compression buffer is allocated to be used as a scratch buffer when compressing data since, in general, the size of the resulting compressed data is unknown before a tile of image data is compressed. Hence, compressed data blocks will be variable sized. The tile manager 192 then exits the InitCacheManager function 404 at an end state 498.

FIG. 14 illustrates a general memory state diagram with reference to a block of memory being "locked" or "unlocked". In the diagram, ovals are states and rectangular blocks are operations.

The state diagram is entered at a start state 502 by a new memory block. There are three basics states. "FREE" is a state 504 where there is no memory allocated. Actually, a block of memory is considered free if it is in one of the memory free lists, i.e., the "reserve free list", the "compressed free list" or the "expanded tile free list". It should be understood that the free list for the compressed tiles are actually composed of many lists based on the varying sizes of memory blocks.

Within a tile header (FIG. 10) the tile manager 192 controls a memory handle which is a structure that has a pointer to (or location of) image data in the cache and a lock count (not shown) for both compressed and expanded versions of a tile.

A memory block transitions from the free state to unlocked, but allocated is through a state 506 for allocating the memory handle, which moves the block out of the free list and into use by a tile. As opposed to free, unlocked means that the memory block contains valid data and that it is associated with a tile but not currently being accessed. That is, the block is not being read or written at the time.

Now, the tile is unlocked at a state 508 but it contains valid data. Therefore, the next step is to lock the block, or lock the memory handle at a state 512 and then it becomes a locked memory state at a state 514. That means it contains valid data and it is currently in use. The block can be locked more than once, each time just incrementing the lock count.

The lock count may be incremented multiple times, for example, when two access contexts (operations) are accessing the same region of memory. Hence, both contexts lock the block of memory or tile by incrementing the lock count. When the first access context is done it decrements the lock count. But the tile manager 192 knows that that tile is still in use by an access because the locked count is still non-zero.

The inverse operation is to unlock the handle at a state 516 and as long as the lock count is not decremented to zero at state 518, it stays locked. Once the lock count is decremented to zero, it becomes unlocked again at the state 508.

An unlocked tile is fair game for the tile manager 192 when the memory manager needs to find some space to lock a new tile. Therefore, when the tile manager 192 is looking for space, unlocked memory blocks may be freed and returned to the free memory lists.

The way to go from the unlocked state 508 to the free state 504 is by freeing the handle in which case the memory block is moved onto the free memory list.

Figure 15B:
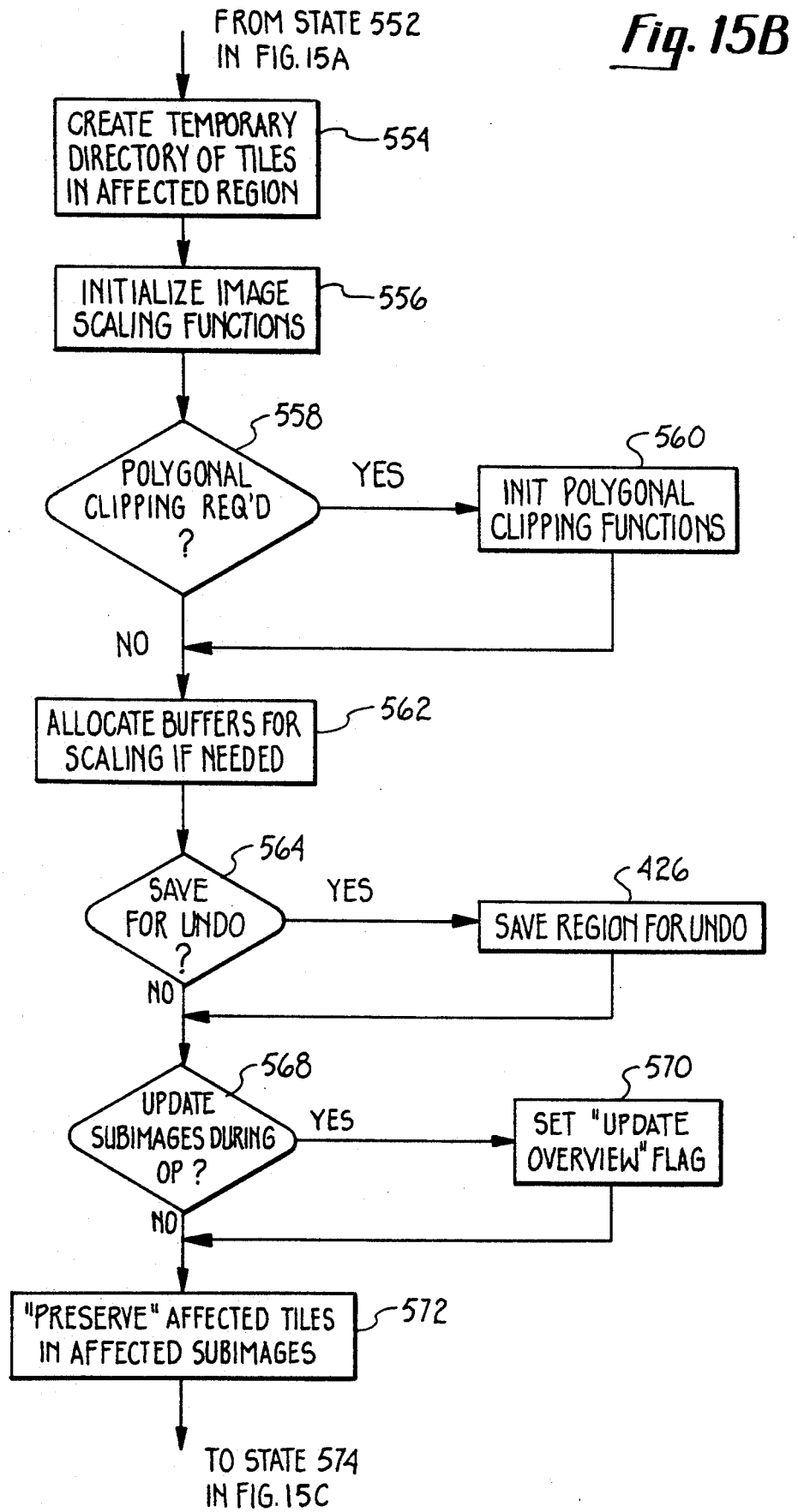
Figure 15C:
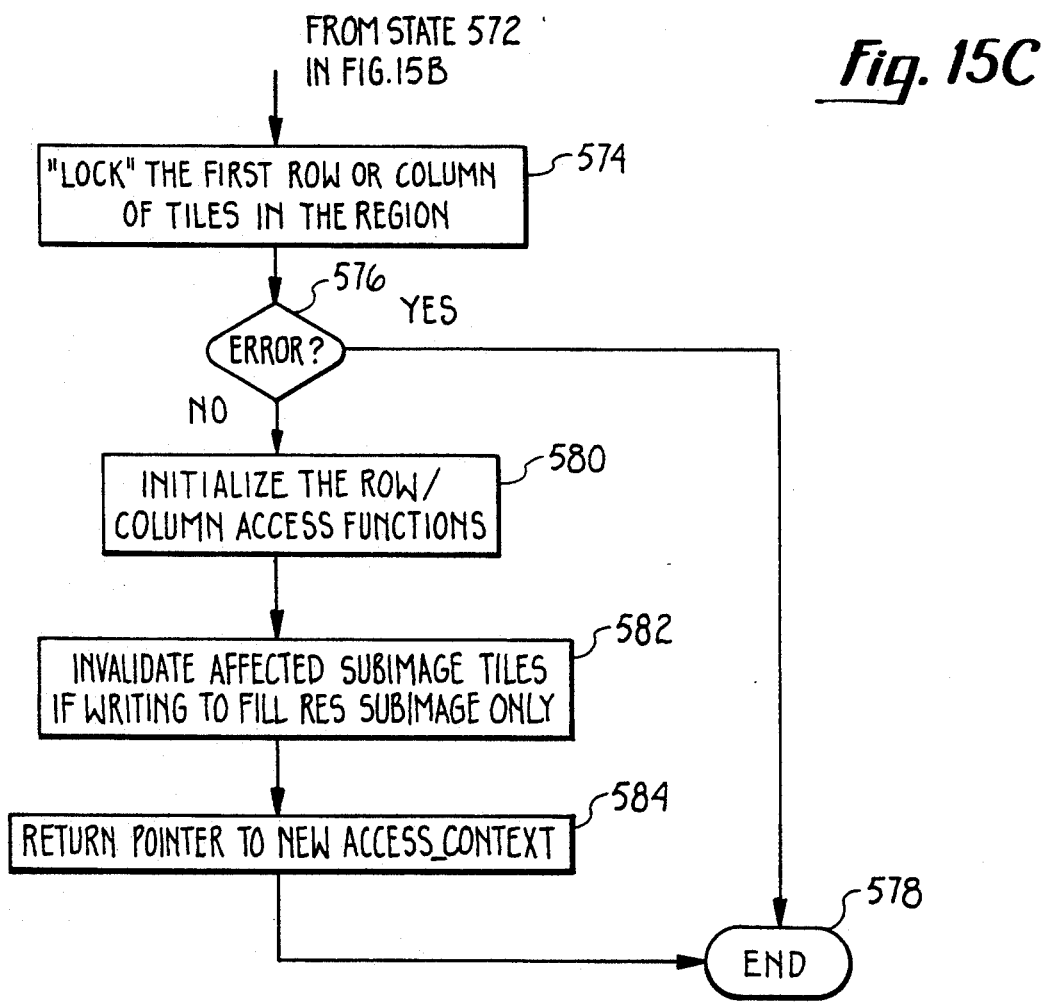

Referring now to FIG. 15, the flow diagram for the InitImageAccess function 412 shows the operation where the tile manager 192 creates the image access context starting at a state 530. At a state 532 the input parameters are validated. If there is an error with the input parameters, the function ends immediately at an end state 534.

Input parameters include a document handle indicating which image that the user wants to read or write from. Thus, the document handle must be validated. Another parameter is whether the user wants to read or write to the image. A transformation matrix, also input, basically directs how to scale, rotate, shear, etc., the image data.

If the input parameters are valid, the tile manager 192 locks the document handle at a state 536. The document handle locks and unlocks just like other structures and resources in the tile manager and it prevents one user of a particular document or image from modifying or deleting that image while another operation or another access context is still using that document.

Then, at a state 538, the tile manager 192 tests whether a non-orthogonal rotation has been specified. For example, a rotation of 30° causes the tile manager 192 go into a special operation that initializes the access with rotation. That also creates an access context but after a more involved process. Then the tile manager 192 ends the function 412 at a state 534 with a valid access context for rotations.

If an orthogonal rotation is specified then the tile manager 192, allocates a conventional access context at a state 542. Then the tile manager 192 continues to a decision state 544 wherein the subimage selection criterion is specified. For instance, the user may request the "low resolution" option which selects the lowest resolution subimage in the document's image stack. (In the context of an image editor, this may be the best solution during zooming or panning.) The user may also specify "most available"—i.e., whatever subimage has tiles currently in cache memory, regardless of the resolution. In either case, the tile manager 192 proceeds to a state 546 to select the reduced resolution subimage that is appropriate to that particular choice, i.e., either the one that has the resolution just greater than what was requested or a subimage whose tiles covering the access region are currently in cache. Now, at a state 548, the tile manager 192 adjusts the transformation matrix so as to now refer to the reduced resolution subimage rather than the full resolution subimage by adjusting scale factors.

Alternatively, if the state 544 determines that the full resolution subimage is selected then the transformation matrix is unchanged. Proceeding to a state 552, the pixel and tile limits of the affected image region are calculated. Knowing these limits, in a state 554, the tile manager 192 creates a temporary directory for the tiles in that region. This directory is a two-dimensional array that references the tiles that contains the affected pixels. Later on the tile manager 192 refers to the region tile directory because it is specific to tiles that are inside the affected region.

The tile manager 192 then initializes the image scaling functions in a state 556. Such scaling functions presently used are the subject of applicant's concurrent application entitled "Process for High Speed Rescaling of Binary Images" (U.S. Ser. No. 08/014,085, filed Feb. 4, 1993, which is a continuation of Ser. No. 07/949,761 filed Sep. 23,1992, now abandoned, which is a continuation of Ser. No. 07/693,010 filed Apr. 30, 1991 now abandoned.

Moving on, the tile manager 192 tests whether polygonal clipping is required at a state 558. For example, a request may be made to only read from within a specific polygonal region. If that is the case, the tile manager 192 initializes the polygonal region clipping functions in the tile manager 192 by passing in the boundary lists. The polygonal clipping function translates the boundary lists into edge lists that are used to very efficiently read out the rows or columns of data.

For example, suppose a "flood" request is made to turn all of the pixels black within an octagonal region. One way to accomplish the operation is to specify the points of the corners of the octagon in image coordinates and pass that in with the initialization of access context request, which would pass those vertices of the polygon into the polygonal clipping function set up function.

Then the tile manager 192 comes to a state 562, where the tile manager 192 allocates buffers for scaling, if necessary. This is the situation where intermediate copies of the rows or columns of data may need to be kept during the process of scaling. Then the tile manager 192 tests whether the user specified that the region needed to be saved for undoing, at a decision state 564.

An important feature of the present invention is an "undo" operation that is integrated with the image memory management so that only compressed tiles need to be saved after an undoable edit operation. In this way, a user can easily and quickly retract an edit operation that is no longer desired. For example, in mapping applications, e.g., USGS Quadrangle maps, the impression of a very large map is desired, but it is really composed of smaller map quadrants that were separately scanned, trimmed, adjusted and fit together. The smaller maps can be visually and logically joined into a single, large image. Using the present invention, a user can add a feature, such as a new sub-division, town, or road, that crosses a map boundary, specifying that the feature is undoable. Later, the user can remove the feature modification to the image by specifying the undo operation.

Now at a decision state 568, the question is whether to update the subimages during the operation. If this is a write operation the tile manager 192 always writes into the full resolution subimage and the changes "trickle down" into the low resolution subimages. But the tile manager 192 has an option as to whether the lower-resolution tiles are updated during the modification operation or later when the tiles are requested for viewing operations. There are advantages in doing them both ways.

For example, if the affected region is small, it is more efficient to update the subimages while progressing through the operation. In this mode, when the tile is unlocked, the manager 192 immediately copies the data down into the next lower subimage tile but only one of the corners of the tile is affected. Thus, only portions of the low resolution subimage tiles need to be modified.

If, however, the subimages are not updated during the operation, then as soon as the image access context is created all of the subimage tiles that overlap the affected region are invalidated (they become "not loaded"). Hence, when the memory manager goes to access them again at some later time, it has to reconstruct them from the higher-resolution tiles. The advantage of that is that the memory requirement at any one moment is half of that of if the tile manager 192 was updating all of the tiles simultaneously. In this way, the tile manager 192 sets a flag at a state 570.

In state 572 the tile manager 192 "preserves" the affected tiles in the affected subimages. Again, it relates to whether the tile manager 192 is updating subimages or not. If the tile manager 192 is reading, then it preserves only the tiles in the region of the subimage that will be accessed.

The ability to "preserve", or preferentially retain tiles that will be accessed in the course of the operation, is an important feature of the present invention that can yield significantly higher performance in certain situations where memory capacity limitations are encountered. When a tile is "preserved" for a particular access operation, it's preserve count 360 is incremented. The cache manager treats tiles with non-zero preserve counts differently from tiles with zero preserve count. The cache manager will discard unlocked unpreserved tiles before discarding older preserved tiles. (The cache manager normally discards older or less recently used tiles before discarding newer or more recently used tiles.)

Then, within the creation of the access context, the tile manager 192 actually locks down the first row or column of tiles in the region to establish the cache memory requirement for this operation, at a state 574. If this succeeds, then the caller is assured that there will be sufficient cache space for the entire operation.

The tile manager 192 can perform row or column accesses. However, the following discussion only refers to a row access.

Then, at a decision state 576, if the tile manager 192 cannot satisfy the request to lock down that first row of tiles, the function 412 terminates at the end state 578. Otherwise, at state 580 the tile manager 192 initializes the row access functions.

Now, once the tile manager 192 has initialized the row access function in state 580 the tile manager 192 invalidates the affected subimage tiles if the tile manager 192 is writing to the full resolution subimage at a state 582. Finally, in a state 584 the tile manager 192 returns the handle or a pointer to this access context to the user. From then on the user just uses this pointer to the access context and pointers to input and output buffers to get the next row or column of data.

FIG. 16 illustrates the access context structure 600. The structure 600 operates on a high level to hide the low level operation from the user and contains bookkeeping information along with some memory management information. The access context 600 contains the following information:

602 Pointer to affected doc. Pointer to the document being accessed.
604 "Subimage Choice" option value. Specifies how to choose which of the subimages will be read from or written to.
606 Index of affected subimage. Index of the specific subimage directly affected by this access context.
608 Access quantum. Specifies "granularity" of image access.
610 Read/write option. Specifies what type of image memory accesses to prepare for (e.g., read or write).

612 Basic orthogonal rotation value. Specifies the image rotation in terms of how the bits in each buffer row are read from or written to the image (e.g., write buffer row to image column with increasing "y" coordinate).

614 Pixel combination operation. Specifies the pixel operation performed when combining the buffer contents and image contents. The results of the operation are stored in the output buffer when reading. The results go into image memory when writing.

616 Scaler type operation. Specifies the type of scaler preferred. In other embodiments, this may include fast low-accuracy scaling and line width-preserving scaling.

618 "Update overviews" flag. True flag indicates overview subimages should be updated in the course of this modification of the full resolution image. This causes the overviews to be correct when the access is complete.

620 I/O buffer width & height. Width (i.e., row length), total number of rows to process and pitch in pixels of the input/output bitmap.

622 I/O buffer pitch (bytes/row). Pitch of the input/output buffer in bytes used for multi-row accesses. The input/output buffer is assumed to be a contiguous memory bitmap at least as large as the access quanta. It is always read or written in the natural order (by rows, low address to high). Flipping and rotation is always done on the image memory side.

624 I/O buffer bit offset to start of run. Indicates where the buffer's x=0 pixel lies within the first long word of the buffer's storage space. It must be between 0 and 31 inclusive. This parameter allows the caller to match up with arbitrary bit alignments.

626 Rows per strip (for AQ_STRIP access quantum). When operating in the AQ_STRIP mode, this specifies the maximum number of rows per input/output strip. Fewer rows may be written into the last strip if the end of the access region is hit before the strip is filled.

628 Number of I/O buffer rows yet to be processed. This variable is used in the access routines to keep track of the number of input/output rows remaining for the access operation.

630 Pointer to access function used in "SeqBufImageAccess". Pointer to the image access function that is tailored to the specific access mode requested.

632 Stepping directions for image row and column indices. The stepping increment each time the input/output buffer is advanced one row and one pixel. The allowed values are +1, 0, and −1.

634 Pointer to polygon clipping information. Refers to an edge table structure for controlling polygonal boundary clipping.

636 Pointer to raster scaling information. Tile level access information used by lower level modules in the course of the operation.

638 Pointer to uncompressed data in currently locked tiles. Pointer to an array of pointers directly into expanded tile image data. This list is used to accelerate sequential access into image memory. As each new tile row or column is encountered in a sequential access, this array is set to point directly into the affected tiles, which have been brought into cache memory and locked down. In other embodiments this could also be used to point to compressed tiles.

640 Pointer to region tile directory. Pointer to a 2-dimensional array of pointers to the tiles in the affected region of the subimage.

642 Next image row & column to be accessed. The index of the next image row and column to be accessed in sequential row and column operations.

644 Terminal row & column of access region. Stopping values for sequential row and column operations.

646 Unclipped extent of access region. Defines the image region that will be accessed over the course of the operation.

648 Clipped extent of access region. Defines the portion of the requested image region that actually falls within the boundaries of the image. Pixels outside of this rectangle are treated as background pixels.

650 Clipped image buffer bit offset and length. These values specify where, in the intermediate image row or column buffer, the first bit from the clipped image region is located and how many bits are to be read from or written to tiled image memory.

652 Number of tile rows & cols in access region. Number of tile columns and rows in the affected region.

654 Row & column of currently locked tiles. Column and/or row index of the currently locked tile or tiles.

656 Image row & col at origin of first tile in access region. Pixel coordinates of the upper-left pixel in the upper-left tile of the affected region.

658 Number of I/O buffer rows held over for next strip. Number of rows of output data that did not fit into the previous row and must be returned in the next and subsequent rows when expanding while reading image data.

660 Pointer to image tiling/untiling buffer. Points to a temporary buffer to hold data extracted from tiled memory prior to scaling when reading from image memory.

662 Number of bytes in tiling/untiling buffer. Size of buffer in bytes.

664 Bit offset for tiling/untiling buffer. Bit offset to the first valid pixel in tiling/untiling buffer.

666 Access transformation matrix. The transformation matrix mapping input/output buffer pixels onto the pixels of this subimage.

Figure 17A:
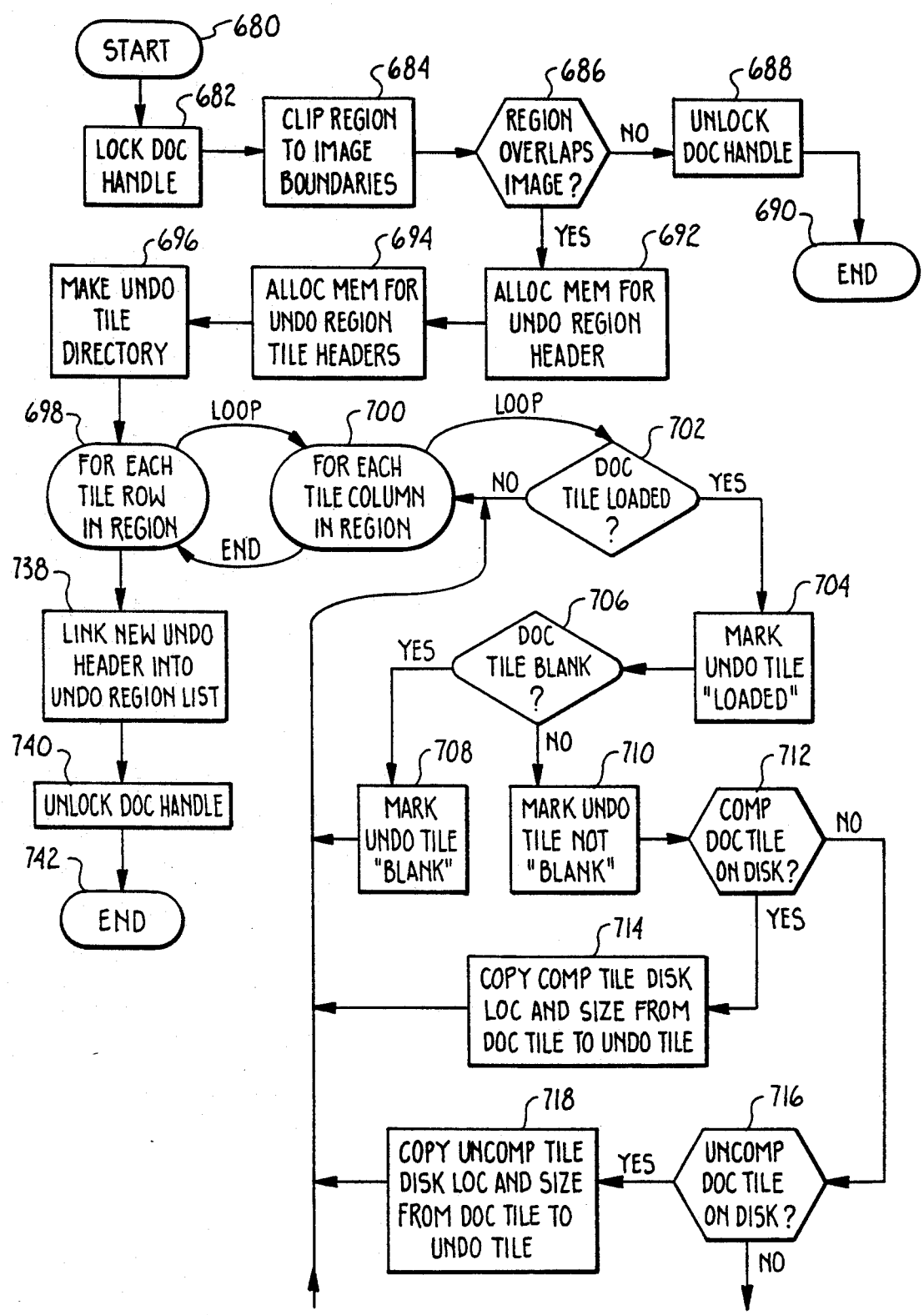
FIGS. 17A and 17B are a flow diagram defining the "save region for undo" function referred to in FIG. 15B.

FIG. 17 illustrates the flow diagram for the "Save Region for Undo" function 426 as referenced in FIG. 15. The tile manager 192 starts at a state 680, moves to 682 where the tile manager 192 locks the document handle of the affected document that contains the region to save for undo. The tile manager 192 can save multiple regions from multiple documents sequentially and then undo them all in one operation later. Thus, the application programmer is allowed to easily undo multiple-region operations with a single undo call at a later point.

Moving to a state 684, the tile manager 192 clips the modified region to the image boundaries since there is no information to save outside of the image. Then the tile manager 192 moves to a decision state 686 wherein the tile manager 192 tests whether the affected region overlaps the image. If there is no overlap, that is to say, there is no image data to save, then the tile manager 192 moves to a state 688 where the tile manager 192 unlocks the document handle and terminates the function 426 at an end state 690.

If, however at state 686, the modified region does overlap the image, the tile manager 192 moves to a state 692 wherein the tile manager 192 allocate memory for an "undo region header". The undo region header is similar to a document header, but reduced comparatively in the amount of data conveyed therein. The undo region header will be associated with tile header information, etc.

The tile manager 192 then moves to a state 694 where the tile manager 192 allocates memory for "undo region tile headers". These tile headers will be used to store copies of the original versions of the tiles in the affected region. The tile manager 192 then proceeds to a state 696 wherein the tile manager 192 makes an "undo tile directory".

Then the tile manager 192 moves to a loop state 698 where the tile manager 192 loops for each tile row in the region. The tile manager 192 then transitions to a loop state 700 wherein the tile manager 192 loops again for each tile column in the region (Thus, there is a two-dimensional loop.)

The tile manager 192 moves from the state 700 to a decision state 702 where the tile manager 192 checks to see if that particular tile in the document is loaded in the image cache memory. If the tile is not loaded, the tile manager 192 skips to the next tile in the region by returning to the loop state 700. OtherWise, if the tile is loaded, the tile manager 192 marks the undo copy of the tile as loaded in a state 704.

Note that there are two tiles. One is the original version of the tile that is still associated with the document and the second is the copy that the tile manager 192 is going to make and associate with the undo region header.

At a decision state 706, a test determines whether the document tile is blank. If the tile is blank (i.e., all background color), then the tile manager 192 moves to a state 708 and simply marks the undo tile as "blank" and returns to the FOR-loop at 700. If the document tile is not blank, then the tile manager 192 moves to a state 710 and the tile manager 192 marks the undo tile as "not blank" and moves to a state 712 Wherein the tile manager 192 tests whether the document tile has a valid copy of compressed data on the disk.

If a valid copy of compressed data does reside on disk, the tile manager 192 moves to a state 714 and simply copies the compressed tile disk location and size information from the document tile header to the undo tile header. Note that it is possible for a particular tile to have multiple representations of the same data. That is, a compressed version and an expanded version of the tile may exist in cache simultaneously. And a tile may have a compressed version in cache as well as on the disk. For undo, the strategy is to store the most compact version possible. The most compact version with regard to cache memory usage is to have a copy of the compressed tile on the disk.

If there is no compressed copy of the tile on the disk, the tile manager 192 proceeds to a decision state 716 wherein the tile manager 192 determines whether an uncompressed copy of the document tile resides on the disk. If the test succeeds, the tile manager 192 enters a state 718 and copies the uncompressed tile disk location and size information from the document tile to the undo tile and then returns to the inner FOR-loop at a loop state 700.

Figure 17B:
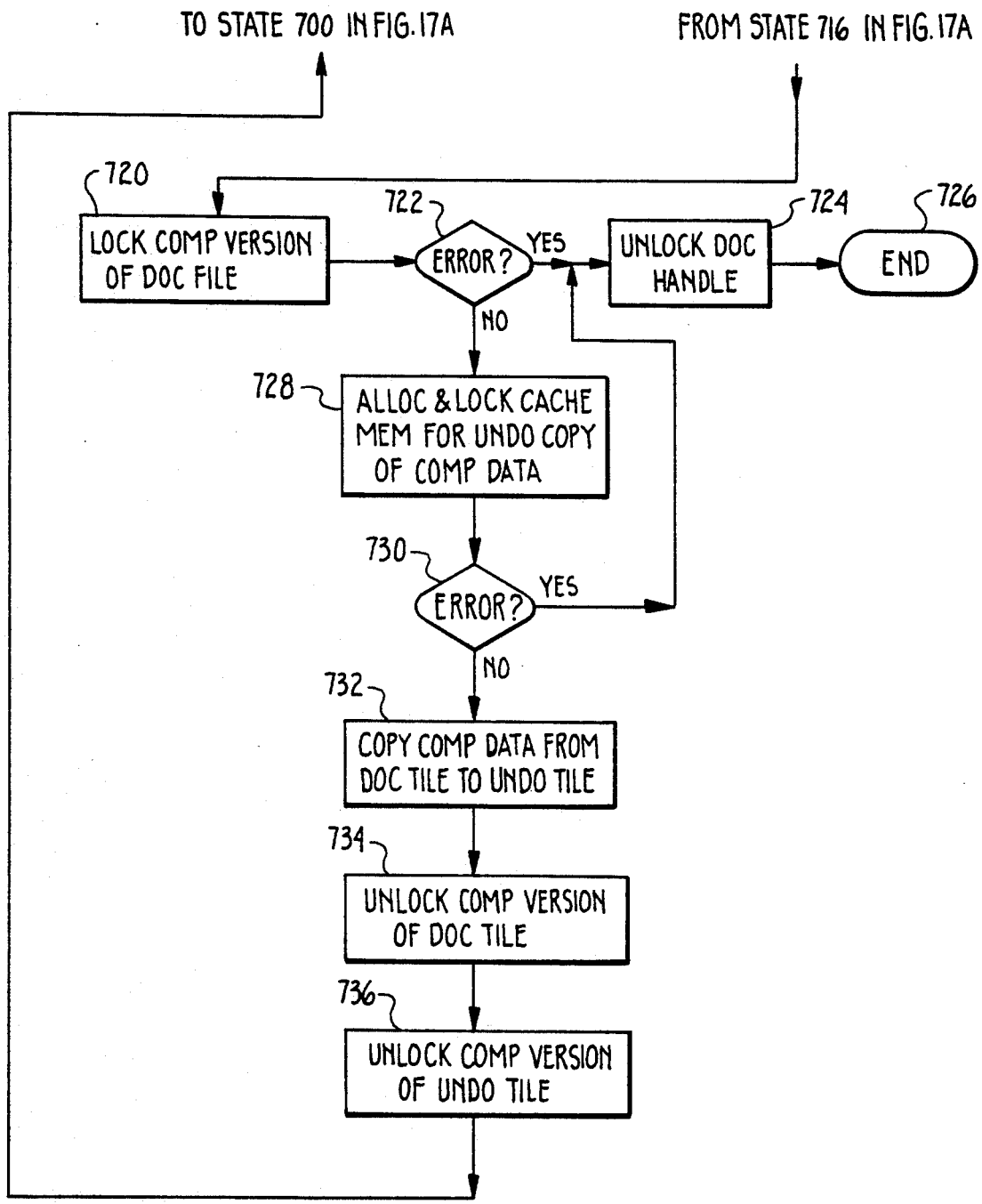

If, at state 716, there is no uncompressed tile information on the disk, the tile manager 192 continues execution to a state 720 in FIG. 17B wherein the tile manager 192 locks the compressed version of the document tile. This locking of the compressed version of the document tile may cause an expanded version of the document tile to be compressed and a compressed version created. Therefore, there is a possibility of an error and that is checked at the decision state 722.

If there is an error than the tile manager 192 unlocks the document handle at a state 724 and terminates with an error condition at the end state 726. If there was no error in locking the compressed version of the tile then the tile manager 192 moves from the state 722 to a state 728 wherein the tile manager 192 allocates and locks down cache memory for a copy of the compressed data to be associated with the undo header. There is another error possibility at this point and the tile manager 192 checks for an error at a decision state 730. If there is an error then the tile manager 192 returns to a state 724 and thereafter terminates the function 426.

If there was no error in locking cache memory at the state 730, the tile manager 192 moves to a state 732 and copies the compressed data from the document tile to the undo tile. The tile manager 192 actually copies the data that is stored within the tile—i.e., the compressed image data is copied from the document version to the undo version. Then the tile manager 192 moves to a state 734 and unlocks the compressed version of the document tile. Now, at a state 736, the tile manager 192 unlocks the compressed version of the undo tile and the tile manager 192 returns to the inner FOR-loop at state 700 on FIG. 17A where the tile manager 192 loops back to continue the loop for all of the tiles in the affected region.

When the tile manager 192 is done with all of the tiles in the affected region, the tile manager 192 moves to a state 738 where the tile manager 192 links the new undo header into the undo region list. Thus, multiple regions can be saved in the undo list and then in one operation, by calling undo previous raster operation, all of the operations that had been accumulated, can be undone. Then the tile manager 192 moves to a state 742 wherein the tile manager 192 unlocks the document handle and terminates the function 426 normally.

FIG. 18 shows the load tile to raster image function (LoadTiff). FIG. 18 is a flow diagram for the part of LoadTiff that loads tiled images only. In reference to FIG. 18, the overall process may be understood whereby an existing file on the disk, i.e., an image file on disk, is mapped into memory. As described below, the overall process permits loading large images in a short time period relative to how long it would take to actually copy all of the image data into the computer's memory. In accordance with the present invention, the process shown in FIG. 18 is called the indirect loading capability. As shown in FIG. 18, the tile manager 192 begins the LoadTIFF function 408 at a start state 750 and moves to a state 752 where the tile manager 192 opens the input file that is on the disk. If there is an error on the disk, the tile manager 192 prints an error message at a state 754 and terminates at an end state 756. If no error exists, then the tile manager 192 moves to a state 758 and checks for the TIFF header structure that identifies that the input file is in fact a TIFF file. While the disclosure below discusses a TIFF file, it is to be understood that the process shown in FIG. 18 may be performed on all types of tiled files, such as a MIL-R-28002A Type II file or an IBM IOCA tiled file.

Still referring to FIG. 18, if the tile manager 192 finds something other than TIFF header structure at state 758, the tile manager 192 moves to state 754 to indicate an error, and then exits at the end state 756. If the tile manager 192 finds a TIFF header structure while at state 758, the tile manager 192 move to a state 760, wherein the tile manager 192 counts the number of subimages in the TIFF file, one or more of which may exist in a TIFF file.

Next, the tile manager 192 moves to a state 762 and reads the full resolution subimage information which constitutes the basic information about the image, e.g., the image width and height, the size of the tiles, the compression format that is used, and the resolution. If the basic image information is not present and in proper form, the tile manager 192 moves to the state 754 to indicate an error. On the other hand, if no error is indicated at state 762, the tile manager 192 moves to state 764, wherein the tile manager 192 creates a skeleton document and locks that document. The skeleton document at this point contains no cache memory but only tile directory and tile headers that represent in a virtual sense the tiles that compose the image.

The tile manager 192 next moves to a state 766 where the TIFF full resolution subimage tile information is loaded into the tile headers for the full resolution subimage, as more fully disclosed below in reference to FIG. 19. Next, the tile manager 192 moves to a loop state 768 where there is a loop for each of the remaining lower resolution subimages. While in this loop, the tile manager 192 accesses a decision state 770, wherein the tile manager 192 determines whether $$fr/lr = 2^n \qquad (1)$$

where
fr is the full resolution subimage resolution in pixels per inch; and
lr is the particular low resolution subimage resolution in pixels per inch.

If the ratio of fr to lr is a power of two, then a successful test is indicated, and the tile manager 192 moves to a function 424 and loads the TIFF subimage tile information into the tile headers for that particular subimage level. On the other hand, if the ratio of fr to lr is not a power of two, as indicated at the decision state 770, then the tile manager 192 ignores the particular subimage under test and returns to the state 768 until all of the subimages in the file are processed. When all subimages have been processed, the tile manager 192 moves to a state 772 and unlocks the document handle of the newly created document and terminates normally at an end state 756.

Now referring to FIG. 19, the function 424 whereby the tile manager 192 loads the TIFF subimage tile information into tile headers is shown. More particularly, the tile manager 192 begins at a start state 780 and moves to a state 782 wherein the tile manager 192 reads the number of tiles in the subimage. Then the tile manager 192 moves to a state 784 wherein the tile manager 192 allocates temporary buffers for the tile mode offset and byte count lists. These three lists have one entry each per tile in the subimage. If the tile manager 192 cannot properly allocate the temporary buffers, then the tile manager 192 exits with an error condition at an end state 786.

Upon successful allocation of the buffers, the tile manager 192 moves to a state 788 where the tile manager 192 reads the tile offset and byte count information from the disk file into the allocated buffers. In the TIFF file standard, all tiles are stored in the same mode (e.g., compressed). However, other tiled file formats (e.g., MIL-R-28002A Type II) specify the storage mode for each tile. The tile mode simply states whether a particular tile is stored in compressed form, in uncompressed form, or whether the tile is all foreground or background color. The tile manager 192 next moves to a state 790 where the tile manager 192 fills in the tile storage mode list. At state 790, the tile manager 192 synthesizes the tile mode information that the TIFF file does not contain itself. Then the tile manager 192 moves to the function 425 wherein the tile manager 192 stores the information in the subimage tile headers (FIG. 10), and terminates at an end state 786.

Now referring to FIG. 20, the function 425 whereby the tile manager 192 stores file information in tile headers is shown. The tile manager 192 begins this process at a start state 800 and moves to a state 802 where the tile manager 192 locks the document handle of the document for which the tile manager 192 is loading the subimage for. This function is performed once per subimage in the file and there may be multiple subimages in the file. Consequently, the locking of the document handle function can be performed several times in the process of loading a single document.

As shown in FIG. 20, in the event that an error occurs in locking the document handle the tile manager 192 terminates at an end state 804. On the other hand, if the tile manager 192 successfully locks the document handle at state 802, the tile manager 192 moves to a state 806 where the tile manager 192 determines whether the number of tiles in the file matches the number of tiles expected for the particular subimage in the particular file or document. If a mismatch exists between the actual and expected number of tiles, the tile manager 192 moves to a state 808 to print an error message and then terminates at the end state 804. On the other hand, in the event that the number of actual tiles matches the number of expected tiles, the tile manager 192 moves to a loop state 810 where the tile manager 192 enters the first part of a FOR-loop for each tile row. Still referring to FIG. 20, the tile manager 192 moves from state 810 to state 812 for each tile column. Accordingly, it will be understood that the tile manager 192 is processing a two-dimensional array at the states 810, 812.

In accordance with the present invention, the tile manager 192 processes, at states 810, 812, all of the tiles required to cover the particular subimage. Next, the tile manager 192 moves to a decision state 814 wherein the tile manager checks the value in the tile mode entry to determine whether the tile data is compressed. If the tile data is compressed, the tile manager 192 moves to a state 816 and stores the file offset and byte count in the compressed tile handle. The compressed tile handle is a part of the tile header structure, and the file offset is the location of the compressed data for the particular tile within the file as measured by a byte offset from the start of the file. The byte count represents the number of bytes of compressed data associated with the particular tile starting at the offset that is provided at the tile. From state 816, the tile manager moves to state 828, wherein the tile manager sets a flag to indicate that the particular tile is not blank.

In the event that the tile manager determines at state 814 that the tile data is not compressed, the tile manager 192 moves to a decision state 818 where the tile manager 192 checks to see if the data is uncompressed. If the data is uncompressed on the disk, the tile manager 192 stores the file offset byte count information in the uncompressed tile handle in state 820. From state 818, the tile manager moves to state 828, wherein the tile manager sets a flag to indicate that the particular tile is not blank.

If the tile manager 192 determines at state 818 that the tile data is not uncompressed, then the tile manager 192 moves to state 822, wherein the tile manager 192 checks to see whether the tile is all foreground at a state 822. For example, in a black and white drawing engineering document, foreground color is black, so the tile manager 192 treats a foreground as a black tile. If the tile is determined to be a foreground tile, the tile manager 192 proceeds to state 824, wherein the tile manager 192 creates an all foreground tile, and then sets the flag as not blank at state 828. As an example, if the image being processed is a color image, the tile manager 192 could fill the tile with the foreground color at the state 824.

On the other hand, if the tile is not all foreground, the tile manager proceeds to state 826 to determine whether the tile is all background. As discussed above, binary images usually have background pixels which are white or zero value. If a particular tile is blank, the tile manager 192 moves to a state 828 where the tile manager 192 sets the blank flag to indicate that the tile is indeed a blank tile. If at the state 826 the tile manager 192 determines that the tile is not all background, the tile manager 192 terminates with an error at an end state 830. In other words, having determined at state 822 that the particular tile was not all foreground, the only possibility left at state 826 is that the tile is all background. Consequently, a determination at state 826 that the tile is not all background indicates an error.

From state 828, the tile manager 192 moves to a state 832 and sets the loaded flag to true indicating that a valid image information set has been associated with the particular tile. The tile manager 192 completes the loop described above for each tile. After having processed each tile in the particular image, the tile manager 192 exits the two FOR-loops and moves to a state 834 where the tile manager 192 unlocks the document handle and then terminates normally at the end state 830.

Figure 21:
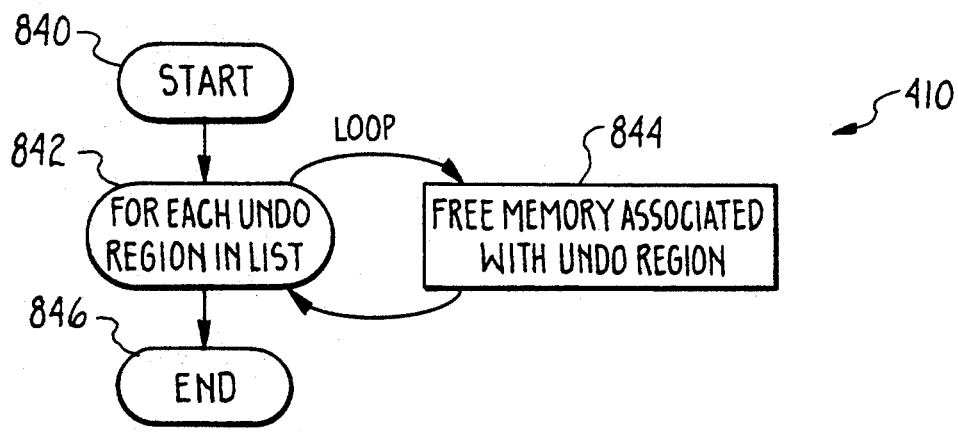
FIG. 21 is a flow diagram defining the "begin undoable raster operation" function referred to in FIG. 12.

Now referring to FIG. 21, the tile manager 192 performs a function which for purposes of the present invention will be termed "Undoable Raster Operation". The function shown in FIG. 21 is performed by the tile master 192 in the function "Begin Undoable Ras-Op", and is a relatively simple function, the purpose of which is to clear the undo region list. More particularly, in the process shown in FIG. 21, the tile manager 192 frees all of the undo regions associated with the previous operation to prepare for a new undo operation. Indeed, the present invention could be configured to have multiple level undo, i.e., the system of the present invention could undo two or three or more operations going into the past and also to be able to redo all of those operations at the user's choice. For example, the last three operations could be undone and then the oldest of those operations redone.

In specific reference to FIG. 21, the tile manager 192 begins at a start state 840 and then proceeds to loop state 842, in which the tile manager 192 executes a FOR-loop for each undo region in the current list. The tile manager 192 loops to a state 844 where the tile manager 192 frees all of the memory associated with that undo region. This may include freeing compressed data that is stored in cache or expanded data that is stored in cache and associated with the undo region. When the tile manager 192 finishes all of the regions, the tile manager 192 terminates at an end state 846.

Now referring to FIGS. 22A and 22B, there is shown the control flow for the ReadRowToRow function 414 which produces one or more rows of scaled image data each time it is performed. It is one of the basic image access functions. It should be understood that the tile manager 192 can also read columns of an image, etc., so as to produce a rotated output.

The tile manager 192 enters the function 414 by moving to a start state 850 and proceeds to a decision state 852 where the tile manager 192 checks for a region overrun. In other words, when the access context is created, the region that is going to be read in the course of the overall operation is specified, and in the event that the read row to row subfunction is accessed too many times, the region will be overrun. Any such overrun is detected by the tile manager 192 at state 852 and reported at state 854. In the event of an overrun, the tile manager 192 terminates at an end state 856.

If, on the other hand, no region overrun has occurred, the tile manager 192 moves to a decision state 858 where the tile manager 192 checks to see whether old results are carried over to the new strip. Such a carryover could occur when, for example, raster data is being enlarged by expanding one or more lines from the image. For example, when raster data is being enlarged by 4×, each line of input generates four (4) lines of output. Accordingly, three (3) output rows could be carried over for later strips. With this eventuality in mind, the tile manager 192 ascertains whether any data is being carried over and if so, the tile manager 192 uses the carried-over data before generating a new row. Consequently, if there is new data carried over, the tile manager 192 moves to a state 860 where new rows are generated from the carried over data.

Next, the tile manager 192 moves to a state 862 where the tile manager 192 checks to see if a particular strip is full. For purposes of the present invention, a strip is a collection of rows, i.e., a set of numbers arranged in rows As indicated at state 862, if the strip is full, then the tile manager 192 ends at the end state 856.

If the strip is not full and the tile manager 192 has used up all the carried over data, then the tile manager 192 moves to a decision state 864 where the tile manager 192 checks for ghosting, i.e., the skipping of some rows of data in order to produce a low quality image while panning or zooming. If ghosting is in effect, the tile manager 192 moves to state 866, wherein the tile manager 192 calculates the number of blank lines to create. The system then moves to a state 868 where the tile manager 192 writes the blank lines to the output strip buffer.

From state 864, if no ghosting was detected, or state 868, if ghosting is not in effect, the system moves to state 870 where the tile manager 192 again checks to see if the strip buffer is full. If it is, the tile manager 192 exits at the end state 856. If it is not, the tile manager 192 checks to see that there are still input rows to read in a decision state 872. If there aren't, the tile manager 192 has reached the end of the specified image region, and proceeds to state 874 to obtain another row of output data by flushing the scaler buffers. In accordance with the present invention, in the state 874 the tile manager 192 sets a flag that is subsequently passed down to the scaler functions to flush intermediate results from the scaler functions. This is the case when for reducing data, i.e., if a plurality of rows is being combined into one output row. That is how the last output row is produced.

From state 874, the system moves to state 894, shown in FIG. 22B. On the other hand, in the event that there are no unread image rows at state 872, the system moves to decision state 876, where the system determines whether the row is outside of the valid image boundaries. If yes, the system moves to a state 878, where the tile manager 192 substitutes blank lines for the input. The tile manager proceeds from state 878 to a state 894, shown in FIG. 22B. If the answer to the decision at state 876 is no, the system moves to a decision state 880, shown in FIG. 22B, to check whether the row is contained in the currently locked tile row.

At state 880, the tile manager 192 moves down the image, and the system sequentially passes through successive tile rows. Each tile contains, e.g., 512 rows, so when a particular tile row is locked it stays locked until all 512 image rows in that tile row have been read. Each time the system arrives at a new row it tests to see that the row is contained in the currently locked tile row. If it is not, the system moves to the state 430 (function ExpTileUnlock) to unlock the old tile row and lock down the new tile row (at state 428). In addition, the tile manager 192 has to unpreserve the row of tiles that was just unlocked. Unpreserving them tells the memory manager that those tiles are no longer needed for this access operation and it can do what it wishes with them.

Next, the system proceeds to a decision state 882 to determine whether any tiles are blank. If they are, the tile manager 192 substitutes a reference to a "common blank tile" and that common blank tile is used, as indicated at state 884. All tiles that are blank are mapped onto this common blank tile. Consequently, the tile manager 192 uses less image memory.

From state 884, 882, or 880, as appropriate, tile manager 192 proceeds to a decision state 886 to check for polygonal clipping. If the tile manager 192 is doing polygonal clipping then each input row of data is clipped as appropriate for that polygon in states 888 and 890. The loop allows multiple clipped regions within each row. If there is no clipping, then the tile manager 192 simply copies the entire input row from the image into the input row buffer in a state 892. Then the tile manager 192 move to a state 894 where the tile manager 192 passes these input rows through the scaler if the tile manager 192 is scaling the data. Finally, the tile manager 192 takes the results of the scalers and copies that information to the output strip buffer if necessary at a state 896. The tile manager 192 then returns to the state 870 (shown in FIG. 22A) where the tile manager 192 continues the process of retrieving input rows and scaling them until the tile manager 192 has filled the output strip buffer. The system then moves to the termination condition at the end state 856.

Figure 23A:
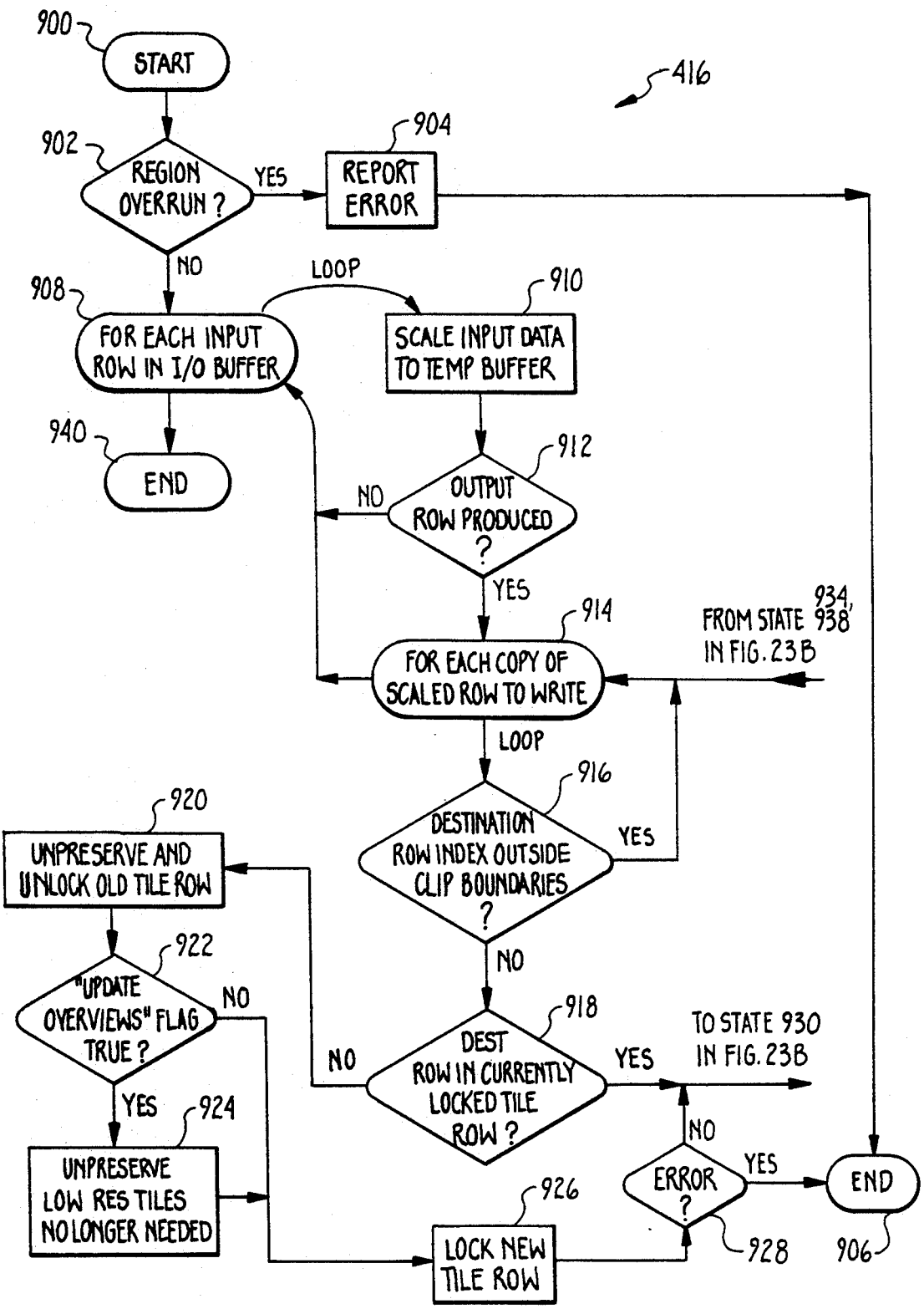
FIGS. 23A and 23B are a flow diagram defining the "write rows to region" function referred to in FIG. 12.

Now referring to FIG. 23A, a process which will be referred to as "Write Rows to Region" will be described. The tile manager 192 starts at state 900 and moves to state 902 where the tile manager 192 tests for region overrun. Region overrun can occur when the calling function attempts to write more rows to the image than was specified when the access context was created. If the region was overrun, the tile manager 192 reports an error at state 904 and terminates with an error at state 906. If there is no region overrun, the tile manager 192 moves to the FOR-loop in state 908 where the tile manager 192 loops for each input row in the input buffer, which is the buffer that is passed in by the calling function. It contains the data that is to be processed and written to the image. The loop is executed for each row and moves to state 910 where the input data is passed through the scaler functions and put into a temporary buffer. If the scaler does not always produce an output row, as is the case when reducing the resolution, a plurality of input rows may have to be combined to produce a single output row. So, at the state 912, the tile manager 192 determines whether an output row was produced after the input row is scaled. If not, the tile manager 192 goes back to the loop at state 908 and continues the process as described. On the other hand, when the tile manager determines at state 912 that an output row was produced, the tile manager 192 moves to state 914 which is a FOR-loop for each copy of the scale row to write to the image. It may be the case that more than one copy of the scaled row needs to be written into image memory. This is the case when the tile manager 192 is expanding the input image data. It may be that one input row is replicated four times to get a 4× expansion factor.

Next, the tile manager 192 moves to state 916 where the tile manager 192 checks to see if the destination row index is outside of the image's clipping boundaries. If so, the tile manager 192 simply ignores it and moves back to state 914. If it is within the clip boundaries the tile manager 192 moves to state 918 where the tile manager 192 determines whether the destination row is in the currently locked tile row. If it is not, the tile manager 192 moves to state 920 where the tile manager 192 unpreserves and unlocks the old tile row that is currently locked. The tile manager 192 then moves to state 922 to determine whether the update overview flag is true. This is an option that is specified in the lo access context and it determines how lower-resolution tiles are updated when the full resolution subimage is modified. If the update overview flag is true, then the tile manager 192 moves to state 924 where the tile manager 192 unpreserves the low resolution tiles that will no longer be needed.

After the system has unpreserved the low resolution tiles that are no longer needed at state 924, the system moves to state 926 and locks down the new tile row. Only the full resolution tile row is locked at this level. The low resolution tiles are actually updated when the call to unlock the old tile row is made.

Next, the tile manager 192 moves to state 928 to determine whether an error was detected when the new tile row was locked. If so, the system terminates with an error condition at state 906. If there is no error or if in state 918 the tile manager 192 finds that the destination row is currently in the locked tile row, the tile manager 192 moves to state 930 in FIG. 23B. At state 930, the tile manager 192 determines whether polygonal clipping is activated. If it is, the tile manager 192 computes the clip points for the current image row, as indicated at state 932, which results in a list of clip point pairs.

Figure 23B:
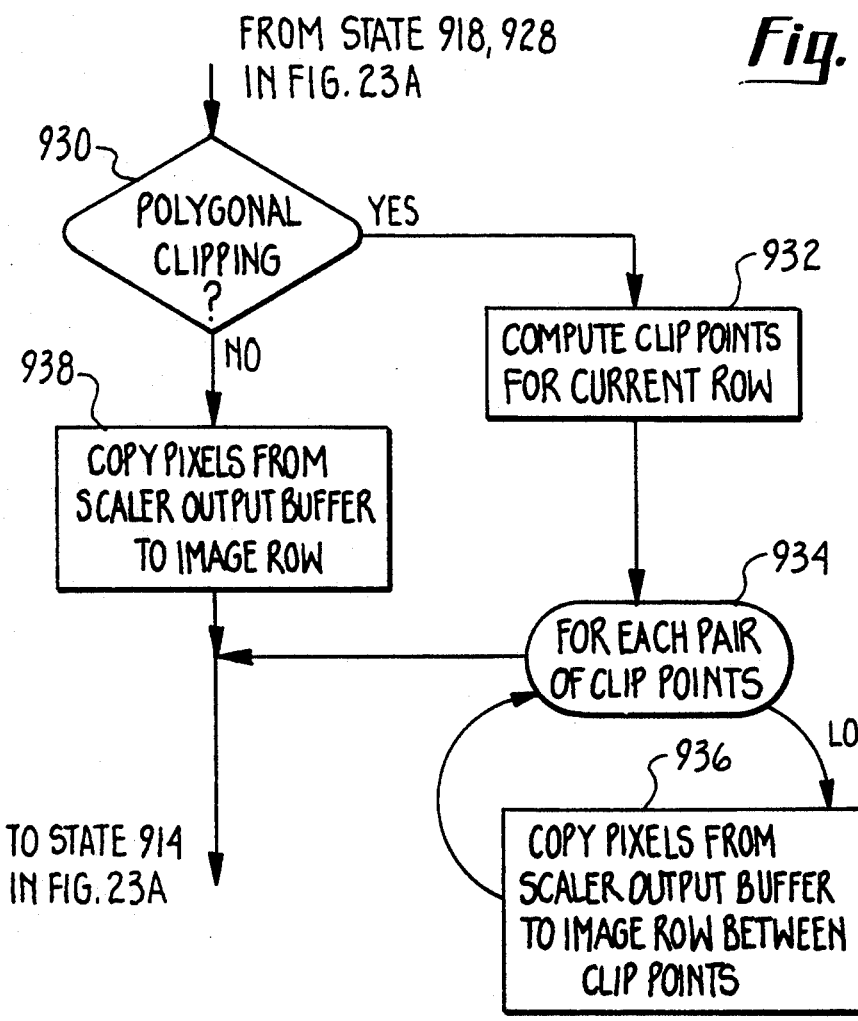

The tile manager 192 then moves to state 934, wherein the tile manager 192 conducts a FOR-loop for each of the clip point pairs that the tile manager 192 computed in state 930. As shown in FIG. 23B, the tile manager 192 loops to state 936 where the tile manager 192 copies pixels from a scaler output buffer to the image row between each pair of clip points. When that loop terminates, the tile manager 192 returns to state 914 in FIG. 22A. On the other hand, if the tile manager determines at state 930 that polygonal clipping is not active, the tile manager 192 moves to state 938, wherein the tile manager 192 copies the scaler output buffer pixels to the image row without clipping. The tile manager 192 then proceeds to state 914.

Now referring to FIG. 24, the tile manager starts at state 950 in the end access function shown in FIG. 24 and proceeds to state 952. At state 952, the system cleans up after row or column access functions by freeing buffers used by the row or column access functions.

Next, at state 954, the tile manager 192 unlocks the last row or column of tiles accessed. Then, the system moves to state 956 where the tile manager 192 unpreserves any tiles in the region that are still preserved. The system may perform the functions at states 954, 956 when an operation was aborted in mid-progress and it cleans up after those partially completed operations.

At state 958, the tile manager 192 cleans up after the polygonal clipping function. If there was polygonal clipping involved in this access context the tile manager 192 has to free the buffers that contain the polygon edge information.

Next, the system moves to state 960, where the tile manager 192 frees scaler buffers, the temporary tile directory, etc.. From state 960, the system moves to state 962, wherein the tile manager 192 unlocks the document handle to indicate to the memory manager that the access context no longer is referring to the particular document associated with the document handle.

The tile manager 192 next moves to state 964 where the memory that was used to store the data for the access context is freed. Then, the system ends the clean up function at state 966.

Referring now to FIGS. 25A,B, a function is shown which, for purposes of the present invention, will be termed the "Undo Previous Raster Operations". The tile manager 192 starts at state 970 and moves to state 972, wherein the tile manager determines whether any undo regions exist in the list or if the list is empty. If no regions exist then the tile manager 192 moves to end state 974 and terminates normally.

If the tile manager 192 determines at state 972 that "undo" regions do exist, the tile manager 192 moves to state 976, where the tile manager 192 enters a loop for each undo region in the list. In this loop, the tile manager 192 moves to state 978 where the tile manager 192 locks the affected document handle. The document handle that is locked is the one that was stored in the undo region header that tells where that particular undo region came from. The tile manager 192 moves from state 978 to state 980 where the tile manager 192 saves the current document region to support redo (i.e. an "undo" operation following by another "undo" operation). Then the tile manager 192 moves to state 982 to invalidate the affected tiles in the lower-resolution subimages. The strategy represented by states 980, 982 in FIG. 25A is to save the minimum amount of information that is needed to reconstruct the image, which means the tile manager 192 saves only the affected tiles in the full res subimage.

Next, the system moves to a loop indicated by the states 984, 986. In this loop, for each tile, the tile manager 192 moves to state 988, discarding the document tile image data. Then the tile manager 192 moves to state 990 to determine whether the undo tile is loaded. If it is not loaded, the tile manager 192 moves to state 992 where the tile manager 192 marks the document tile as "not loaded". If the tile is determined to be loaded at state 990, the tile manager 192 moves to state 994 to mark the document tile as "loaded". From state 994, the system moves to state 996 in FIG. 25B.

Figure 25B:
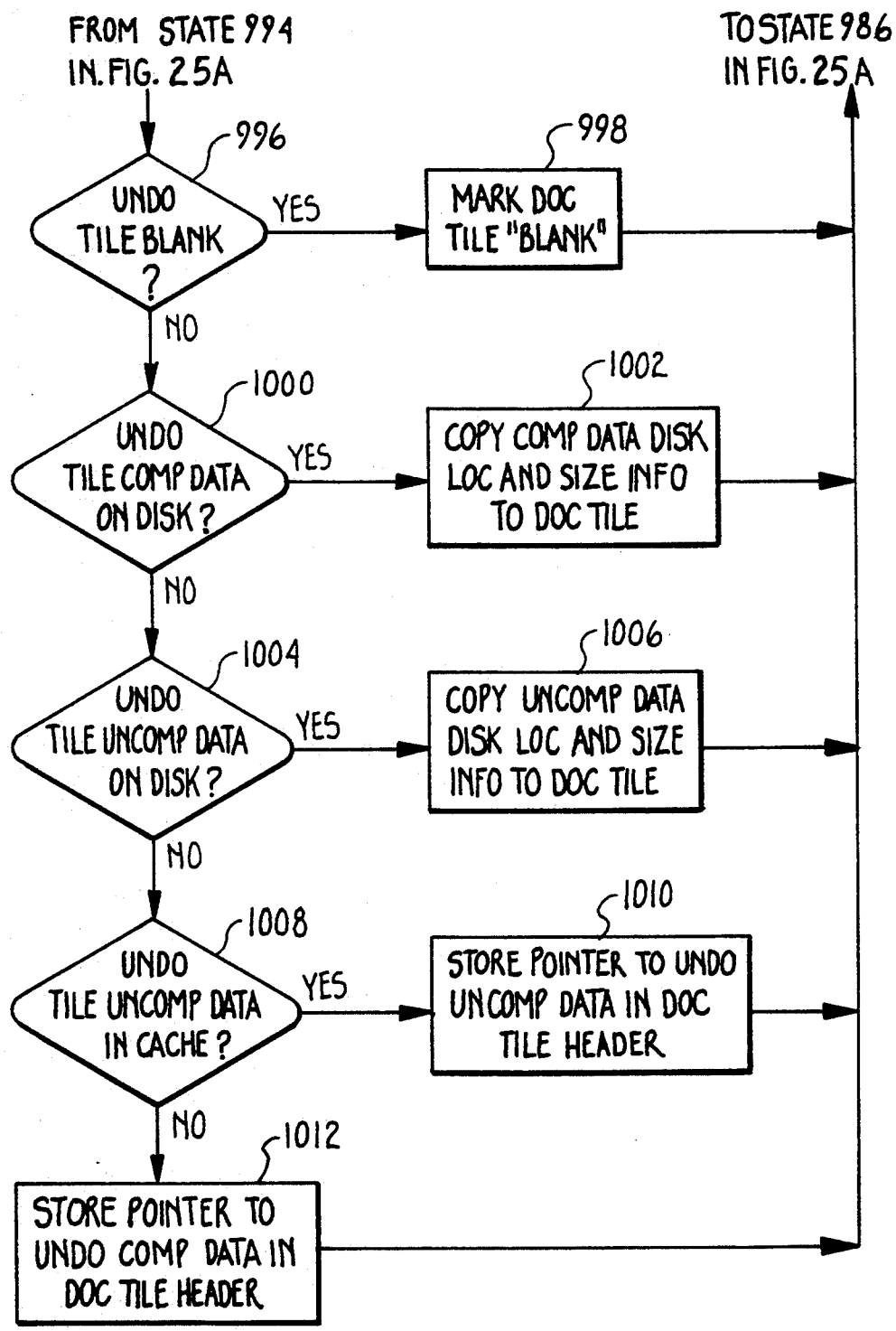

At state 996, shown in FIG. 25B, the tile manager 192 determines whether the undo tile is marked as blank. If it is, the tile manager 192 moves to state 998, wherein the tile manager marks the document tile as blank, and then the system loops back to state 986. If the undo tile is determined to be not blank at state 996, the tile manager 192 move to state 1000. At state 1000, the tile manager 192 checks to see if the undo tile points to compressed data on the disk. If it does, the tile manager 192 moves to state 1002 and copies the disk location and size information about the compressed data into the document tile header and loops back around. If there is no compressed data on the disk, then the tile manager 192 moves from state 1000 to state 1004, wherein the tile manager 192 determines whether uncompressed data exists on the disk associated with the undo tile.

If so, the tile manager 192 moves to state 1006, wherein the file manager 192 copies the disk location and size information about the uncompressed data into the document tile header and loops back to state 986. If the system determines at state 1004 that there is no uncompressed data on the disk, the tile manager 192 proceeds to state 1008, wherein the tile manager 192 determines whether the undo tile "points" to uncompressed data in cache memory. If it does, the tile manager 192 moves to state 1010, wherein the tile manager 192 copies the pointer to the uncompressed data from the undo header to the document tile header.

From state 1010, the system returns to state 986. If no uncompressed data exists in the cache, however, as determined in state 1008, the tile manager 192 stores a pointer to the compressed data in cache in the document tile header and returns to state 986.

Referring back to FIG. 25A, when the tile manager 192 has completed the loop described above, the system moves to state 1014, unlocking the document handle. From state 1014, the tile manager 192 proceeds to state 1016, wherein the tile manager 192 frees the memory associated with the undo header. The tile manager 192 then moves to state 976. Thus, the system returns to state 976 for each undo region in the list. As intended by the present invention, the tile manager 192 continues the loop for all of the regions in the list. The undo regions are restored in "last-in-first-out" order. At the completion of the looping process described above, the system moves to state 974.

Figure 26:
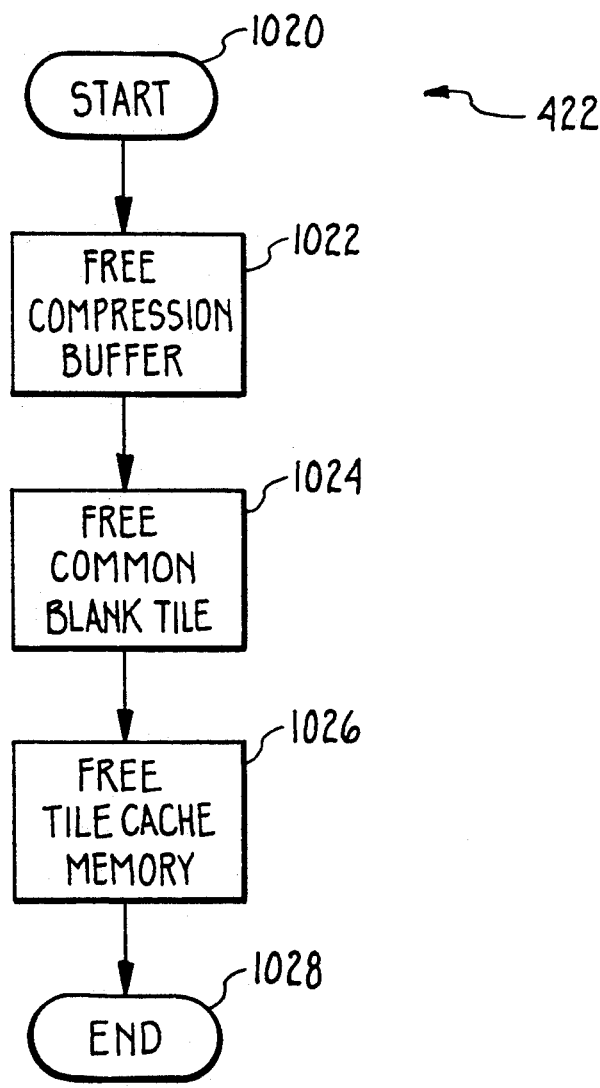
FIG. 26 is a flow diagram defining the "quit cache manager" function referred to in FIG. 12.

Now referring to FIG. 26, when the tile manager 192 ends the cache management, the tile manager 192 starts the process shown in FIG. 26 at state 1020 and proceeds to state 1022 wherein the system frees the compression buffer. From state 1022, the system proceeds to state 1024, wherein the system frees the common blank tile. Next, the system moves to state 1026 to free the tile cache memory. The system then ends the process shown in FIG. 26 at state 1028.

Figure 27:
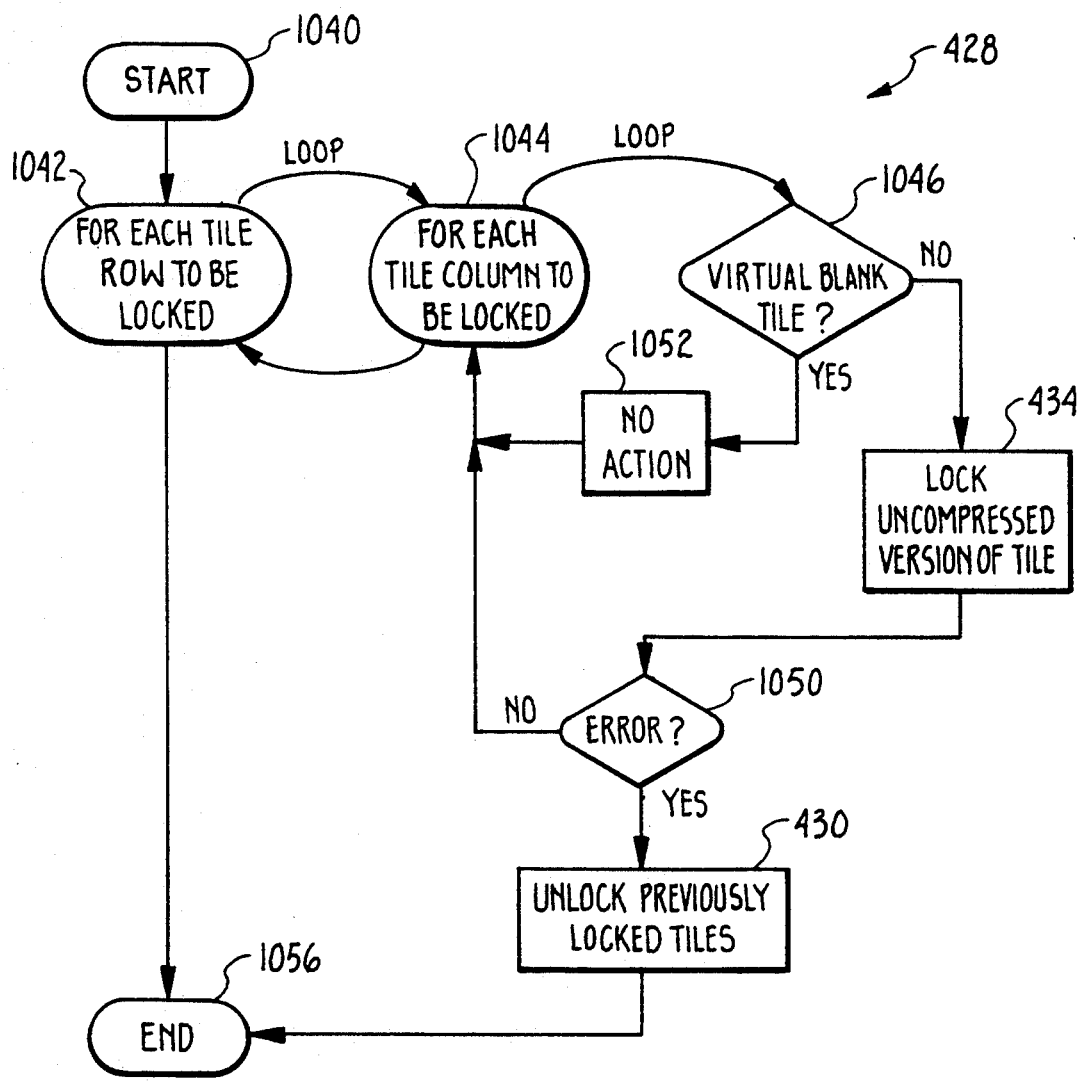
FIG. 27 is a flow diagram defining the "lock expanded image tile group" function referred to in FIG. 22A.

FIG. 27 provides an explanation of the function exp tile lock. The tile manager 192 starts at state 1040 and moves to state 1042 where the tile manager 192 enters a FOR-loop for each tile row to be locked. In accordance with the present invention, the system in the exp tile lock function is capable of locking down all the tiles in a two dimensional region.

For each tile in the specified region, the system moves to state 1046, wherein the tile manager 192 determines whether the particular tile is blank. To make this determination, the system examines flags in the tile header itself or checks the image data for that tile to determine if there are any non-background pixels. If it is not a blank tile, the tile manager 192 move to state 434 where the tile manager 192 locks the uncompressed version of the tile. Then the tile manager 192 proceeds to state 1050, wherein the tile manager 192 determines whether an error had occurred in the process of creating the uncompressed version of the tile. If no error is found at state 1050, the tile manager 192 continues to loop to the next tile in the region by returning to state 1044. If an error did occur, as determined at state 1050, the system proceeds to state 430 to unlock previously locked tiles, and then ends at state 1056.

In the event that the tile manager 192 at state 1046 detected that the particular tile was a virtual blank tile, i.e., a tile that exists only by virtue of the fact that there is a tile directory entry for that tile, the tile manager 192 take no action, other than to loop back to state 1044 for further processing.

Figure 28:
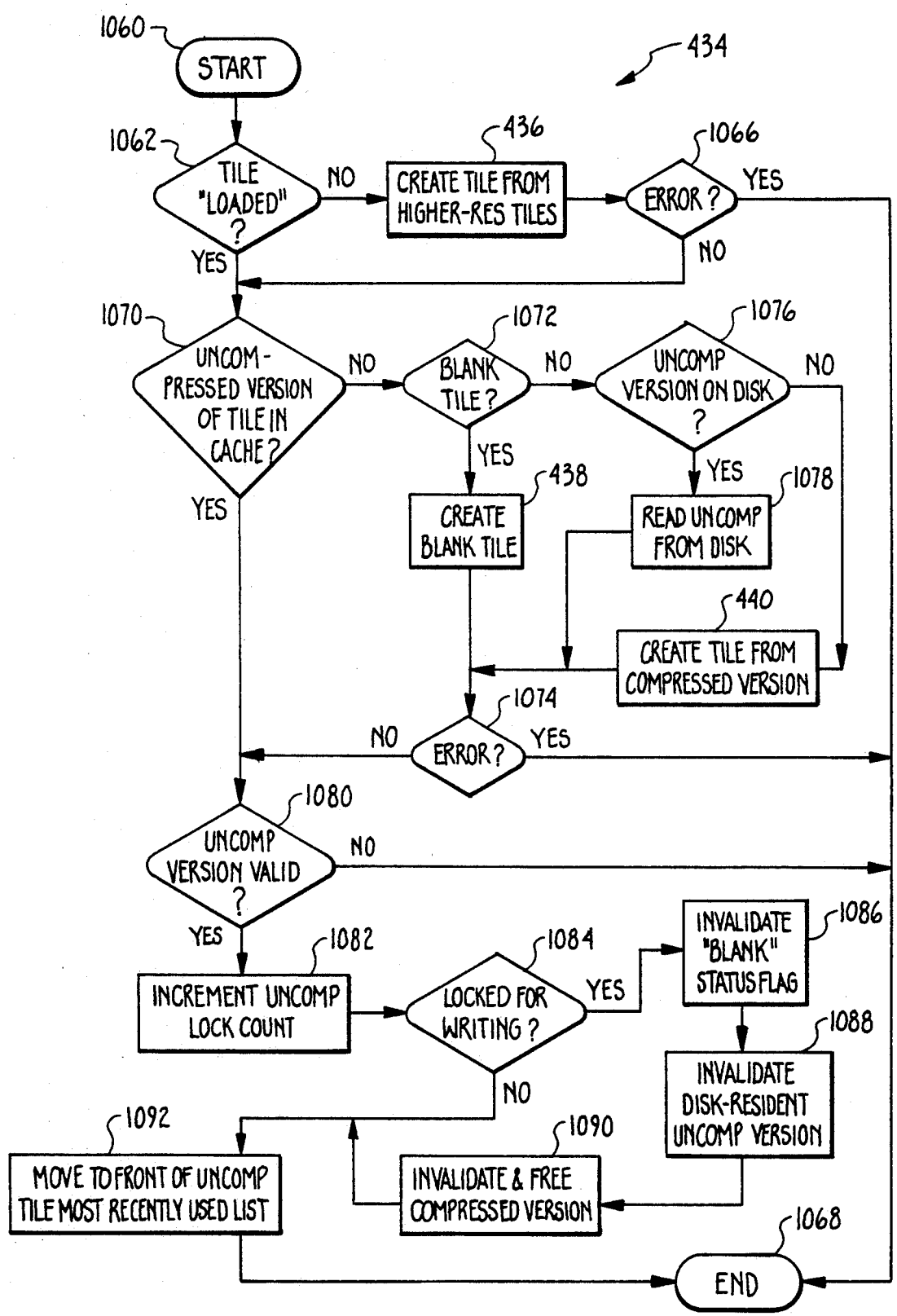
FIG. 28 is a flow diagram defining the "lock expanded tile" function referred to in FIG. 27.

FIG. 28 illustrates the control flow for the "lock expanded tile" function 434 wherein the tile manager 192 takes a single tile and locks the expanded version of the tile in the image data cache 194. The tile manager 192 enters the function 434 at a start state 1060, and proceeds to a decision state 1062 wherein the tile manager 192 tests whether the tile is marked as "loaded". As already mentioned, a loaded tile is one that either contains or references valid image data, is either uncompressed or compressed image data, and it either resides in cache memory or on the disk. If the tile is not loaded, the tile manager 192 moves to a function 436 wherein the tile must be created from higher resolution tiles which are loaded. Afterwards, the tile manager 192 determines if there was an error in a decision state 1066. If there was an error, the tile manager 192 terminates the function 434 at an end state 1068 and reports the error condition. Otherwise, if there was no error in creating the tile, the tile manager 192 continues, moving from the state 1066 to a decision state 1070.

The tile to be locked is now loaded so the tile manager 192 tests whether the uncompressed version of the tile is in cache memory. The objective of the function 434 is to guarantee that there is an uncompressed version of the tile in cache memory. Now, if the uncompressed version is not in the cache, the tile manager 192 proceeds to a decision state 1072 to determine whether the selected tile is a blank tile.

If the tile is blank, the tile manager 192 proceeds to a state 438 to create a blank tile. Note here that the function ExpTileLock 428 (FIG. 27) will detect a blank tile before calling the function 434 if it can take advantage of using a common blank tile at a higher level. In other words, if the tiles are locked for reading only, i.e., the image data will not be modified in any way, then all blank tiles can refer to the same section of blank memory. However, if the tiles are locked for writing, all tiles must have their own memory because different image data can be written to the different tiles.

At this point, state 438, memory has presumably been allocated for a blank tile. Moving to a state 1074, the tile manager 192 tests whether there was an error and moves to the end state 1068 if there was an error.

Returning in the discussion to the decision state 1072, if the tile is not blank, then the tile manager 192 transitions to a decision state 1076 and tests whether there is a uncompressed version of that tile on the disk. If the uncompressed version is on disk, then the tile manager 192 reads that uncompressed version from the disk into cache memory at a state 1078. Then the tile manager 192 moves to the state 1074 to test for errors.

If, at the state 1076, there is not an uncompressed version on the disk, the tile manager 192 moves to the function 440 so as to create the tile from the compressed version. The compressed version can be either in cache memory or on the disk, and this is handled by the function 440. Again, the tile manager 192 checks for an error at the state 1074.

Now, assuming that there was no error found at the state 1074, the result is that the tile manager 192 has an uncompressed version of the tile in cache. Therefore, the tile manager 192 proceeds to a decision state 1080 to verify that the uncompressed version is valid. It is sometimes the case that the uncompressed version of a tile is locked by one access context and then for come reason it is invalidated by another access context. This happens when the first access context is reading an uncompressed version of a tile from a lower resolution image, and another access context is actively modifying the full resolution subimage with a particular setting of parameters. If the tile not valid, the function 434 is terminated at the end state 1068.

Alternatively, a valid tile that was determined at the state 1080 causes the tile manager 192 to increment the uncompressed data lock count for that tile at a state 1082. The lock count starts out at zero for an unlocked tile and can increment as high as necessary. However, the lock count will be decremented once for each unlocking operation. It is important to match the number of times a tile is locked with the number of times the tile is unlocked. Otherwise, the tile would end up in a permanently allocated (unfreeable), locked state.

Proceeding to a decision state 1084, the tile manager 192 tests whether the tile is locked for writing or for reading. If the tile manager 192 locked the tile for writing, the execution of the function 434 continues to a state 1086 wherein the "blank" status flag is invalidated. The blank status flag is actually a combination of two flags. One that says that the tile is blank or not blank and the second flag that says if the first flag is valid or not. The reason for two flags is that the way to detect that a tile is blank is by searching through all the pixels in that tile. To do so every time the file is accessed would be wasteful so occasionally, truly blank tiles won't be handled as blank tiles. Hence, there is a second flag that is set, in the state 1086, when the first flag is invalid. The second flag indicates that the tile must later be examined to determine whether it is still blank.

The tile manager 192 next moves to a state 1088 to invalidate the disk-resident, uncompressed version of the tile, if one exists. This is because the tile manager 192 will modify the cache-resident version of the tile. To synchronize the cache-resident and disk-resident versions, the disk-resident version is invalidated. Then, at a state 1090, the tile manager 192 invalidates and frees the compressed versions if they exist.

A compressed version of the tile may be in cache or on the disk and, at the state 1090, the tile manager 192 cleans both out of memory. Thus, at the end of the "lock for writing" operation, the only valid version of the tile is the expanded version in cache, which at this point is locked. Then the tile manager 192 continues to a state 1092 to move the newly locked, expanded version of the tile to the front of the "most recently used (MRU)" list of uncompressed tiles.

The MRU list is a doubly-linked list wherein, starting at the beginning, the tile is found that was most recently used, then the next most recently used, and so on, the last tile was used the longest time ago. That list is used by the cache manager to determine which tiles are least likely to be used again as a second level of criteria.

Finally, the tile manager 192 terminates the LockExpHandle at the end state 1068.

Figure 29:
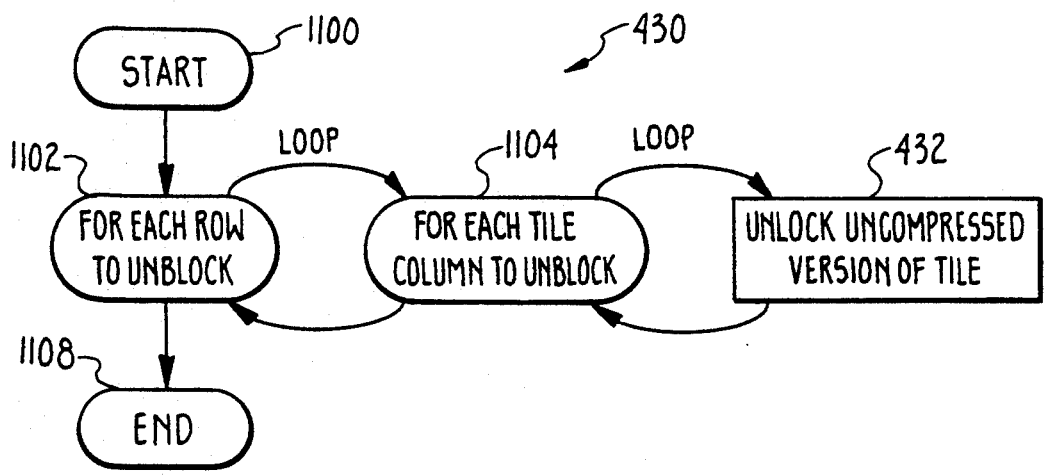
FIG. 29 is a flow diagram defining the "unlock expanded image tile group" function referred to in FIG. 27.

FIG. 29 illustrates the control flow for the "unlocking expanded image tile group" function 430. The function 430 is just the reverse of lock expanded image tile group. In other words, there is a region of locked tiles which must be unlocked because the access to the tiles is complete. Generally, the two functions, ExpTileLock and ExpTileUnlock are called for a row or column of image data rather than a region but an entire region lock/unlock is possible.

The tile manager 192 enters the function 430 at a start state 1110. The loop states 1102 and 1104 represent the beginning of nested FOR-loops. That is, the outer loop, beginning at the state 1102, unlocks a row of tiles, and the inner loop, beginning at the state 1104 unlocks a column of tiles. Moving from the state 1102, to the state 1104, and then to the function 432, the tile manager 192 unlocks the uncompressed version of the tile. When all the tiles in the region are unlocked, the tile manager 192 terminates the function 430 at an end state 1108.

Figure 30:
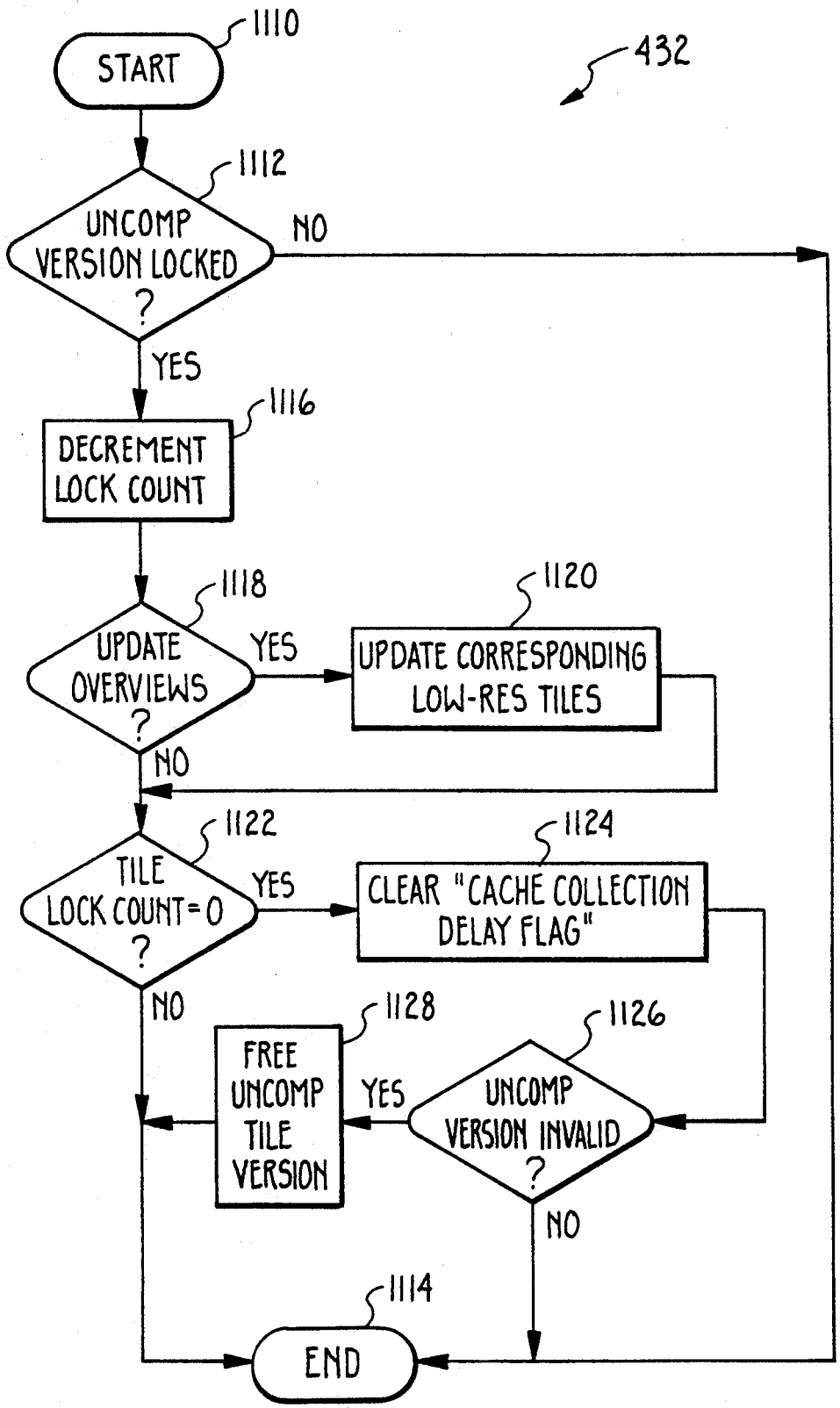
FIG. 30 is a flow diagram defining the "unlock expanded tile" function referred to in FIG. 29.

Now referring to FIG. 30, the tile manager 192 enters the UnlockExpHandle function 432, referred to in FIG. 29, at a start state 1110. The tile manager 192 proceeds to a decision state 1112 to test whether the uncompressed version of the currently selected tile is in fact locked, i.e., whether the lock count is non-zero. If the tile is not locked, the tile manager 192 exits the function 432 at an end state 1114.

If, at the state 1112, the tile is found to be locked, the tile manager 192 moves to a state 1116 to decrement the lock count. Thereafter, the execution continues to a decision state 1118 wherein the tile manager 192 tests whether the "update overview" flag is set true. If the flag is set, the tile manager 192 moves to a state 1120 to update the corresponding lower-resolution tiles. In the process of modifying tiles, the tile manager 192 locks a tile down in the image data cache to write to it. When the tile is unlocked, that is a signal to the memory manager to update the lower resolution tiles that correspond to the higher resolution tile. Thus, the image data in the high resolution tile being unlocked is copied down into the lower resolution tiles, all the way down to the bottom of the image stack.

Once the lower resolution images are modified, or if the overviews are not being updated, the tile manager 192 proceeds to a decision state 1122 to test whether the lock count is exactly zero. If the lock count is not zero, the tile manager 192 terminates the function 432 at the end state 1114.

Otherwise, the tile manager 192 moves to a state 1124 to clear the "cache collection delay" flag. The cache collection delay flag is set by the tile manager after unsuccessfully trying to reduce the expanded memory usage of the cache file. It is cleared in the function 432 because there is now the possibility of freeing the tile that was just unlocked. In other words, the tile can be removed from the cache to create some space. This flag prevents the tile manager or the cache manager from making repeated, unsuccessful attempts to create space.

After the tile manager 192 clears the flag, execution proceeds to a decision state 1126 to determine whether the uncompressed version of the tile is invalid. As explained hereinabove, it is possible for one access context to have the expanded version of the tile locked down and another access context to invalidate the data in that tile. The tile must remain in memory until the first access context unlocks the tile. Once it is unlocked and the lock count is decremented to zero, if the tile is invalid, the tile manager 192 moves to a state 1128 to free the uncompressed tile version, or remove the tile from the image data cache. In either case, the tile manager 192 terminates the function 432 at the end state 1114.

Figure 31:
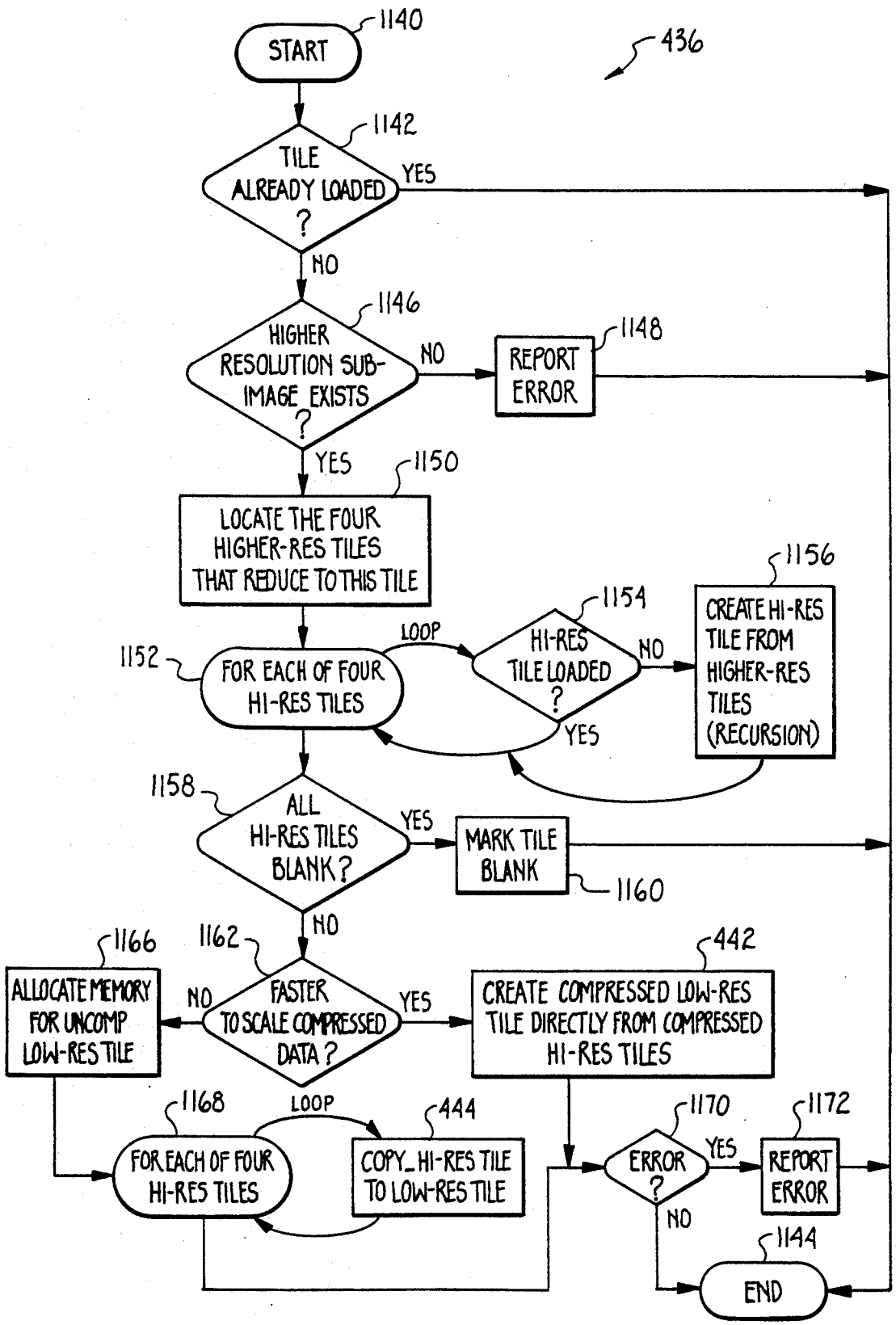
FIG. 31 is a flow diagram defining the "create tile from higher-resolution tiles" function referred to in FIG. 28.

FIG. 31 illustrates the control flow for the "create tile from higher-resolution tiles" function 436 referred to in FIG. 28. The tile manager 192 begins the function 436 at a start state 1140 and proceeds to a decision state 1142 to determine whether the tile is in fact already loaded, in which case no further processing is needed and the tile manager 192 terminates the function 436 at an end state 1144. Assuming that the tile is not loaded, the tile manager 192 moves to a decision state 1146 to test whether a higher resolution subimage exists.

This function is called only for lower resolution subimages where the tile manager 192 can create the lower-resolution tiles from higher-resolution tiles. Hence, higher-resolution subimages must exist for the function to succeed. If no higher-resolution subimages exist, the tile manager 192 reports the error and terminates the function 436 at the end state 1144.

If the higher-resolution subimage does exist, the tile manager 192 proceeds to a state 1150 to calculate the indices of, or locate, the four higher-resolution tiles that reduce to this tile. There are four tiles involved because the preferred resolution step between subimage levels is two in the presently preferred embodiment. Thus, since there are two dimensions, four higher-resolution tiles are required to produce each next lower resolution tile.

Thereafter, the tile manager 192 enters a FOR-loop at a loop state 1152. For each of the four higher-resolution tiles, the tile manager 192 tests whether the tile is loaded in the image data cache, at a decision state 1154. If the tile is not loaded, then the tile manager 192 moves to a state 1156 wherein a recursive call is made to the "load subimage tile" function to create the corresponding higher-resolution tile from yet higher-resolution tiles. This case occurs if a the tile is a few layers down in the image stack and the tiles in all but the full resolution subimage had been invalidated. Therefore, the function 436 invokes itself to work all the way back up to the top level, recreate the higher-resolution tiles and then work back down to the tile of interest. Only higher-resolution tiles that map to the particular lower-resolution tile need be loaded Assuming that all the higher-resolution tiles have been loaded, the FOR-loop terminates and the tile manager 192 proceeds to test whether all of the higher-resolution tiles are blank. If all four of the high resolution tiles mapped to this low resolution are blank, the tile manager 192 transitions to a state 1160 to mark the low resolution tile as blank. The tile manager 192 does not create any image data for the blank, lower-resolution tile. The tile manager 192 and terminates the function 436 at the end state 1144.

If, however, one or more of the higher-resolution tiles is not blank, the tile manager 192 moves to a state 1162 to make a determination as to whether it is faster to create the lower-resolution tile by scaling the compressed version of the higher-resolution tiles or the expanded version of the higher-resolution tiles. An algorithm is used at the state 1162 to decide which is faster and depends on the machine that the program is running on, and other considerations. If it is faster to scale the compressed data the tile manager 192 moves to the function 442 to create the compressed, lower-resolution tile directly from the compressed higher-resolution tiles.

Now, if it is determined that it is faster to scale the expanded version of the data, the tile manager 192 moves from the state 1162 to a state 1166 to allocate memory for the uncompressed version of the lower-resolution tile. From the state 1166, the tile manager 192 moves to the beginning of a FOR-loop at a loop state 1168 wherein for each of the higher-resolution tiles the tile manager 192 scales the expanded version of the higher-resolution tile directly into the proper position in the lower-resolution tile using the function 444. When the tile manager 192 has scaled each of the four high resolution tiles, the tile manager 192 has completed the creation of the expanded version of the low resolution tile.

The tile manager 192 then proceeds, from either of the states 1168 or 442 to a decision state 256 wherein the tile manager 192 determines if an error was incurred in that process. If there was an error, the tile manager 192 moves to a state 1172 to report the error. From either of the states 1170 (if no error) or 1172, the tile manager terminates the function 436 at the end state 1144.

Figure 32:
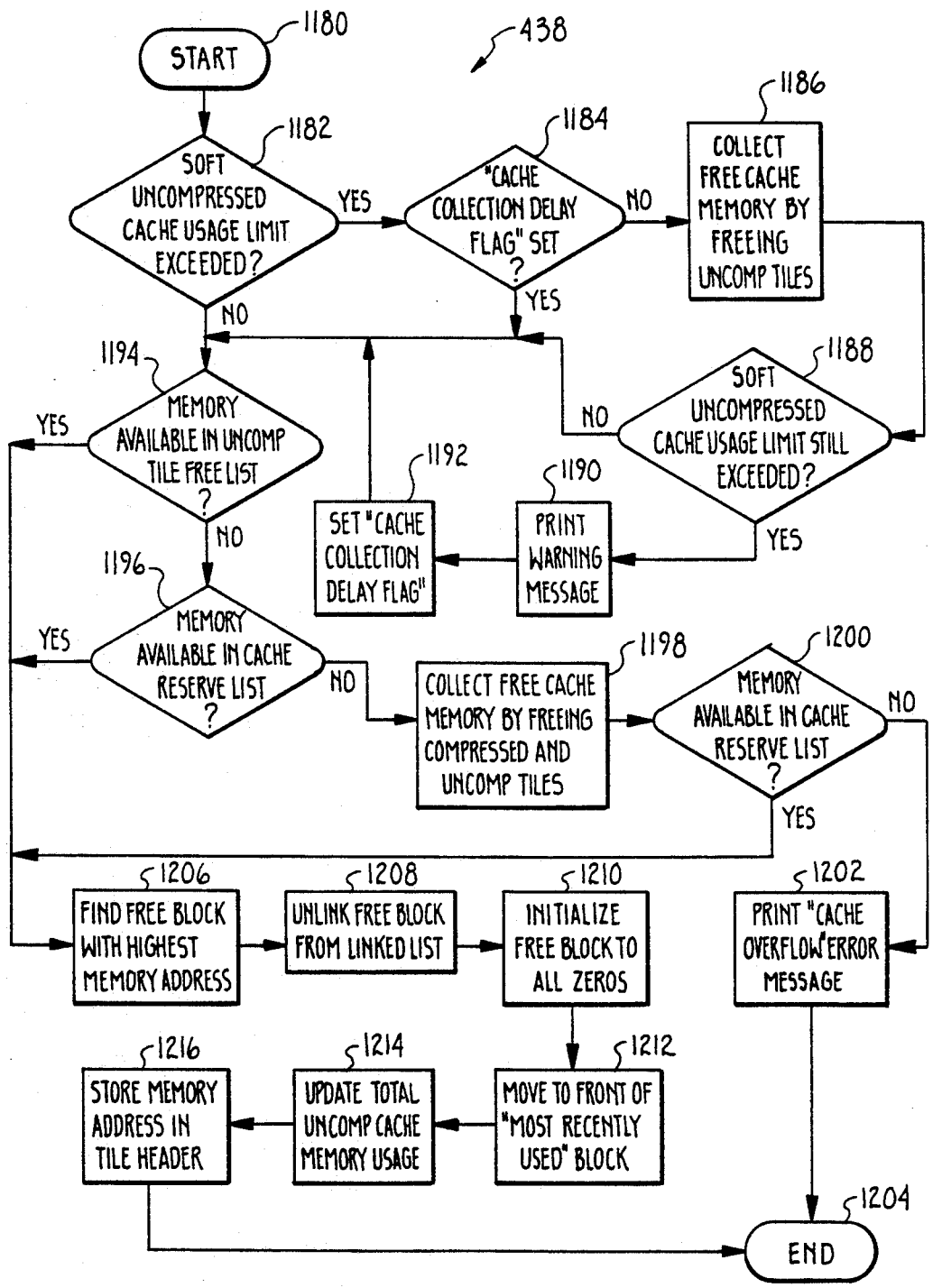
FIG. 32 is a flow diagram defining the "allocate space for uncompressed version of tile" function referred to in FIG. 28.

FIG. 32 contains the flow diagram for the "allocate space for uncompressed version of tile" function 438 referred to in FIG. 28. The tile manager 192 enters the function 438 at a start state 1180 and moves to a decision state 1182 to test whether the "soft" uncompressed cache usage limit is exceeded. The soft uncompressed cache limit is a number that is cast into the tile manager 192 during initialization and it basically sets a guideline for how much of the image data cache is to be devoted to uncompressed image data. If the cache manager gets a request for uncompressed cache space and finds that this soft limit has been exceeded, it attempts to reduce the amount of expanded image data that is held in cache either by compressing expanded tiles or by discarding expanded tiles that have valid compressed versions or some other way to recreate them.

If the tile manager 192 finds that the soft limit is exceeded, the tile manager 192 moves to a state 1184 to first check whether the "cache collection delay" flag is set. This flag is set after an unsuccessful attempt to reduce cache memory usage and prevents repeated unsuccessful calls to collect free cache at a state 1186.

Thus, the tile manager 192 will not try to reduce the expanded memory usage until the flag is cleared in the "unlock expanded tile handle" function 432 (FIG. 30).

If the cache collection delay flag is not set, the tile manager moves to a state 1186 to collect free cache memory by freeing uncompressed tiles. After that, the tile manager 192 moves to a decision state 1188 to test whether the soft uncompressed cache usage limit is still exceeded after an attempt to reduce the memory usage. If the usage is still exceeded, the tile manager 192 prints a warning message on the video display 154 (FIG. 6) at a state 1190 and then sets the cache collection delay flag at a state 1192.

Returning in the discussion to the state 1182, if the soft limit was not exceeded, or if it was not exceeded at the state 1188, the tile manager 192 moves to a decision state 1194 to determine whether there is memory available in the uncompressed tile free list. If there is not memory available in the uncompressed tile free list, then the tile manager 192 moves to a decision state 1196 to determine whether there is memory available in the cache reserve list. If there is no memory available there, the tile manager 192 moves to a state 329 wherein the tile manager 192 again tries to collect free cache space by unlocking or freeing both uncompressed and compressed tiles. At this point, the tile manager 192 must free space in order to allocate space for this uncompressed tile. The tile manager 192 moves to a state 1200 to determine whether memory is now available in the cache reserve list. In the state 1198, when the cache memory space is freed, it is placed into the cache reserve list. If memory is not available, then the tile manager 192 moves to a state 1202 and prints a "cache overflow" error message and terminates the function 438 with an error condition at the end state 1204.

Now, taking an alternate path from the states 1194, 1196 and 1200, if the tile manager 192 can successfully get space for the uncompressed tile data, then the tile manager 192 moves to a state 1206 where the tile manager 192 finds the free block with the highest memory address. If there is a choice between two or more free memory blocks, the tile manager 192 chooses the one with the highest address to try to keep all of the expanded image data at the high address end of the cache file. Once the tile manager 192 finds the highest address block, it moves to a state 1208 to unlink the free block from the free memory link list.

There are actually two possibilities for the free memory link list when the tile manager 192 is looking for expanded memory. One is the uncompressed tile free list and the other is the cache reserve list. In either case, the tile manager 192 unlinks the block of memory that the tile manager 192 is interested in from the free list and relinks the remaining memory blocks of the affected free list.

The tile manager 192 then transitions to a state 1210 to initialize the newly allocated block to all background color. Then the tile manager 192 moves to a state 1212 to move the description of the memory block (a pointer to the tile header) to the front of the most recently used tile list. Moving to a state 1214, the tile manager 192 updates the soft uncompressed cache memory usage counter that was checked at the state 1182. The tile manager 192 continues to a state 1216 to store the memory address in the tile header. The memory block that the tile manager 192 has just allocated is a pointer that is stored in the tile header data structure. That is how the memory block is associated with the tile. Then the tile manager 192 terminates normally from the function 438 at the end state 1204.

Figure 33:
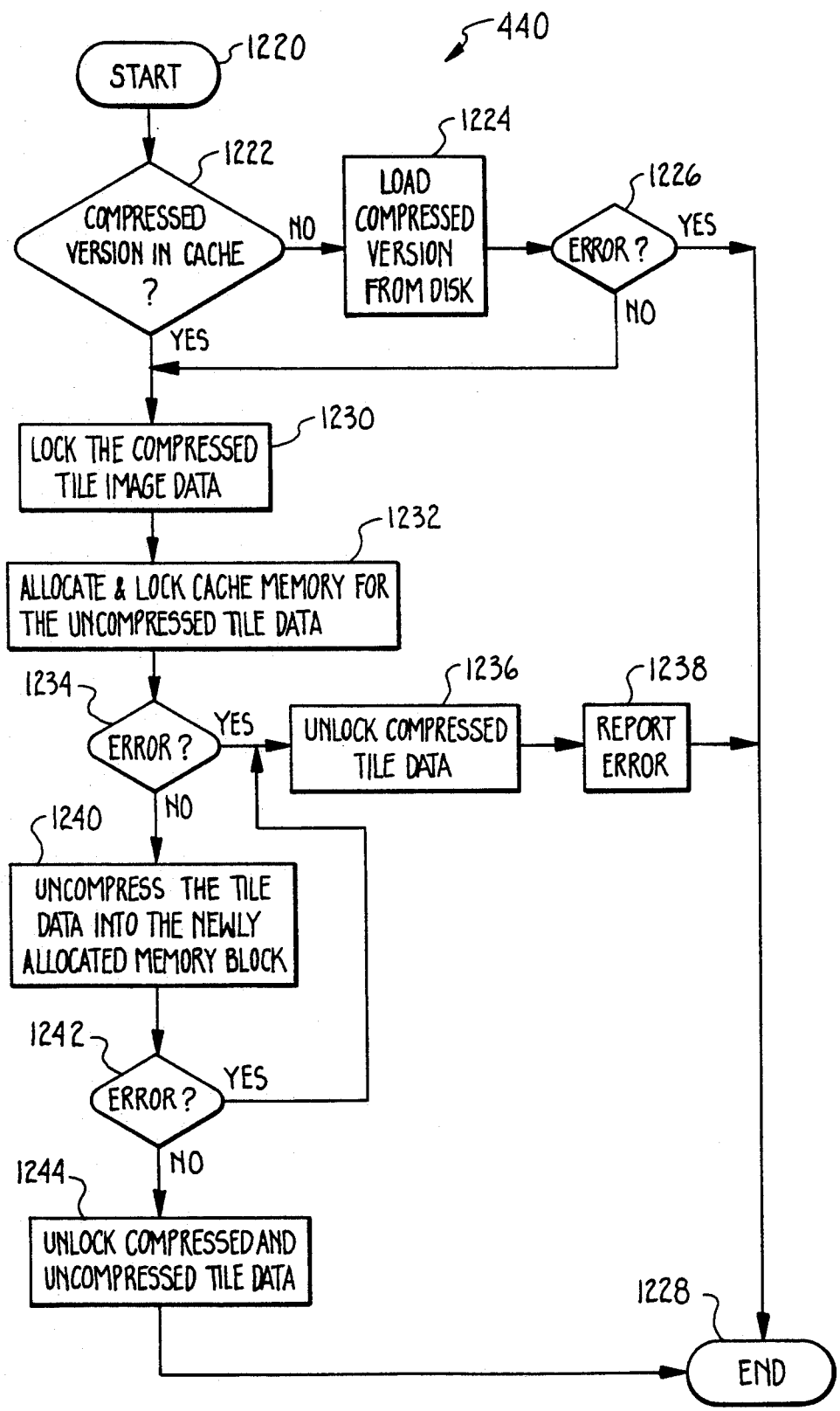
FIG. 33 is a flow diagram defining the "create uncompressed version of tile from compressed version" function referred to in FIG. 28.

FIG. 33 illustrates the process by which the present invention expands the compressed version of a tile to create an uncompressed version. Specifically, as shown in FIG. 33, the tile manager 192 starts at a start state 1220 and moves to a test function at state 1222, where the tile manager 192 determines whether the compressed version of the tile, or the compressed tile data, is in cache memory. If it is not, then the tile manager 192 moves to state 1224, wherein the system loads the necessary data from the disk. If there is an error detected at state 1224, the tile manager 192 moves to state 1228 to terminate the process.

From state 1226, if compressed data was successfully loaded from the disk or from state 1222 if it was in cache to begin with, the tile manager 192 moves to state 1230, wherein the tile manager 192 locks the compressed tile image data. This step simply increments the lock count on the compressed memory state. From state 1230, the system moves to state 1232, wherein the tile manager 192 allocates and locks the uncompressed tile memory block. The system then moves to state 1234 to determine whether an error occurred at state 1232. If so, the tile manager 192 moves to state 1236 and unlocks the compressed tile data. From state 1236, the system moves to state 1238 to report the error. The system then terminates at end state 1228.

On the other hand, if no error existed as determined at state 1234, the system moves to state 1240, wherein the tile manager 192 uncompresses the compressed data. Next, the tile manager 192 moves to state 1242 to determine whether an error occurred at state 1240. If an error occurred at state 1240, the tile manager 192 moves to state 1236 and functions as described previously. Otherwise, the tile manager 192 moves to stat 1244 to unlock the compressed and uncompressed data, and then terminates at end state 1228.

Figure 34:
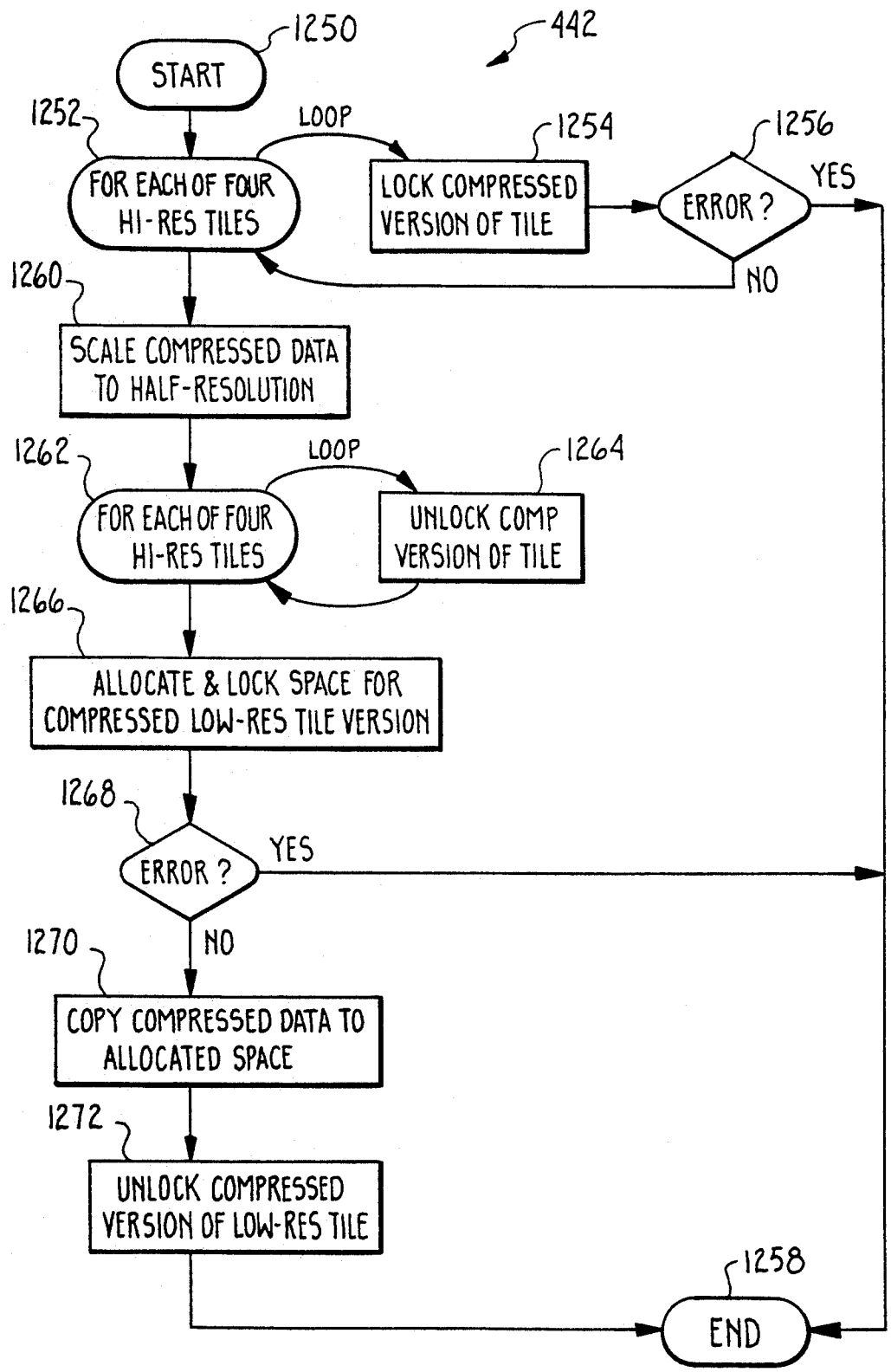
FIG. 34 is a flow diagram defining the "create compressed low resolution tile from compressed higher-resolution tiles" function referred to in FIG. 31.

FIG. 34 illustrates a process for creating compressed low resolution tiles from compressed higher resolution tiles. The tile manager 192 starts at start state 1250 and proceeds to state 1252, wherein the system enters a loop which is followed by the system for each of the four high resolution tiles required to produce a single low resolution tile. More specifically, at state 1252 the tile manager 192 locks the compressed version of the high resolution tile. The system then proceeds to state 1256, wherein the tile manager 192 determines whether an error occurred at state 1254. In the event that an error occurred, the tile manager proceeds to end state 1258 and terminates. If no error occurred, the tile manager 192 returns to state 1252 and continues the loop described above for each of the four high resolution tiles.

After processing all four high resolution tiles as described, the system proceeds to state 1260 where the tile manager 192 scales the compressed data to half resolution. The process performed at state 1260 results in a compressed version of the low resolution tile. Then the tile manager 192 moves to a loop represented by states 1262, 1264, wherein for each of the high resolution tiles the tile manage 192 unlocks the compressed version of the tile.

Next, the tile manager 192 moves to state 1266 where the tile manager 192 allocates and locks memory for the compressed version of the low resolution tile. At state 1266, the tile manager 192 actually puts the compressed version of the low resolution tile in a general, common buffer that is large enough to hold the maximum possible size of the compressed results. The actual valid data is usually much less than that than the maximum possible size, so the tile manager 192 only saves the valid amount of data.

From state 1266, the system moves to state 1268 to determine whether an error occurred at state 1266. If an error occurred, the system moves to end state 1258 and terminates. Otherwise, the system moves to state 1270 where the tile manager 192 copies the compressed data out of the temporary compressed data buffer into the newly allocated space in the cache. Then the tile manager 192 moves to state 1272 where the tile manager 192 unlocks the compressed version of the low resolution tile that now contains valid data. The system then terminates normally at state 1258.

Figure 35:
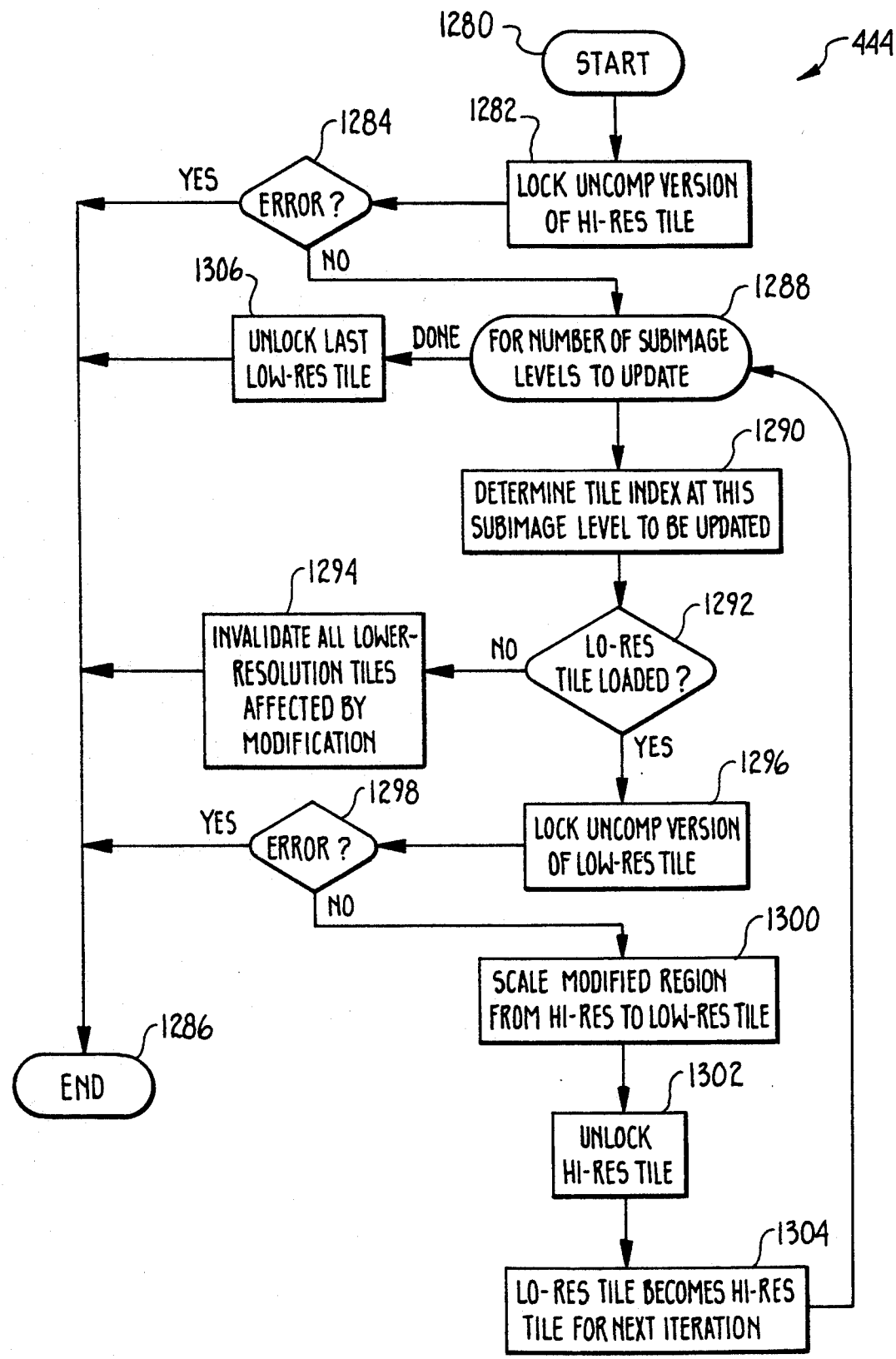
FIG. 35 is a flow diagram defining the "copy uncompressed high resolution tile to uncompressed low resolution tiles" function referred to in FIG. 31.

Now referring to FIG. 35, a process is shown whereby the system resamples uncompressed high resolution tiles to an uncompressed low resolution tile. The tile manager 192 starts at start state 1280 and moves to state 1282, wherein the tile manager 192 locks the uncompressed version of a single high resolution tile. This function scales a single high resolution tile to update one quarter of a tile in the half-resolution subimage. That quarter tile is rescaled to update one-sixteenth of a tile in the quarter-resolution subimage. This continues to the lowest resolution subimage. Next, the tile manager 192 proceeds to state 1284 to determine whether an error occurred in locking the uncompressed version of the high resolution tile. If there Was an error, then the tile manager 192 proceeds to state 1286 and terminates with an error condition. Otherwise, the tile manager 192 moves to state 1288 where the tile manager 192 determines how many levels of the subimage are to be updated. This function can be used to update a subset of subimages or the entire image stack in the case where a single tile is modified in the full resolution subimage. It will propagate that change all the way down to the lowest-resolution subimage in the image stack.

Next, the tile manager 192 proceeds to state 1290 where the tile manage 192 determines the tile index that is to be updated. In accordance with the present invention, when a change is propagated from the higher resolution down to the low resolution of tiles, the system calculates which tile corresponds to the affected area. Then the tile manager 192 moves to state 1290 where the tile manager 192 determines whether the low resolution tile that the tile manager 192 is about to update is marked as loaded or not. This step is intended for the situation in which not all of the low resolution substates are populated during the loading of a raster image.

If the system determines that one or more low resolution tiles are not loaded, the system proceeds to state 1294, wherein the tile manager 192 invalidates all of the low resolution tiles that would otherwise be affected by the change. The system then exits normally at end state 1286. If the low resolution tile is about to be modified is loaded, as determined at state 1292, the tile manager 192 moves to state 1296, wherein the system locks the uncompressed version of the low resolution tile. The tile manager 192 then moves to state 1298 to determine whether an error occurred at state 1296 and, if so, the system moves to end state 1286 to terminate. Otherwise, the system moves to state 1300. wherein the tile manager 192 scales the raster data from the high resolution tile down to the low resolution tile. Then the tile manager 192 moves to state 1302 where the tile manager 192 unlocks the high resolution tile.

Next, the system moves to state 1304, wherein the tile manager 192 recursively modifies the loop variables such that the low resolution tiles that the tile manager 192 just finished updating become the high resolution tiles for the next succeeding iteration. Once all the subimages have been updated as described, the system exits at end state 1286.

Figure 36A:
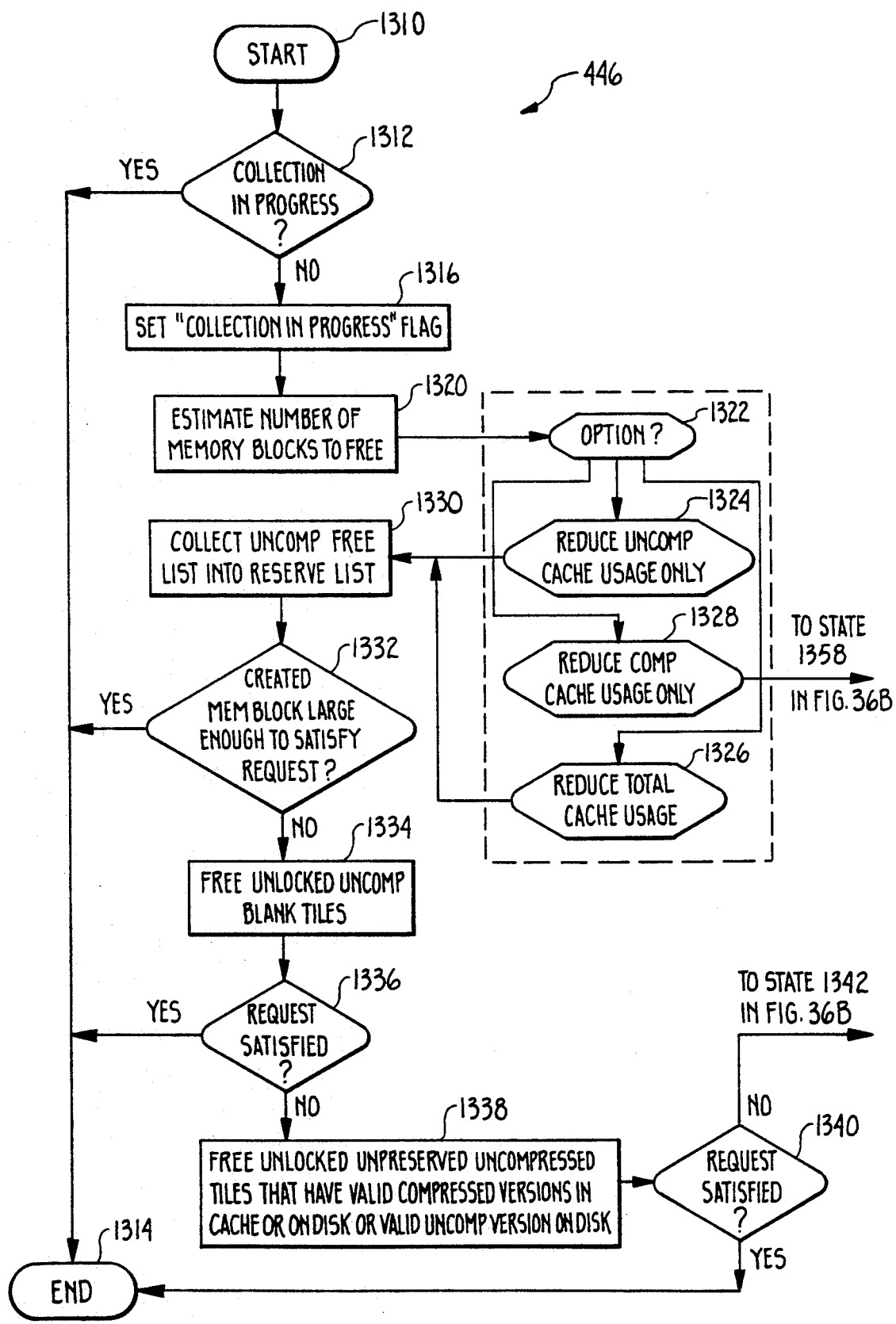

Now referring to FIGS. 36A and 36B, a process to collect free cache is shown. This process can be called from several other processes. The tile manager 192 begins at start state 1310 in FIG. 36A and moves to state 1312 to determine whether a cache collection operation is in process. If so, the system exits at end state 1314. This prevents recursive calls to collect free cache which might otherwise occur. If the system at state 1312 determines that no collection is in progress, then the tile manager 192 moves to state 1316 where the tile manager 192 sets a flag indicating that a collection is in progress.

From state 1316, the system moves to state 1320, where the tile manager 192 estimates the number of memory blocks to free in this operation. The reason for freeing a number of blocks instead of just one block is to reduce the computational overhead associated with the cache collection operations. The tile manager 192 typically estimates the amount of memory required to equal the number of tiles in a single row of the full resolution subimage of the document associated with the most recently used tile.

Once this estimate has been made, the system proceeds to state 1322 wherein the tile manager 192 considers the options that the tile manager 192 passed into this function. There are three options. One, as indicated at state 1324, is to reduce the uncompressed cache usage only while not affecting the compressed data that is currently held in cache. The second option, indicated at state 1328, is to reduce the compressed cache memory usage only. The third option, indicated at state 1326, is to reduce the total cache memory usage including both compressed and uncompressed data.

From state 1324 or state 1326, the tile manager 192 moves to state 1330, where the tile manager 192 stores all of the free states currently in the uncompressed free list into the cache reserve list. As the tile manager 192 performs the process in state 1330, the tile manager 192 attempts to consolidate the memory blocks. That is, if there are two free blocks that are adjacent to one another, the system automatically turns them into a single, larger contiguous block. From state 1328, on the other hand, the system moves to state 1358, shown in FIG. 36B and discussed below.

From state 1330, the tile manager 192 moves to state 1332, wherein the tile manager 192 determines whether the tile manager 192 has created a memory block large enough to satisfy the initial request. If so, the tile manager 192 terminates normally at end state 1314. Otherwise, the tile manager 192 moves to state 1334 where the tile manager 192 frees any unlocked, uncompressed tiles which are blank. The tile manager 192 then moves to state 1336 where the tile manager 192 determines whether the tile manager 192 has free sufficient memory. If so, the tile manager 192 exits at end state 1314. Otherwise, the tile manager 192 moves to state 1338 where the tile manager 192 frees unlocked, unpreserved uncompressed tiles that have valid compressed versions in cache or are on a disk, or that have valid, uncompressed versions on the disk beginning with the least recently used tile. After having freed that particular class of tiles, if the tile manager 192 determines, at state 1340, that the memory request has been satisfied, the tile manager 192 moves to state 1314 and terminates. Otherwise, the tile manager 192 moves to state 1342, shown in FIG. 36B.

Now referring to FIG. 36B, the tile manager 192 begins at state 1342, wherein the tile manager 192 compresses the free unlocked, unpreserved uncompressed tiles that don't have a valid compressed version or other source from which the tile can be recreated. To do this the tile manager 192 processes expanded tile data through a compression algorithm. The tile manager 192 then creates a compressed version of that tile so that the uncompressed version of the tile can be discarded.

Next, the tile manager 192 moves to state 1344, wherein the system determines whether the request made at state 1342 has been satisfied. If so, the system terminates at end state 1346. Otherwise, the system moves to state 1348, wherein the tile manager 192 frees unlocked, but preserved uncompressed tiles that have valid compressed or uncompressed copies. The tile manager 192 preferentially frees the oldest such tiles.

From the state 1348, the tile manager 192 proceeds to a decision state 1350 to test whether the request made at the state 1348 was satisfied. If so, the function 446 is terminated at the end state 1346. Otherwise, the tile manager 192 moves to a state 1352 to compress and then free unlocked, but preserved, uncompressed tiles that do not have valid compressed versions.

Next, the tile manager 192 moves to state 1354, wherein the system determines whether the request made at state 1352 has been satisfied. If so, the system terminates at end state 1346. Otherwise, the system moves to state 1356, wherein the tile manager 192 determines whether to free data memory blocks. If not, the system terminates at state 1346. Otherwise, the system moves to state 1358, to free unlocked preserved, uncompressed tiles that don't have valid compressed versions already.

The system next moves to state 1360 to determine whether the request has been satisfied. If so, the system terminates at state 1346. Otherwise, the system moves to state 1362 to print an error message, and then terminate at state 1346.

Now referring to FIG. 37, the tile manager 192 starts at state 1380 and moves to state 1382 where the tile manager 192 determines whether the uncompressed version is in fact still locked—that is if the lock count for uncompressed version of that tile is non-zero. If the tile is still locked then the tile manager 192 moves to state 1384 and prints a warning message. Then the tile manager 192 terminates at end state 1386.

If, at state 1382, the system determined that the uncompressed version is not locked, then the tile manager 192 moves to state 1388 where the tile manager 192 determines whether the uncompressed data has already been freed. If it has then the tile manager 192 terminates at end state 1386. Otherwise, the tile manager 192 moves to state 1390 where the tile manager 192 unlinks the uncompressed memory state from the most recently used list.

From state 1390, the tile manager 192 moves to state 1392 where the tile manager 192 updates and decrements the total uncompressed memory usage counter by the appropriate amount. The tile manager 192 then moves to state 1394 where the tile manager 192 moves the memory block to the uncompressed memory free list. In accordance with the present invention, the tile manager 192 keeps the list sorted by decreasing address. Consequently, when the tile manager 192 allocates expanded memory blocks, the tile manager 192 tends to choose the preferred blocks that have higher addresses because they are at the front of the free list.

Next, the tile manager 192 moves to state 1396, wherein the tile manager 192 sets a pointer in the tile header to null and the tile manager 192 sets the uncompressed tile status flags. This ensures that the tile header reflects the fact that it no longer has an uncompressed data associated with it. Then the tile manager 192 terminates at end state 1386.

Now referring to FIG. 38, a process by which the system compresses a tile is shown. The system begins at start state 1400, and moves to state 1402, wherein the tile manager 192 determines whether the uncompressed tile data is in cache memory. If it is not, the tile manager 192 moves to state 1404 and loads the uncompressed data into cache memory from the disk. The system then moves to state 1406, to determine whether an error occurred at state 1404. If so, the system terminates at end state 1408. Otherwise, the system proceeds to state 1410.

At state 1410, the tile manager 192 locks the uncompressed tile data, and then moves to state 1412, to determine whether an error occurred at state 1410. If an error occurred, the system terminates at end state 1408. Otherwise, the system moves to state 1414, wherein the tile manager 192 compresses the image data into a common buffer. For binary images of text and line drawings, the tile manager 192 uses a CCITT group 4 encoding.

From state 1414, the tile manager 192 moves to state 1416 to determine whether an error occurred at state 1414. If an error indeed occurred, the system moves to state 1418 to unlock the uncompressed tiles, and then exits at end state 1408. Otherwise, the system proceeds to state 1420, wherein the tile manager 192 allocates and locks cache memory space for the compressed tile data.

From state 1420, the system proceeds to state 1422 to determine whether an error occurred at state 1420. If an error occurred, the system moves to state 1418 and proceeds as described above. Otherwise, the system moves to state 1424, wherein the tile manager 192 copies the compressed data from the common buffer into the newly allocated cache memory state. The system moves from state 1424 to state 1426, wherein the tile manager 192 unlocks the compressed and uncompressed tile data and then terminates at end state 1408.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. An image memory management system, comprising:
    a computer having a processor and an image memory, the image memory comprising a main memory and a secondary memory;
    an image stack, located in the image memory, comprising a plurality of similar digital images, each digital image having a plurality of pixels grouped into at least one tile, and each digital image having a resolution different from the other digital images;
    means for accessing a selected one of the tiles in the image stack;
    first means for transferring a selected one of the tiles from the secondary memory to the main memory when the tile is accessed by the accessing means and the tile is absent from the main memory; and
    second means for transferring a selected one of the tiles from the main memory to the secondary memory when the main memory is full.

2. The system defined in claim 1, additionally comprising means for modifying a selected one of the tiles.

3. The system defined in claim 2, wherein the second transferring means only transfer tiles that have been modified by the modifying means.

4. The system defined in claim 1, wherein the main memory is semiconductor memory.

5. The system defined in claim 1, wherein the secondary memory is a magnetic disk.

6. The system defined in claim 1, wherein each tile is square.

7. The system defined in claim 1, wherein a lowest resolution digital image comprises one tile.

8. The system defined in claim 1, wherein a preselected digital image in the image stack is resampled to obtain another digital image in the image stack.

9. The system defined in claim 1, wherein at least one of the digital images is compressed.

10. The system defined in claim 1, wherein the accessing means is responsive to an image access operation selected by a user.

11. The system defined in claim 10, wherein the image access operation is zooming or panning the image.

12. The system defined in claim 10, wherein the image access operation is reversible.

13. A method of managing images in a computer having a processor and an image memory comprising a slower access memory and a faster access memory, comprising the steps of:
    creating a digital image;
    resampling the digital image so as to form an image stack comprising the digital image and one or more lower resolution digital images;
    dividing each image into equal sized, rectangular tiles; and
    evaluating a location in the image memory of tiles in each digital image of the image stack in a given region of interest.

14. The method defined in claim 13, additionally comprising updating modified regions of all images when an edit operation is completed.

15. The method defined in claim 13, wherein the evaluating step includes the following order of decreasing availability:
    exists in the faster access memory in uncompressed form;
    exists in the slower access memory in uncompressed form;
    exists in the faster access memory in compressed form;
    exists in the slower access memory in compressed form; and
    must be constructed from higher resolution tiles.

16. The method defined in claim 13, wherein the evaluating step includes the following order of decreasing availability:
    exists in the faster access memory in uncompressed form;
    exists in the slower access memory in uncompressed form;
    exists in the slower access memory in compressed form; and
    must be constructed from higher resolution tiles.

17. The method defined in claim 13, wherein the evaluating step includes selecting the digital image with the lowest resolution higher than a requested resolution at a given view scale.

* * * * *